United States Patent
Short et al.

(10) Patent No.: US 12,473,360 B2
(45) Date of Patent: Nov. 18, 2025

(54) MULTI-SPECIFIC ANTIBODY CONSTRUCTS

(71) Applicant: BioAtla, Inc., San Diego, CA (US)

(72) Inventors: Jay M. Short, Del Mar, CA (US); Gerhard Frey, San Diego, CA (US); Hwai Wen Chang, San Marcos, CA (US)

(73) Assignee: BioAtla, Inc., San Diego, CA (US)

( * ) Notice: Subject to any disclaimer, the term of this patent is extended or adjusted under 35 U.S.C. 154(b) by 981 days.

(21) Appl. No.: 17/251,122

(22) PCT Filed: Jun. 11, 2019

(86) PCT No.: PCT/US2019/036503
§ 371 (c)(1),
(2) Date: Dec. 10, 2020

(87) PCT Pub. No.: WO2019/241216
PCT Pub. Date: Dec. 19, 2019

(65) Prior Publication Data
US 2021/0253702 A1    Aug. 19, 2021

Related U.S. Application Data

(60) Provisional application No. 62/684,818, filed on Jun. 14, 2018.

(51) Int. Cl.
| | | |
|---|---|---|
| *A61K 39/395* | (2006.01) | |
| *A61K 47/60* | (2017.01) | |
| *A61K 47/62* | (2017.01) | |
| *A61K 47/68* | (2017.01) | |
| *C07K 16/28* | (2006.01) | |
| *C07K 16/30* | (2006.01) | |
| *C07K 16/32* | (2006.01) | |
| *A61K 39/00* | (2006.01) | |

(52) U.S. Cl.
CPC .......... *C07K 16/2809* (2013.01); *A61K 47/60* (2017.08); *A61K 47/62* (2017.08); *A61K 47/6849* (2017.08); *A61K 47/6863* (2017.08); *C07K 16/2827* (2013.01); *C07K 16/2863* (2013.01); *C07K 16/30* (2013.01); *C07K 16/32* (2013.01); *A61K 2039/505* (2013.01); *C07K 2317/31* (2013.01); *C07K 2317/622* (2013.01); *C07K 2317/92* (2013.01)

(58) Field of Classification Search
None
See application file for complete search history.

(56) References Cited

U.S. PATENT DOCUMENTS

| | | | |
|---|---|---|---|
| 5,677,149 A | 10/1997 | Bauer et al. | |
| 5,837,242 A | 11/1998 | Holliger | |
| 5,922,845 A | 7/1999 | Deo | |
| 6,077,499 A | 6/2000 | Griffiths | |
| 6,171,820 B1 | 1/2001 | Short | |
| 6,193,966 B1 | 2/2001 | Deo | |
| 6,303,755 B1 | 10/2001 | Deo | |
| 6,562,594 B1 | 5/2003 | Short | |
| 6,589,527 B1 | 7/2003 | Winter | |
| 7,011,812 B1 | 3/2006 | Griffiths | |
| 7,122,646 B2 | 10/2006 | Holliger | |
| 7,514,066 B2 | 4/2009 | Griffiths | |
| 7,642,228 B2 | 1/2010 | Carter | |
| 7,695,936 B2 | 4/2010 | Carter | |
| 7,732,149 B2 | 6/2010 | Kojima | |
| 7,736,635 B2 | 6/2010 | Norman | |
| 7,833,528 B2 | 11/2010 | Griffiths | |
| 7,951,917 B1 | 5/2011 | Arathoon | |
| 7,973,138 B2 | 7/2011 | Liang | |
| 8,034,903 B2 | 10/2011 | Tsuchiya | |
| 8,303,953 B2 | 11/2012 | Adams | |
| 8,337,841 B2 | 12/2012 | Kojima | |
| 8,350,010 B2 | 1/2013 | Chuntharapai | |
| 8,420,783 B2 | 4/2013 | Goldenberg | |
| 8,580,265 B2 | 11/2013 | Adams | |
| 8,586,039 B2 | 11/2013 | Tsuchiya | |

(Continued)

FOREIGN PATENT DOCUMENTS

| | | |
|---|---|---|
| AU | 2013200009 A1 | 1/2013 |
| CA | 3035033 A1 | 3/2018 |

(Continued)

OTHER PUBLICATIONS

Office Action for corresponding Canadian application No. 3,103,414; dated Aug. 10, 2023 (4 pages).
Notice of Reasons for Rejection for corresponding Japanese application No. 2020-569789; dated Jun. 20, 2023 (16 pages) Machine Translation.
Decision of Refusal for corresponding Japanese application No. 2020-569789; dated Nov. 14, 2023 (9 pages) Machine Translation.
Official Action for corresponding Canadian application No. 3,103,414; dated Jul. 29, 2022 (10 pages).

(Continued)

*Primary Examiner* — Yunsoo Kim
(74) *Attorney, Agent, or Firm* — Mendelsohn Dunleavy P.C.; Kevin J. Dunleavy; Tu Phan-Kerr

(57) ABSTRACT

A multi-specific antibody contains at least one binding site for a cell specific antigen and at least one binding site for a tumor-reactive lymphocyte antigen and a multi-specific antibody including an IgG antibody or fragment thereof that binds to a first antigen; and at least one scFv antibody that binds to a second antigen that is different from the first antigen and is linked to a C terminus of at least one light chain or heavy chain of said IgG antibody or fragment. The multi-specific antibody reversibly binds to at least one of the cell specific antigen and tumor-reactive lymphocyte antigen or the first antigen and the second antigen with a greater affinity at an aberrant condition than at a normal physiological condition. Conjugates of the multi-specific antibodies and methods for generating the multi-specific antibody are also provided.

22 Claims, 15 Drawing Sheets

Specification includes a Sequence Listing.

(56) References Cited

U.S. PATENT DOCUMENTS

| | | |
|---|---|---|
| 8,597,652 B2 | 12/2013 | Fuh |
| 8,597,911 B2 | 12/2013 | Miyazaki |
| 8,637,258 B2 | 1/2014 | Padkjaer |
| 8,642,745 B2 | 2/2014 | Arathoon |
| 8,765,412 B2 | 7/2014 | Arathoon |
| 8,859,738 B2 | 10/2014 | Himmler et al. |
| 9,409,989 B2 | 8/2016 | Arathoon et al. |
| 9,969,813 B2 | 5/2018 | Frey et al. |
| 10,696,750 B2 | 6/2020 | Frey et al. |
| 2002/0062010 A1 | 5/2002 | Arathoon et al. |
| 2002/0168343 A1 | 11/2002 | Curiel |
| 2003/0124123 A1 | 7/2003 | Giles-Komar et al. |
| 2005/0112119 A1 | 5/2005 | Qin et al. |
| 2005/0136050 A1 | 6/2005 | Kufer et al. |
| 2005/0266425 A1 | 12/2005 | Zauderer et al. |
| 2006/0159673 A1 | 7/2006 | Kojima |
| 2007/0072225 A1 | 3/2007 | Alving |
| 2007/0184523 A1 | 8/2007 | Arathoon et al. |
| 2008/0069820 A1 | 3/2008 | Fuh |
| 2009/0074780 A1 | 3/2009 | Urech et al. |
| 2009/0162380 A1 | 6/2009 | Glaser |
| 2009/0252683 A1 | 10/2009 | Kischel et al. |
| 2009/0298195 A1 | 12/2009 | Ruker |
| 2010/0015133 A1 | 1/2010 | Igawa |
| 2010/0233173 A1 | 9/2010 | Wu |
| 2010/0256338 A1 | 10/2010 | Brinkmann |
| 2011/0130324 A1 | 6/2011 | Stevens |
| 2011/0152173 A1 | 6/2011 | Lofquist |
| 2011/0158995 A1 | 6/2011 | Tan |
| 2011/0159007 A1 | 6/2011 | Borras et al. |
| 2011/0177070 A1 | 7/2011 | Lofquist |
| 2011/0195454 A1 | 8/2011 | McWhirter et al. |
| 2012/0100139 A1 | 4/2012 | Thompson |
| 2012/0184718 A1 | 7/2012 | Bruenker |
| 2012/0302492 A1 | 11/2012 | Harkins |
| 2012/0321626 A1 | 12/2012 | Zhou |
| 2013/0017200 A1 | 1/2013 | Scheer et al. |
| 2013/0089547 A1 | 4/2013 | Tso |
| 2013/0089554 A1 | 4/2013 | Blankenship |
| 2013/0243775 A1 | 9/2013 | Papadopoulos |
| 2013/0330345 A1 | 12/2013 | Igawa |
| 2014/0037621 A1 | 2/2014 | Tsurushita |
| 2014/0045725 A1 | 2/2014 | Muller-Spath |
| 2014/0081002 A1 | 3/2014 | Lee |
| 2014/0099318 A1 | 4/2014 | Huang et al. |
| 2014/0242075 A1 | 8/2014 | Parren |
| 2014/0242076 A1 | 8/2014 | Kadouche |
| 2015/0079088 A1 | 3/2015 | Lowman et al. |
| 2015/0252119 A1 | 9/2015 | Frey et al. |
| 2016/0222105 A1 | 8/2016 | Moore et al. |
| 2018/0057608 A1 | 3/2018 | Jung et al. |
| 2018/0066058 A1 | 3/2018 | Sainson et al. |
| 2018/0125988 A1 | 5/2018 | Yang et al. |

FOREIGN PATENT DOCUMENTS

| | | |
|---|---|---|
| CN | 103703024 A | 4/2014 |
| CN | 105722859 A | 6/2016 |
| JP | 2001523971 A | 11/2001 |
| JP | 2002507404 A | 3/2002 |
| JP | 2008-523783 A | 7/2008 |
| JP | 2010538012 A | 12/2010 |
| JP | 2011521905 A | 7/2011 |
| JP | 2017-504578 A | 2/2017 |
| JP | 2018-500049 A | 1/2018 |
| WO | WO2010003101 A2 | 1/2010 |
| WO | WO2010003118 A1 | 1/2010 |
| WO | WO2010014629 A1 | 2/2010 |
| WO | WO2011109726 A2 | 9/2011 |
| WO | WO2011133886 A2 | 10/2011 |
| WO | WO2012009026 A2 | 1/2012 |
| WO | WO2012023053 A2 | 2/2012 |
| WO | 2012033953 A1 | 3/2012 |
| WO | 2012162067 A2 | 11/2012 |
| WO | WO2013003652 A1 | 1/2013 |
| WO | 2013138400 | 9/2013 |
| WO | WO2013142255 A2 | 9/2013 |
| WO | WO2013170168 A1 | 11/2013 |
| WO | WO2013174873 A1 | 11/2013 |
| WO | WO2014096390 A1 | 6/2014 |
| WO | 2016014942 A1 | 1/2016 |
| WO | 2016014974 A2 | 1/2016 |
| WO | 2016110598 A1 | 7/2016 |
| WO | 2016138071 A1 | 9/2016 |
| WO | 2017078839 A1 | 5/2017 |
| WO | 2017112762 A1 | 6/2017 |
| WO | WO2017147139 A1 | 8/2017 |
| WO | 2017180842 A1 | 10/2017 |
| WO | WO2017167350 A1 | 10/2017 |
| WO | 2017201731 A1 | 11/2017 |
| WO | 2018044619 A1 | 3/2018 |
| WO | 2023230626 A2 | 11/2023 |

OTHER PUBLICATIONS

First Written Opinion for corresponding Singaporean application No. 11202012405W; dated Aug. 12, 2022 (9 pages).

International Search Report and Written Opinion for corresponding International application No. PCT/US2019/036503; dated Oct. 18, 2019 (18 pages).

Brinkmann, Ulrich et al. "The making of bispecific antibodies." mABS 9.2 (2017): 182-212.

Dahlen, Eva, et al. "Bispecific antibodies in cancer immunotherapy." Therapeutic Advances in Vaccines and Immunotherapy, 6.1 (2018): 3-17.

Li, Dan et al. "Synthesis and biological research of novel azaacridine derivatives as potent DNA-binding ligands and topoisomerase II inhibitors" Bioorganic & Medicinal Chemistry 25.13 (2017): 3437-3446.

Merus presentation "Approaches to Cancer Therapy Using Bispecific Human Antibodies," Jun. 2012.

Bio 2012 Boston, Merus presentation, "Building a Unique Pipeline of Bispecific Antibodies to Treat Cancer," Jun. 18-21, 2012.

Keinänen, Kari et al., "Biosynthetic lipid-tagging of antibodies." FEBS letters 346.1 (1994): 123-126.

Chapman, Andrew P. "PEGylated antibodies and antibody fragments for improved therapy: a review." Advanced Drug Delivery Reviews 54.4 (2002): 531-545.

Extended European Search Report for corresponding European application No. 19818760.1; dated Jan. 27, 2022 (25 pages).

Bluemel, Claudia, et al. "Epitope distance to the target cell membrane and antigen size determine the potency of T cell-mediated lysis by BiTE antibodies specific for a large melanoma surface antigen." Cancer Immunology, Immunotherapy 59.8 (2010): 1197-1209.

Dickopf, Steffen, et al. "Format and geometries matter. Structure-based design defines the functionality of bispecific antibodies." Computational and Structural Biotechnology Journal 18 (2020): 1221-1227.

Roda-Navarro, Pedro, et al. "Understanding the spatial topology of artificial immunological synapses assembled in T cell-redirecting strategies: a major issue in cancer immunotherapy." Frontiers in Cell and Developmental Biology 7. Article 370 (2020): 1-5.

Spangler, Jamie B., et al. "Triepitopic antibody fusions inhibit cetuximab-resistant BRAF and KRAS mutant tumors via EGFR signal repression." Journal of Molecular Biology 422.4 (2012): 532-544.

First Office Action for corresponding Chinese application No. 201980038003.5; dated Sep. 29, 2023 (30 pages) Machine Translation.

Examination Report for corresponding Taiwanese application No. 108120632; dated Sep. 13, 2023 (31 pages) Machine Translation.

Liu, Hui-Ke, et al. "The role of AXL in tumor metastasis and drug resistance and strategy in anti-tumor therapies." Basic & Clinical Medicine 36.1 (2016): 112-115; English Abstract.

First Examination Report for corresponding Mexican application No. MX/a/2020/013606; dated Apr. 17, 2024 (12 pages) Machine Translation.

(56) References Cited

OTHER PUBLICATIONS

Communication pursuant to Article 94(3) EPC for corresponding European application No. 19818760.1; dated Feb. 23, 2024 (12 pages).
Rejection Decision for corresponding Taiwanese application No. 108120632; dated Feb. 20, 2024 (14 pages).
Office Action issued in corresponding Chinese patent application No. 201980038003.5; dated Dec. 24, 2024 (15 pages).
Notice of Deficiencies issued in the corresponding Israeli patent application No. 279399; dated Nov. 23, 2024 (4 pages).
Second Office Action for corresponding Chinese application No. 201980038003.5; dated Jul. 31, 2024 (19 pages) Machine Translation.
Office Action for corresponding Mexican application No. MX/A/2020/013606; dated Sep. 12, 2024 (13 Pages).
Examination report for corresponding Australian application No. 2019286396; dated Apr. 1, 2025 (7 pages).
Office action for corresponding Korean patent application No. 10-2021-7000437; dated Feb. 7, 2025 (14 pages).
Office action for corresponding Singaporean patent application No. 11202012405W; dated Feb. 18, 2025 (7 pages).
Office action for corresponding Mexican application No. MX/a/2020/013606; dated Feb. 25, 2025 (14 pages). Machine Translation.
Office action for corresponding Chinese application No. 201980038003.5; dated May 17, 2025 (17 pages). Machine Translation.
Office action for corresponding Japanese application No. 2024/035074; dated May 20, 2025 (13 pages). Machine Translation.
Office action for corresponding Israeli application No. 279399; dated Jun. 10, 2025 (5 pages).

MULTI-SPECIFIC ANTIBODY CONSTRUCTS

FIELD OF THE DISCLOSURE

This disclosure relates to the field of multi-specific antibodies. Particularly, this disclosure relates to multi-specific antibodies having at least one conditional activity and methods for generating them.

BACKGROUND OF THE DISCLOSURE

Proteins can be engineered to have a variety of characteristics such as having higher activities or improved stability for operation at different conditions. For example, enzymes have been evolved to be stable at higher temperatures, with varying levels of activity. In situations where there is an activity improvement at higher temperatures, a substantial portion of the improvement can be attributed to the higher kinetic activity commonly described by the Q10 rule where it is estimated that in the case of an enzyme the turnover rate doubles for every increase of 10 degrees Celsius. Mutations introduced into the improved proteins typically reduce the activity of the proteins at the normal operating condition. Mutant enzymes designed for operation at higher temperatures can be active at the normal operating temperature, but typically at a reduced level compared to the wild type enzymes.

Antibodies have become a major class of therapeutic proteins. Traditional antibodies normally bind to a single epitope on an antigen. New antibody constructs, referred to as multi-specific antibodies, have been developed for binding to more than one antigen or to more than one epitope on the same antigen. Multi-specific antibodies may be, for example, bispecific, tri-specific, or tetra-specific antibodies. Multi-specific antibodies have shown potential in a broad range of clinical and diagnostic applications. There are two bispecific antibody drugs approved in the European Union and United States for treatment of oncological diseases (Catumaxomab™ and Blinatumab™). Due to their unique features, multi-specific antibodies have become attractive for next generation antibody therapeutics.

US 2013/0017200 discloses a method of synthesizing multi-specific antibodies. A first antibody fragment is obtained from a first parent antibody having a first mono-specificity, which has a free sulfhydryl group that may be reacted with a thio-reactive crosslinker to produce an antibody fragment-crosslinker moiety. The antibody fragment-crosslinker moiety is reacted pairwise with each of two or more additional antibody fragments obtained from other parent antibodies having a mono-specificity that is different from the first antibody fragment, each having a free sulfhydryl group, to produce the multi-specific antibodies. The multi-specific antibodies may be suitable as new therapeutic and diagnostic agents.

Brinkmann and Kontermann ("The making of bispecific antibodies," MABS, 2017, vol. 9, pp. 182-212, 2017) surveys formats of bispecific antibodies, including small molecules composed solely of the antigen binding sites of two antibodies, molecules with an IgG structure, and large complex molecules composed of different antigen-binding moieties often combined with dimerization modules. Depending on different applications, the bispecific antibodies may vary in size, arrangement, valence, flexibility and geometry of their binding modules, as well as in their distribution and pharmacokinetic properties. The bispecific formats collectively increase the diversity of the antibodies that can be applied to the development of therapeutics for various indications.

It is also desirable to generate useful antibodies that are conditionally active. For example, antibodies virtually inactive at a normal physiological condition and significantly more active at a condition other than the normal physiological condition (e.g., an aberrant condition), antibodies that are activated or inactivated in certain microenvironments (e.g., activated in a tumor microenvironment), or antibodies that are activated or inactivated over time. Besides temperature, other trigger conditions for which the antibodies can be evolved or optimized include pH, osmotic pressure, osmolality, oxidative stress, oxygen concentration and electrolyte concentration. Besides the activity, other desirable properties of antibodies that can be optimized during evolution include stability, half-life, chemical resistance, and proteolytic resistance.

Many strategies for evolving or engineering a parent antibody to mutant antibodies having a desired property have been published. However, engineering or evolving a parent antibody to be inactive or virtually inactive (less than 10% activity and especially less than 5% activity) at the normal physiological condition, while having activity at an aberrant condition that is equivalent or better than the original activity of the parent antibody at the normal physiological condition, requires that destabilizing mutation(s) co-exist with activity increasing mutations that do not counter the destabilizing effect. It is expected that destabilizing mutations would reduce the antibody's activity by an amount greater than is predicted by standard rules such as the Q10 rule. Therefore the ability to evolve proteins that work efficiently (more active) at a specific aberrant condition, e.g. a lower temperature or pH, than the evolved protein at a normal physiological condition, or even being substantially inactive at the normal physiological condition, creates a surprising new class of antibodies referred to as conditionally active proteins. For example, the conditionally active proteins may have a ratio of activity at the aberrant condition to the activity at the normal physiological condition greater than the same ratio for the parent protein. In some cases, the ratio for the conditionally active proteins may be at least about 2:1, or at least about 4:1, or at least about 6:1, or at least about 10:1, or at least about 20:1, or at least about 50:1, or at least about 80:1, or at least about 100:1.

The present invention provides a new class of multi-specific antibodies that are conditionally active for at least one epitope or antigen. This new class of multi-specific antibodies can take advantage of the flexibility and versatility of traditional multi-specific antibodies, and while at the same time directing the activity, affinity and/or avidity of the multi-specific antibodies to locations, tissues or organs of a subject where the activity is desired.

SUMMARY OF THE DISCLOSURE

In one aspect, the disclosure provides a multi-specific antibody comprising at least one binding site for a cell antigen; and at least one binding site for a tumor-reactive lymphocyte antigen. The multi-specific antibody binds to at least one of the cell antigen and tumor-reactive lymphocyte antigen with a greater activity, affinity and/or avidity at a first physiological condition than at a second physiological condition.

In the previous embodiment, the cell antigen may be a cancer cell associated antigen, or the cancer cell associated antigen may be a neoantigen.

In any one of the previous embodiments, the cell antigen may be a senescent cell associated antigen.

In any one of the previous embodiments, the first physiological condition may be an aberrant condition and the second physiological condition may be a normal physiological condition.

In the previous embodiment, the aberrant condition may be a condition in a tumor microenvironment or a condition in a senescent cell microenvironment.

In any of the previous embodiments, the binding of the multi-specific antibody to at least one of the cell antigen and tumor-reactive lymphocyte antigen may be reversible.

In any one of the previous embodiments, the multi-specific antibody may be configured in a format selected from: (1) bispecific antibody conjugates; (2) hybrid bispecific IgG2; (3) variable domain only bispecific antibody molecules; (4) CH1/CL fusion proteins; (5) Fab fusion proteins; (6) non-immunoglobulin fusion proteins; (7) Fc-modified IgGs; (8) appended and Fc-modified IgGs; (9) modified Fc and CH3 fusion proteins; (10) appended IgGs-HC fusions; (11) appended IgGs-LC fusions; (12) appended IgGs-HC&LC fusions; (13) Fc fusions; (14) CH3 fusions; (15) IgE/IgM CH2 fusions; (16) F(ab')2 fusion; (17) CH1/CL fusion proteins; (18) modified IgGs; and (19) non-immunoglobulin fusions.

In any one of the previous embodiments, the multi-specific antibody may be conjugated to a macromolecule. The macromolecule may be selected from at least one of a protein, a fatty acid and a polymer, or the macromolecule may be an albumin or polyethylene glycol.

In any one of the previous embodiments, the at least one binding site for a cell antigen may be an IgG antibody or fragment thereof and the cell antigen may be a tumor cell antigen.

In any one of the previous embodiments, the at least one binding site for a tumor-reactive lymphocyte antigen may be a single chain antibody. The single chain antibody may be an scFv antibody. The scFv antibody may be attached to a C terminus of at least one light chain of said IgG antibody or fragment thereof via a linker. In any one of the previous embodiments wherein the antibody is an scFv antibody, the scFv antibody may comprise a light chain variable region selected from light chain variable regions having the amino acid sequences of SEQ ID NOS: 1-10 and a heavy chain variable region selected from heavy variable regions having the amino acid sequences of SEQ ID NOS: 11-15. In any one of the previous embodiments, the scFv antibody may have an amino acid sequence selected from the amino acid sequences of SEQ ID NOS: 26-71.

In any one of the previous embodiments, the IgG antibody may comprise a light chain variable region selected from light chain variable regions binding to an antigen selected from Axl, Her2, B7-H3 and EpCAM having the amino acid sequences of SEQ ID NOS: 16-17, 20, 22, and 88-95; and a heavy chain variable region selected from heavy chain variable regions binding to same antigen having the amino acid sequences of SEQ ID NOS: 18-19, 21, 23-25, and 80-87.

In any one of the previous embodiments, the tumor-reactive lymphocyte antigen may be a CD3 antigen.

In any one of the previous embodiments, the tumor-reactive lymphocyte antigen may be on a lymphocyte selected from T cells, macrophages, Jurkat cells, monocytes, NK cells, neutrophils, eosinophils, basophils, and lymphokine-activated killer cells.

In any one of the previous embodiments, the cell antigen may be selected from Axl, EpCAM, Ror2, Her2, and B7-H3.

In any one of the previous embodiments, the multi-specific antibody may bind to the cell antigen with a greater affinity at the first physiological condition than at the second physiological condition.

In any one of the previous embodiments, the multi-specific antibody may bind to the tumor-reactive lymphocyte antigen with a greater affinity at the first physiological condition than at the second physiological condition.

In any one of the previous embodiments, the multi-specific antibody may bind to both the cell antigen and the tumor-reactive lymphocyte antigen with a greater affinity at the first physiological condition than at the second physiological condition.

In any one of the previous embodiments, the multi-specific antibody may bind to a combination of the cell antigen and the tumor-reactive lymphocyte antigen with a greater avidity at the first physiological condition than at the second physiological condition.

In another aspect, the disclosure provides a second embodiment of multi-specific antibody comprising an IgG antibody or fragment thereof that binds to a first antigen; and at least one scFv antibody that binds to a second antigen that is different from the first antigen and the at least one scFv antibody is linked to a C terminus of at least one light chain of said IgG antibody or fragment, and said multi-specific antibody reversibly binds to at least one of the first antigen and the second antigen with a greater affinity and/or avidity at an aberrant condition than at a normal physiological condition.

In the second embodiment, the second antigen may be a CD3 antigen.

In any one of the previous second embodiments, the scFv antibody may comprise a light chain variable region selected from light chain variable regions having the amino acid sequences of SEQ ID NOS: 1-10 and a heavy chain variable region selected from heavy variable regions having the amino acid sequences of SEQ ID NOS: 11-15. In any one of the previous embodiments, the scFv antibody may have an amino acid sequence selected from the amino acid sequences of SEQ ID NOS: 26-71.

In any one of the previous second embodiments, the IgG antibody or fragment may comprise a light chain variable region selected from light chain variable regions binding to an antigen selected from Axl, Her2, B7-H3 and EpCAM having the amino acid sequences of SEQ ID NOS: 16-17, 20, 22, and 88-95; and a heavy chain variable region selected from heavy chain variable regions binding to same antigen having the amino acid sequences of SEQ ID NOS: 18-19, 21, 23-25, and 80-87.

In any one of the previous second embodiments, the multi-specific antibody may bind to the first antigen with a greater affinity at the aberrant condition than at the normal physiological condition.

In any one of the previous second embodiments, the multi-specific antibody may bind to the second antigen with a greater affinity at the aberrant condition than at the normal physiological condition.

In any one of the previous second embodiments, the multi-specific antibody may bind to both of the first antigen and second antigen with a greater affinity at the aberrant condition than at the normal physiological condition.

In any one of the previous second embodiments, the multi-specific antibody may bind to a combination of the first and second antigens with a greater avidity at the first physiological condition than at the second physiological condition.

In any one of the previous second embodiments, the first antigen may be a cell surface antigen and such cell surface antigen may be cancer cell surface antigen. In any one of the previous second embodiments, the first antigen may be a neoantigen. In any one of the previous second embodiments, the first antigen may be selected from Axl, EpCAM, Ror2, Her2, and B7-H3.

In yet another aspect, the disclosure provides a method for making a multi-specific antibody, comprising: a) obtaining an IgG antibody or fragment thereof that binds to a first antigen; b) linking at least one scFv antibody that binds to a second antigen to a C-terminus of at least one light chain of said IgG antibody or fragment to produce one or more constructs; c) screening the one or more constructs of b) for binding to at least one of the first antigen and the second antigen under an aberrant condition and a normal physiological condition; and d) selecting a multi-specific antibody from the one or more constructs that reversibly binds to at least one of the first antigen and the second antigen with a greater affinity at the aberrant condition than at the normal physiological condition.

In the previous method, the first antigen may be a tumor cell antigen which may be selected from Axl, EpCAM, Ror2, Her2, and B7-H3, or a neoantigen.

In any one of the previous methods, the second antigen may be a tumor-reactive lymphocyte antigen such as CD3. The tumor-reactive lymphocyte antigen may be on a lymphocyte selected from T cells, macrophages, Jurkat cells, monocytes, NK cells, neutrophils, eosinophils, basophils, and lymphokine-activated killer cells.

In any one of the previous methods, the scFv antibody may comprise a light chain variable region selected from light chain variable regions having the amino acid sequences of SEQ ID NOS: 1-10 and a heavy chain variable region selected from heavy variable regions having the amino acid sequences of SEQ ID NOS: 11-15. In any one of the previous embodiments, the scFv antibody may have an amino acid sequence selected from the amino acid sequences of SEQ ID NOS: 26-71.

In any one of the previous methods, the IgG antibody may comprise a light chain variable region selected from light chain variable regions binding to an antigen selected from Axl, Her2, B7-H3, and EpCAM having the amino acid sequences of SEQ ID NOS: 16-17, 20, 22, and 88-95; and a heavy chain variable region selected from heavy chain variable regions binding to same antigen having the amino acid sequences of SEQ ID NOS: 18-19, 21, 23-25, and 80-87.

In any one of the previous methods, the multi-specific antibody may bind to the first antigen with a greater affinity at the aberrant condition than at the normal physiological condition.

In any one of the previous methods, the multi-specific antibody may bind to the second antigen with a greater affinity at the aberrant condition than at the normal physiological condition.

In any one of the previous methods, the multi-specific antibody may bind to both of the first antigen and the second antigen with a greater affinity at the aberrant condition than at the normal physiological condition.

In any one of the previous methods, the multi-specific antibody may bind to a combination of both the first antigen and the second antigen with a greater avidity at the aberrant condition than at the normal physiological condition.

In yet another aspect, the disclosure provides a method of treating a tumor in a subject comprising administering the multi-specific antibody of any one of the previous embodiments.

In the treatment method, the multi-specific antibody may be administered in conjunction with a cancer neoantigen vaccine or the multi-specific antibody may be administered after administration of the cancer neoantigen vaccine.

In yet another aspect, the disclosure provides a method for making a multi-specific antibody, comprising steps of: a) obtaining an IgG antibody or fragment thereof that binds to a first antigen; b) obtaining an scFv antibody that binds to a second antigen; c) evolving one or both of the antibodies of a) and b) to produce one or more evolved antibodies; d) screening the one or more evolved antibodies of c) to select antibodies that bind to their respective antigens with greater affinity under an aberrant condition than under a normal physiological condition; e) linking an scFv antibody that binds to the second antigen to a C-terminus of at least one light chain of an IgG antibody or fragment that binds to the first antigen to produce one or more constructs, wherein at least one of the scFv antibody and the IgG antibody are selected in d), and, if present, the scFv antibody or the IgG antibody not selected in d) is from steps a) or b); f) screening the one or more constructs of step e) under the aberrant condition and the normal physiological condition for binding to at least one of the first antigen and the second antigen; and g) selecting a multi-specific antibody from the one or more constructs that binds to at least one of the first antigen and the second antigen with a greater affinity at the aberrant condition than at the normal physiological condition.

In yet another aspect, the disclosure provides a method of making a multi-specific antibody, comprising steps of: a) obtaining an IgG antibody or fragment thereof that binds to a first antigen; b) linking at least one scFv antibody that binds to a second antigen to a C-terminus of at least one light chain of said IgG or fragment thereof to produce one or more constructs, wherein said at least one scFv antibody binds to said second antigen with greater affinity at an aberrant condition than at a normal physiological condition; c) screening the one or more constructs under the normal physiological condition and the aberrant condition for binding said first antigen and said second antigen; and d) selecting a multi-specific antibody that binds said first antigen and reversibly binds said second antigen with a greater affinity at said aberrant condition than at said normal physiological condition.

In yet another aspect, the disclosure provides a multi-specific antibody, comprising an IgG antibody or fragment thereof that binds to a cell-specific antigen and at least one scFv antibody that binds to a T-lymphocyte antigen linked to a C terminus of at least one light chain or at least one heavy chain of said IgG antibody or fragment thereof, wherein said at least one scFv antibody binds to said T-lymphocyte antigen with a greater affinity at an aberrant condition than at a normal physiological condition.

DEFINITIONS

Figure 1:
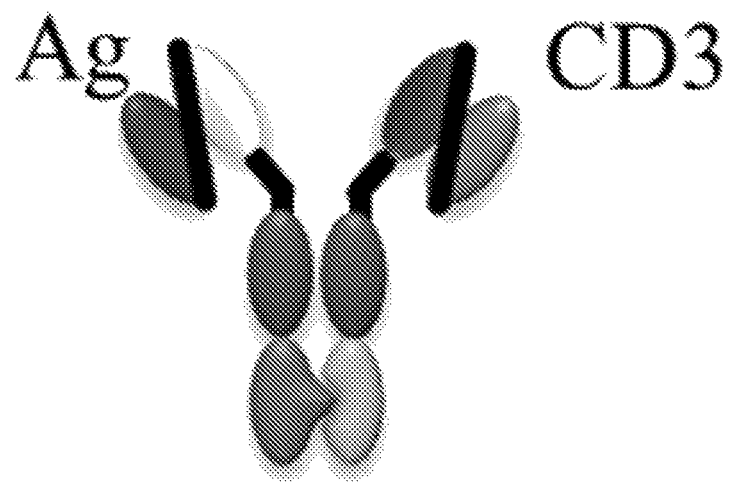
FIG. 1 is a schematic structure of a bi-valent multi-specific antibody that is a hetero-dimer with one arm for binding to an antigen (Ag) and the other arm for binding to CD3.

In order to facilitate understanding of the examples provided herein, certain frequently occurring methods and/or terms will be defined herein.

The definitions of the terms "about," "activity," "agent," "ambiguous base requirement," "amino acid," "amplification," "chimeric property," "cognate," "comparison window," "conservative amino acid substitutions," "corresponds to," "degrading effective," "defined sequence framework," "digestion," "directional ligation," "DNA shuffling," "drug" or "drug molecule," "effective amount," "electrolyte," "epitope," "enzyme," "evolution" or "evolving," "fragment," "derivative," "analog," "full range of single amino acid substitutions," "gene," "genetic instability," "heterologous," "homologous" or "homologous," "industrial applications," "identical" or "identity," "areas of identity," "isolated," "isolated nucleic acid," "ligand," "ligation," "linker" or "spacer," "microenvironment," "molecular property to be evolved," "mutations," "naturally-occurring," "normal physiological conditions" or "wild type operating conditions," "nucleic acid molecule," "nucleic acid molecule," "nucleic acid sequence coding for" or "DNA coding sequence of" or a "nucleotide sequence encoding," "promoter sequence," "nucleic acid encoding an enzyme (protein)" or "DNA encoding an enzyme (protein)" or "polynucleotide encoding an enzyme (protein)," "specific nucleic acid molecule species," "assembling a working nucleic acid sample into a nucleic acid library," "nucleic acid library," "nucleic acid construct" or "nucleotide construct" or "DNA construct," "construct," "oligonucleotide" or "oligo," "homologous," "operably linked," "operably linked to," "parental polynucleotide set," "patient" or "subject," "physiological conditions," "population," "pro-form," "pre-pro-form," "pseudorandom," "quasi-repeated units," "random peptide library," "random peptide sequence," "receptor," "recombinant," "synthetic," "related polynucleotides," "reductive reassortment," "reference sequence," "comparison window," "sequence identity," "percentage of sequence identity," "substantial identity," "reference sequence," "repetitive index (RI)", "restriction site," "selectable polynucleotide," "sequence identity," "similarity," "specifically bind," "specific hybridization," "specific polynucleotide," "stringent hybridization conditions," "substantially identical," "substantially pure enzyme," "substantially pure," "treating," "variable segment," "variant," "working," "conditionally active antibody," "antibody-dependent cell-mediated cytotoxicity" or "ADCC," "cancer" and "cancerous," "multispecific antibody," "full length antibody," "library," "recombinant antibody," and "individual" or "subject" are the same as in WO 2016/138071 and thus are hereby incorporated by reference in their entirety herein.

The term "aberrant condition" as used herein refers to a condition that deviates from the normally acceptable range in a subject for that condition. The term "normal physiological condition" as used herein refers to a condition that is considered within a normal range at a location in a subject such as at the site of administration, or at the tissue or organ at the site of action, in a subject. In the context of this definition, senescent cells and tumor cells are not considered to be normal cells and thus conditions created by, within or in the vicinity of senescent cells and tumor cells are considered to be aberrant conditions.

The term "antibody" as used herein refers to intact immunoglobulin molecules, as well as fragments of immunoglobulin molecules, such as Fab, Fab', (Fab')$_2$, Fv, and single chain antibody (SCA) fragments, that are capable of binding to an epitope of an antigen. These antibody fragments, which retain some ability to selectively bind to an antigen (e.g., a polypeptide antigen) of the antibody from which they are derived, can be made using well known methods in the art (see, e.g., Harlow and Lane, supra), and are described further, as follows. Antibodies useful in the practice of the claimed invention may be IgG1, IgG2, IgG3, IgG4, IgM, IgA1, IgA2, sIgA, IgD or IgE. Antibodies can be used to isolate preparative quantities of the antigen by immunoaffinity chromatography. Various other uses of such antibodies are to diagnose and/or stage disease (e.g., neoplasia) and for therapeutic application to treat disease, such as for example: neoplasia, autoimmune disease, AIDS, cardiovascular disease, infections, and the like. Chimeric, human-like, humanized or fully human antibodies are particularly useful for administration to human patients.

An Fab fragment consists of a monovalent antigen-binding fragment of an antibody molecule, and can be produced by digestion of a whole antibody molecule with the enzyme papain, to yield a fragment consisting of an intact light chain and a portion of a heavy chain.

An Fab' fragment of an antibody molecule can be obtained by treating a whole antibody molecule with pepsin, followed by reduction, to yield a molecule consisting of an intact light chain and a portion of a heavy chain. Two Fab' fragments are obtained per antibody molecule treated in this manner.

An (Fab')2 fragment of an antibody can be obtained by treating a whole antibody molecule with the enzyme pepsin, without subsequent reduction. A $(Fab')_2$ fragment is a dimer of two Fab' fragments, held together by two disulfide bonds.

An Fv fragment is defined as a genetically engineered fragment containing the variable region of a light chain and the variable region of a heavy chain expressed as two chains.

A single chain antibody ("SCA") is a genetically engineered single chain molecule containing the variable region of a light chain and the variable region of a heavy chain, linked by a suitable, flexible polypeptide liner, and which may include additional amino acid sequences at the amino- and/or carboxyl-termini. As an example a scFv antibody is a single-chain antibody. For example, a single chain antibody may include a tether segment for linking to the encoding polynucleotide. A functional single chain antibody generally contains a sufficient portion of the variable region of a light chain and a sufficient region of the variable region of a heavy chain so as to retain the property of a full-length antibody for binding to a specific target molecule or epitope. Single-chain antibodies are generally proteins consisting of one or more polypeptide segments of at least 10 contiguous amino substantially encoded by genes of the immunoglobulin superfamily (e.g., see *The Immunoglobulin Gene Superfamily*, A. F. Williams and A. N. Barclay, in Immunoglobulin Genes, T. Honjo, F. W. Alt, and THE. Rabbits, eds., (1989) Academic press: San Diego, Calif., pp. 361-368), most frequently encoded by a rodent, non-human primate, avian, porcine bovine, ovine, goat, or human heavy chain or light chain gene sequence. A functional single-chain antibody generally contains a sufficient portion of an immunoglobulin superfamily gene product so as to retain the property of binding to a specific target molecule, typically a receptor or antigen (epitope).

The term "antigen" or "Ag" as used herein is defined as a molecule that provokes an immune response. This immune response may involve either antibody production, or the activation of specific immunologically-competent cells, or both. A person skilled in the art will understand that any macromolecule, including virtually all proteins or peptides, and polysaccharides, nucleic acids or lipids, can serve as an antigen. Furthermore, antigens can be derived from recombinant or genomic DNA. A person skilled in the art will understand that any DNA, which includes a nucleotide sequence or a partial nucleotide sequence encoding a protein that elicits an immune response therefore encodes an "antigen" as that term is used herein. Furthermore, a person skilled in the art will understand that an antigen need not be encoded solely by a full length nucleotide sequence of a gene. It is readily apparent that the present invention includes, but is not limited to, the use of partial nucleotide sequences of more than one gene and that these nucleotide sequences are arranged in various combinations to elicit the desired immune response. Moreover, a skilled person will understand that an antigen need not be encoded by a "gene" at all. It is readily apparent that an antigen can be generated, synthesized or can be derived from a biological sample. Such a biological sample can include, but is not limited to a tissue sample, a tumor sample, a cell or a biological fluid.

The term "avidity" as used herein refers to the combined strength of multiple binding sites between two molecules, such as between multiple antigen binding sites of a multi-specific antibody simultaneously interacting with two targets. When more than one binding interaction is present, the two molecules will only dissociate when all binding sites dissociate, and thus, the dissociation rate will be slower than for the individual binding sites, thereby providing a greater effective total binding strength (avidity) compared to the strength of binding of the individual binding sites (affinity). Thus, the avidity is related to both the affinity of individual binding site and specific epitopes, and also the valence of the multi-specific antibody and the antigen. For example, the interaction between a bispecific antibody and an antigen with a repeating epitope structure, such as a polymer, would be one of high avidity because the binding can be to multiple epitopes on the antigen.

The terms "cancer" and "cancerous" as used herein refer to the physiological condition in mammals that is typically characterized by unregulated cell growth. Examples of cancer include, but are not limited to B-cell lymphomas (Hodgkin's lymphomas and/or non-Hodgkins lymphomas), brain tumor, breast cancer, colon cancer, lung cancer, hepatocellular cancer, gastric cancer, pancreatic cancer, cervical cancer, ovarian cancer, liver cancer, bladder cancer, cancer of the urinary tract, thyroid cancer, renal cancer, carcinoma, melanoma, head and neck cancer, brain cancer, and prostate cancer, including but not limited to androgen-dependent prostate cancer and androgen-independent prostate cancer.

The term "cell antigen" or "cell associated antigen" as used herein refers to any protein, carbohydrate or other component derived from or expressed by a cell which is capable of eliciting an immune response. For example, the cell may be any cell in the subject, particularly a cancer cell and senescent cell. The cell antigen may be an antigen on the surface of the cell or inside of the cell. The definition is meant to include, but is not limited to, proteins purified from the cell surface or membrane of a cell, or unique carbohydrate moieties associated with the cell surface of a cell. The definition also includes those antigens from the surface of the cell which require special treatment of the cells to be accessed by an antibody of the present invention.

The term "conditional activity" or "conditionally active" refers to an affinity or avidity of a multi-specific antibody that is higher at one or more aberrant conditions as compared to at a normal physiological condition. This conditionally active multi-specific antibody can exhibit activity in selected regions of the body and/or exhibits increased or decreased activity under aberrant, or permissive, physiological conditions.

In one aspect, the conditionally active multi-specific antibody is virtually inactive at a normal physiological condition but is active at the aberrant condition. For example, in one aspect, the conditionally active multi-specific antibody is virtually inactive at a normal physiological pH, but is active at lower pH in the dementia brain or tumor microenvironment. In another aspect, the conditionally active multi-specific antibody may be reversibly or irreversibly inactivated at the normal physiological pH. In a further aspect, the conditionally active multi-specific antibody is derived from a therapeutic protein. In another aspect, the conditionally active multi-specific antibody is used as a drug, or therapeutic agent.

The term "epitope" or "antigenic determinant" as used herein refers to a site on an antigen to which an antibody binds. Epitopes can be formed both from contiguous amino acids (linear epitope) or noncontiguous amino acids juxtaposed by tertiary folding of a protein (conformational epitopes). Epitopes formed from contiguous amino acids are typically retained on exposure to denaturing solvents whereas epitopes formed by tertiary folding are typically lost on treatment with denaturing solvents. An epitope can comprise 3 or more amino acids. Usually an epitope consists of at least 5 to 7 amino acids (such as 5, 6, or 7 amino acids in an epitope), or of at least 8-11 amino acids (such as 8, 9, 10 or 11 amino acids in an epitope), or of more than 11 amino acids (such as 12, 13, 14, 15, 16, 17, 18, 19 or 20 amino acid in an epitope), or of more than 20 amino acids (such as 21, 22, 23, 24, 25, 26, 27, 28, 29, or 30 amino acid in an epitope), less frequently even of 31-40 amino acids. Methods of determining spatial conformation of epitopes include, for example, x-ray crystallography and 2-dimensional nuclear magnetic resonance. See, e.g., *Epitope Mapping Protocols in Methods in Molecular Biology*, Vol. 66, Glenn E. Morris, Ed (1996). A preferred method for epitope mapping on an antigen is surface plasmon resonance.

The term "full length antibody" refers to an antibody which comprises an antigen-binding variable region ($V_H$ or $V_L$) as well as a light chain constant domain ($C_L$) and heavy chain constant domains, CH1, CH2 and CH3. The constant domains may be native sequence constant domains (e.g. human native sequence constant domains) or amino acid sequence variants thereof. Depending on the amino acid sequence of the constant domain of their heavy chains, full length antibodies can be assigned to different "classes". There are five major classes of full length antibodies: IgA, IgD, IgE, IgG, and IgM, and several of these may be further divided into "subclasses" (isotypes), e.g., IgG1, IgG2, IgG3, IgG4, IgA, and IgA2. The heavy-chain constant domains that correspond to the different classes of antibodies are called alpha, delta, epsilon, gamma, and mu, respectively.

An "individual," "patient" or "subject" is a human or an animal. For example, the subject may be a mammal selected from domesticated animals (e.g., cows, sheep, cats, dogs, and horses), primates (e.g., humans and non-human primates such as monkeys), rabbits, and rodents (e.g., mice and rats).

The term "library" as used herein refers to a collection of nucleic acids or proteins in a single pool. The library may be generated using DNA recombinant technology. For example, a collection of cDNAs or any other protein coding DNAs may be inserted in an expression vector to generate a protein library. A collection of cDNAs or protein coding DNAs may also be inserted into a phage genome to generate a bacteriophage display library of wild-type proteins. The collection of cDNAs may be produced from a selected cell population or a tissue sample, such as by the methods disclosed by Sambrook et al. (Molecular Cloning, Cold Spring Harbor Laboratory Press, 1989). cDNA collections from selected cell types are also commercially available from vendors such as Stratagene®. The library of wild-type proteins as used herein is not a collection of biological samples.

The term "multi-specific antibody" as used herein is a full-length antibody, an antibody fragment or a construct comprising one or more full-length antibodies and antibody fragments, which has at least two different binding sites each capable of binding to an epitope on the same or different antigen. The construct may be engineered antibodies with two, three or more (e.g. four, five, six, or seven) functional antigen binding sites are also encompassed within the scope of the multi-specific antibody (see, e.g., US 2002/0004587 A1 and Brinkman and Kontermann, *MAbs, vol.* 9, pp. 182-212, 2017).

The term "pharmaceutically acceptable salt" as used herein refers to a salt form of the conditionally active multi-specific antibody of the present invention. The salt form may be acid addition salts (e.g., formed with free amino groups) and which are formed with inorganic acids such as hydrochloric or phosphoric acids, or such organic acids such as acetic, oxalic, tartaric and maleic. Salts formed with the free carboxyl groups may also be derived from inorganic bases such as sodium, potassium, ammonium, calcium, or ferric hydroxides, and organic bases as isopropylamine, trimethylamine, 2-ethylamino ethanol, histidine and procaine.

The term "prophylactically effective amount" as used herein means any amount which, as compared to a corresponding subject who has not received such amount, results in, but is not limited to prevention, or amelioration of a disease, disorder, or side effect, or a decrease in the rate of advancement of a disease or disorder. The term also includes within its scope amounts effective to enhance normal physiological function as well as amounts effective to cause a physiological function in a patient which enhances or aids in the therapeutic or prophylactic effect of a second pharmaceutical agent The term "preventing" as used herein refers to avert or avoid a condition from occurring. In some embodiments, preventing is directed to use the multi-specific antibody of the present invention to ameliorate the damage associated with a condition, such as tumor or aging related conditions.

The term "small molecule" as used herein refers to molecules or ions that have a molecular weight of less than 900 Da, or less than 500 Da or less than 200 Da or less than 100 Da. In the assays and environments of the present invention, small molecules may often be present as a mixture of the molecule and a deprotonated ion of the molecule, depending primarily on the pH of the assay or environment.

The term "therapeutically effective amount" as used herein means any amount of the multi-specific antibody of the present invention, which, as compared to a corresponding subject who has not received such amount, results in, but is not limited to, healing, prevention, or amelioration of a disease, disorder, or side effect, or a decrease in the rate of advancement of a disease or disorder. The term also includes within its scope amounts effective to enhance normal physiological function as well as amounts effective to cause a physiological function in a patient which enhances or aids in the therapeutic effect of a second pharmaceutical agent.

The term "treating" or "treatment" includes reducing the number of symptoms or reducing the severity, duration, or frequency of one or more symptoms of disease or disorder (e.g., a cancer) in a subject.

The term treating can also mean delaying the onset or progression of symptoms, or progression of severity of symptoms, of the disorder or disorder in a subject, or increasing the longevity of a subject having the disorder or disorder.

The term "tumor," as used herein refers to all neoplastic cell growth and proliferation, whether malignant or benign, and all pre-cancerous and cancerous cells and tissues. The term "tumor microenvironment" refers to any and all elements of the tumor milieu including elements that create a structural and or functional environment for the malignant process to survive and/or expand and/or spread.

The term "unit dosage form" as used herein refers to physically discrete units suitable as unitary dosages for a subject, each unit containing a predetermined quantity of conditionally active multi-specific antibody of the present invention calculated in an amount of the multi-specific antibody of the present invention sufficient to produce the desired therapeutic effect in association with a pharmaceutically acceptable diluent, carrier or vehicle.

DETAILED DESCRIPTION

It must be noted that as used herein and in the appended claims, the singular forms "a", "an", and "the" include plural references unless the context clearly dictates otherwise. Furthermore, the terms "a" (or "an"), "one or more," and "at least one" can be used interchangeably herein. The terms "comprising," "including," "having," and "constructed from" can also be used interchangeably.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4. It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

In one aspect, the present invention provides a multi-specific antibody comprising at least one binding site for a cell antigen and at least one binding site for a tumor-reactive lymphocyte antigen. The multi-specific antibody binds to at least one cell antigen and the tumor-reactive lymphocyte antigen with a greater affinity at a first physiological condition than at a second physiological condition. In some embodiments, the first physiological condition is an aberrant condition and the second physiological condition is a normal physiological condition. For example, the aberrant condition may be a condition in a tumor microenvironment. The multi-specific antibody of the present invention may be referred to as a conditionally active multi-specific antibody. As another example, the aberrant condition may be a condition in a senescent cell microenvironment. In this context, the senescent cells are characterized as aberrant since they are not the same as the normal cells that were previously present at the same location prior to the senescence taking place. The aberrant condition in the senescent cell microenvironment may be an acidic pH, a lower oxygen concentration and/or the senescence-associated secretory phenotype (SASP).

In some embodiments, the conditionally active multi-specific antibody is virtually inactive at a normal physiological condition but is active at an aberrant condition, optionally having a level of activity that is higher than the activity of the conditionally active multi-specific antibody at a normal physiological condition or the activity at a normal physiological condition of the parent antibody from which it is derived. In another embodiment, the conditionally active multi-specific antibody is virtually inactive at a pH of 7.2-7.4, but is active at a lower pH of 6.0-6.8. In some cases, the conditionally active multi-specific antibody is reversibly or irreversibly inactivated at the normal physiological condition. In another example, the conditionally active multi-specific antibody may be more or less active in highly oxygenated blood, such as, for example, after passage through the lung or in the lower pH environments found in the tumor microenvironment. The conditionally active multi-specific antibody may be used as a drug, therapeutic agent or diagnostic agent.

In some embodiments, the binding of the multi-specific antibody to the cell antigen and/or tumor-reactive lymphocyte antigen is reversible. Meaning that the multi-specific antibody may bind to the cell antigen and/or tumor-reactive lymphocyte antigen, followed by separation of the two. The separated multi-specific antibody is capable of binding to the cell antigen and/or tumor-reactive lymphocyte antigen again.

In some embodiments, the cell antigen may be a cell surface antigen or an interior antigen of the cell. The cell may be targeted by the tumor-reactive lymphocyte for inhibition, damage, destruction or killing. The cell may be referred to as a target cell. Thus, the cell may be targeted in a treatment with the multi-specific antibody of the present invention. Specifically, for treatment of some diseases or conditions, cells may be targeted for removal. For example, cancer cells and senescent cells may be targeted for removal. In these cases, the cell antigen may be a cancer cell antigen or senescent cell antigen.

In some embodiments, the cell antigen is an antigen preferentially associated with the target cell but less prevalent with other cell types. In this manner, the multi-specific antibody of the present invention can preferentially interact with the target cell. The target cell may be cancer cell. Examples of cancer cell specific antigens include 4-IBB, 5T4, adenocarcinoma antigen, alpha-fetoprotein, BAFF, B-lymphoma cell, C242 antigen, CA-125, carbonic anhydrase 9 (CA-IX), C-MET, CCR4, CD152, CD19, CD20, CD200, CD22, CD221, CD23 (IgE receptor), CD28, CD30 (TNFRSF8), CD33, CD4, CD40, CD44 v6, CD51, CD52, CD56, CD74, CD80, CEA, CNT0888, CTLA-4, DR5, EGFR, EpCAM, CD3, FAP, fibronectin extra domain-B, folate receptor 1, GD2, GD3 ganglioside, glycoprotein 75, GPNMB, HER2/neu, B7-H3, Axl, Ror2, HGF, human scatter factor receptor kinase, IGF-1 receptor, IGF-I, IgG1, LI-CAM, IL-13, IL-6, insulin-like growth factor I receptor, integrin α5β1, integrin αvβ3, MORAb-009, MS4A1, MUC1, mucin CanAg, N-glycolylneuraminic acid, NPC-1C, PDGF-R a, PDL192, phosphatidylserine, prostatic carcinoma cells, RANKL, RON, ROR1, SCH 900105, SDC1, SLAMF7, TAG-72, tenascin C, TGF beta 2, TGF-β, TRAIL-R1, TRAIL-R2, tumor antigen CTAA16.88, VEGF-A, VEGFR-1, VEGFR2, and vimentin.

In one embodiment, the cancer cell specific antigen is selected from CD3, Axl, EpCAM, Her2, Ror2 and B7-H3.

In one embodiment, the targeted cancer cell is a breast cancer cell in which case the breast cancer cell specific antigen may be one of EpCAM (epithelial cell adhesion molecule), Her2/neu (Human Epidermal growth factor Receptor 2), MUC-1, EGFR (epidermal growth factor receptor), TAG-12 (tumor associated glycoprotein 12), IGFI R (insulin-like growth factor 1 receptor), TACSTD2 (tumor associated calcium signal transducer 2), CD318, CD340, CD 104, and N-cadherin.

In another embodiment, the cancer cell is a prostate cancer cell in which case the prostate cancer cell specific antigen may be one of EpCAM, MUC-1, EGFR, PSMA (prostate specific membrane antigen), PSA (prostate specific antigen), TACSTD2, PSCA (prostate stem cell antigen), PCSA (prostate cell surface antigen), CD318, CD104, and N-cadherin.

In yet another embodiment, the cancer cell is a colorectal cancer cell in which case the colorectal cancer cell specific antigen may be one of EpCAM, CD66c, CD66e, CEA (carcinoembryonic antigen), TACSTD2, CK20 (cytokeratin 20), CD104, MUC-1, CD318, and N-cadherin.

In a still further embodiment, the cancer cell is a lung cancer cell in which case the lung cancer cell specific antigen may be one or CK18, CK19, CEA, EGFR, TACSTD2, CD318, CD104, and EpCAM.

In another embodiment, the cancer cell is a pancreatic cancer cell in which case the pancreatic cancer cell specific antigen may be one of HSP70, mHSP70, MUC-1, TACSTD2, CEA, CD104, CD318, N-cadherin, and EpCAM.

In a further embodiment, the cancer cell is an ovarian cancer cell in which case the ovarian cancer cell specific antigen may be one of MUC-1, TACSTD2, CD318, CD 104, N-cadherin, and EpCAM.

In yet another embodiment, the cancer cell is a bladder cancer cell in which case the bladder cancer cell specific antigen may be one of CD34, CD146, CD62, CD105, CD106, VEGF receptor (vascular endothelial growth factor receptor), MUC-1, TACSTD2, EpCAM, CD318, EGFR, 6B5 and Folate binding receptor.

In some cases, the cancer cell is a cancer stem cell in which case the cancer stem cell specific antigen may be one of CD133, CD135, CD 117, and CD34.

In another case, the cancer cell is a melanoma cancer cell in which case the melanoma cancer cell specific antigen may be one of the melanocyte differentiation antigens, oncofetal antigens, SEREX antigens. Examples of melanocyte differentiation antigens, include but are not limited to, tyrosinase, gp75, gplOO, MART 1 or TRP-2. Examples of oncofetal antigens include antigens in the MAGE family (MAGE-A1, MAGE-A4), BAGE family, GAGE family, and NY-ESOL. Examples of SEREX antigens include D-1 and SSX-2. More examples of tumor-specific antigens include CDK4 and 13-catenin.

In some embodiments, the cancer cell antigen is a neoantigen. Examples are given in Table 1.

TABLE 1

| Neoantigens | |
| --- | --- |
| Cancer type | Neoantigens |
| Melanoma | BRAF-V 600E/D/G/K/M/L |
| | BRAF-L597RIS/V/Q |
| | BRAF-D594VIGI A/E/V/R/Q/S |
| | CTNNB1-S45P/Y IF |
| | KIT-V559D/A |
| | Melanoma KIT-W557R |
| | KIT-L576P |
| | KIT-K642E |
| | NRAS-Q61P/H/L/R/E/K |
| | NRAS-G13V/A/D/C/R |
| | NRAS-G12V/A/D/C/R/S |
| Non-small cell lung carcinoma | AKTI-E17K |
| | EGFR-G719A/S/C/D |
| | EGFR-T790M |
| | EGFP-L858R |
| | KRAS-G 12S/R/C/A/D |
| | KRAS-Q61R/L/P/K/H |
| | KRAS-G 13A/D/C/R/S |
| | NRAS-G 12C/S/A/D |
| | NRAS-Q61P/H/R/L/K |
| | PIK3CA-E542K |
| | PIK3CA-E545K1Q/A/G/V |
| | PIK3CA-H1047L/R |
| | PTEN-R159S |
| Acute myeloid leukemia | IDHI-R132C/G/S/LIP/H |
| | IDH2-R140Q/W/L |
| | IDH2-R172S/K/M |
| | JAK2-V617F |
| | KRAS-Q61R/L/P/K/H |
| | NRAS-Q61P/H/L/R/E/K |
| | NRAS-G13V/A/D/C/R |
| | NRAS-G 12V/A/D/C/R/S |
| | KIT-D816V |
| | FLT3-D835E/F/H/N/V/A/Y |
| | FLT3-1836LIM |
| Lung cancer | BRAF-V600E |
| | BRAF-L597V |
| | BRAF-G469A |
| | BRAF-Y472C |
| | BRAF-G466V |
| Breast cancer | AKTI-E17K |
| | PIK3CA-E542K |
| | PIK3CA-E545K/Q/A/G/V |
| | PIK3CA-Q546E/K/P/R/L/N |
| | PIK3CA-H1047L/R |
| | PTEN-R159S |

TABLE 1-continued

Neoantigens

| Cancer type | Neoantigens |
|---|---|
| Ovarian cancer | BRAF-V600E |
| | BRAF-L597R |
| | KRAS-G 12C/R/V/A/D |
| | KRAS-G13A/D/C/R |
| | PI3K3CA-P542K |
| | PIK3CA-E545K/Q/A/G/V |
| | PIK3CA-Q546E/K/P/R/L/N |
| | PIK3CA-H1047L/R |
| | PTEN-P130G/Q |
| Colorectal cancer | AKTI-E17K |
| | BRAF-V600E |
| | BRAF-D594G/V |
| | BRAF-G466V |
| | KRAS-G13S |
| | KRAS-Q61R/L/P/K/H |
| | KRAS-G 13A/D/C/R/SV |
| | KRAS-A146P/T/V |
| | NRAS-Q61P/H/L/R/E/K |
| | NRAS-G 12V/A/D/C/R/S |
| | PIK3CA-E542K |
| | PIK3CA-E545K/Q/A/G/V |
| | PIK3CA-Q546E/K/P/R/L/N |
| | PIK3CA-H1047L/R |
| | PTEN-R159S |
| | SMAD-R361H/C/S |
| Brain cancer | BRAF-V600E |
| | IDHI-R132G/C/S/L/P/H |
| | IDH2-R172S/M/K |
| | IDH2-R140Q |
| Gastrointestinal stromal tumor | IBRAF-V600E |
| | KIT-V559D |
| Thyroid cancer | BRAF-V600E |
| | KRAS--Q61 K/L/R/P |
| | KRAS-G 12C/R/S/V/D |
| | IIKRAS-G 13A/D/C/R/S |
| | KRAS-A146V |

In some embodiments, the cell specific antigen is selected from senescent cell specific antigens which may include APC, ARHGAP1, ARMCX-3, AXL, 1B2MG, BCL2L1, CAPNS2, CD261, CD39, CD54, CD73, CD95, CDC42, CDKN2C, CLYBL, COPG1, CRKL, DCR1, DCR2, DCR3, DEP1, DGKA, EBP, EBP50, FASL, FGF1, GBA3, GIT2, ICAM1, ICAM3, IGF1, ISG20, ITGAV, KITLG, LaminB1, LANCL1, LCMT2, LPHN1, MADCAM1, MAG, MAP3K14, MAPK, MEF2C, miR22, MMP3, MTHFD2, NAIP, NAPG, NCKAP1, Nectin4, NNMT, NOTCH3, NTAL, OPG, OSBPL3, p16, p16INK4a, p19, p21, p53, PAI1, PARK2, PFN1, PGM, PLD3, PMS2, POU5F1, PPP1A, PPPICB, PRKRA, PRPF19, PRTG, RAC1, RAPGEFI, RET, Smurf2, STX4, VAMP3, VIT, VPS26A, WEE1, YAP1, YH2AX, and YWHAE.

The other antigen bound by the multi-specific antibodies of the present invention may be a tumor-reactive lymphocyte antigen, which is an antigen of a lymphocyte that targets tumor cells. Particularly, the lymphocyte is tumor reactive when the lymphocyte can attack, inhibit or destroy tumor cells. The tumor-reactive lymphocyte may be selected from T cells, macrophages, Jurkat cells, monocytes, NK cells, activated NK cells, neutrophils, eosinophils, basophils, B-cells, and lymphokine-activated killer (LAK) cells. The T cells may be naive T cell, a helper T cell, an effector T-cell, a memory T-cell, a cytotoxic T cell, an antigen-specific T-cell, and a CD28-CD27-CD4 positive T-cell.

The antigen of the tumor-reactive lymphocyte typically includes markers on T cells such as CD2, CD3, CD4, CD8 CD25, CD28, CD27, CD45RA, CD45RO, CD62L, CD95, CD127, CD137, alpha/beta TCR, gamma/delta TCR, CCR7, PD-1 and Lag3. Some examples of antigens on the macrophages include CCR2, CD14, CD68, CD163, CSFIR and MSR1.

Without wishing to be limited by theory, the multi-specific antibody of the present invention binds to both the target cell and tumor-reactive lymphocyte to thereby bring the target cell in close proximity to the tumor-reactive lymphocyte. This is believed to facilitate an attack by the tumor-reactive lymphocyte on the target cell to thereby inhibit, damage or destroy the target cell. A therapeutic effect of inhibition or removing tumor cells and/or senescent cells may be achieved by using the multi-specific antibody of the present invention to bring the reactive lymphocyte to tumor cells and/or senescent cells for inhibition, destruction and removal of the tumor cells and/or senescent cells from the subject.

The first and second physiological conditions are different numerical values of the same condition which may be selected from temperature, pH, osmotic pressure, osmolality, oxidative stress, oxygen concentration and electrolyte concentration. For example, the first physiological condition may be an acidic pH in a tumor microenvironment in the range of from 5.2 to 7.0 or from 5.8 to 7.0 or from 6.0 to 6.8. The second physiological condition may be a normal physiological pH in the blood of the subject in the range of from 7.0 to 7.8 or from 7.2 to 7.6.

In some embodiments, the first physiological condition is a lower oxygen concentration in a tumor microenvironment and the second physiological condition is a normal physiological oxygen concentration in the blood of the subject. In some other embodiments, the first physiological condition is an aberrant condition in an environment surrounding senescent cells (a senescent cell microenvironment) such as an acidic pH and/or lower oxygen concentration. In addition, the aberrant condition in the senescent cell microenvironment also includes the senescence-associated secretory phenotype (SASP). The senescent cell in the senescent cell microenvironment is metabolically active and will secrete proteins that form a signature for the senescent cell microenvironment creating the senescence-associated secretory phenotype (Coppe et al., *Annu Rev Pathol.*, vol. 5, pp. 99-118, 2010).

The SASP, also termed senescence-messaging secretome, may include the expression/secretion of the following biologically active factors (Pawlikowski et al., *J Cell Sci*, vol. 126, pp. 4061-4067, 2013):
 i. Interleukins, such as IL-1α, IL-1β, IL-6, IL-7, IL-13, IL-15;
 ii. Chemokines, such as IL-8, MCP2, MCP4, GROα, GROβ, GROγ,
 iii. Growth factors, such as EGF, HGF, VEGF,
 iv. Receptors and ligands, such as ICAM1, ICAM3, TRAIL-R3, Fas, uPAR, sTNFRI, sTNFRIII;
 v. Proteases and regulators, such as MMP1, MMP3, MMP10, MMP12, TIMP1, TEVIP2, PAI1, PA12; and
 vi. Extracellular insoluble molecules, such as Collagens, Fibronectins, Laninins. Any one or more of these factors may be used as a condition for generating the conditional activity of the present invention.

In addition, the SASP may be additionally characterized by the following hallmarks (Pawlikowski et al., *J Cell Sci*, vol. 126, pp. 4061-4067, 2013):
 a. an enlarged, flattened morphology,
 b. $p16^{INK4a}$ expression,
 c. elevated lysosomal activity (senescence-associated b-galactosidase; SA b-gal),
 d DNA-damage response,
 e. chromatin remodeling, and
 f. autophagy.

In some embodiments, the SASP contains one or more of the following factors: IL-1a, IL-1β, IL-6, IL-7, IL-8, IL-10, IL-13, IL-15, IL-18, MCP1, MCP2, MCP4, MIF, MIP-1a, MIP-3a, HCC-4, Eotaxin-3, TECK, ENA-78, I-309, I-TAC, GROα, GROβ, GROγ, VEGF, EGF, HGF, FGF, bFGF, KGF, Amphiregulin, Epiregulin, Heregulin, SCF, SDF-1 alpha, PIGF, IGFBP-2, -3, -4, -6, -7, GM-CSF, PDGF-BB, TGF-α, TGF-β1, TGF-β2, TGF-β3, ICAM1, ICAM3, TRAIL-R3, Fas, OPG, SGP130, EGF-R uPAR, sTNFRI, sTNFRIII, MMP1, MMP3, MMP7, MMP9, MMP10, MMP12, MMPP13, MMP14, TIMP1, TIP2, PAI1, PAI2, SLPI, Endothelin, Collagens, Fibronectins, and Laminins. In some embodiments, SASP comprises one or more of the following: IL-8, GROα, VEGF, endothelin, MMP7, MMP9, MMP10, MMP12, MMP13, TIMP1, TIP2, TGF-β1. In some other embodiments, SASP comprises at least IL-8, GROα, VEGF, endothelin, MMP7, MMP9, MMP10, MMP12, MMP13, TIMP1, TIMP2 and TGF-β1. Any one or more of these factors may be used as a condition for generating the conditional activity of the present invention.

In some other embodiments, the first physiological condition is an aberrant condition at a disease site, tissue or organ. The second physiological condition is typically a normal physiological condition in the blood of the subject, such as a normal physiological pH.

The multi-specific antibody binds to at least one cell specific antigen and the reactive lymphocyte antigen, with an increased affinity at the first physiological condition in comparison with the affinity at the second physiological condition. In some embodiments, the multi-specific antibody binds the at least one of the cell specific antigen and the reactive lymphocyte antigen with an increased affinity at the first physiological condition in comparison with the affinity at the second physiological condition. For example, the multi-specific antibody may bind the cell specific antigen with an increased binding affinity at the first physiological condition in comparison with the binding affinity at the second physiological condition, while still binding to the reactive lymphocyte antigen with a non-conditional activity. In another example, the multi-specific antibody binds to the reactive lymphocyte antigen with an increased binding affinity at the first physiological condition in comparison with the binding affinity at the second physiological condition, while still binding to the cell specific antigen with a non-conditional activity. In some embodiments, the multi-specific antibody binds both the cell specific antigen and the reactive lymphocyte antigen with a higher avidity at the first physiological condition in comparison with the avidity at the second physiological condition.

The structure/format of the multi-specific antibody may be any one of the structures/formats described in Brinkmann and Kontermann, "The making of bispecific antibodies," *MABs*, vol. 9, pp. 182-212, 2017. Specifically, FIG. 2 of Brinkmann and Kontermann describes 19 different structures/formats for bispecific antibodies. These structures/formats include: (1) bispecific antibody conjugates; (2) hybrid bispecific IgG2; (3) "variable domain only" bispecific antibody molecules; (4) CH1/CL fusion proteins; (5) Fab fusion proteins; (6) non-immunoglobulin fusion proteins; (7) Fc-modified IgGs; (8) appended and Fc-modified IgGs; (9) modified Fc and CH3 fusion proteins; (10) appended IgGs-HC fusions; (11) appended IgGs-LC fusions; (12) appended IgGs-HC&LC fusions; (13) Fc fusions; (14) CH3 fusions; (15) IgE/IgM CH2 fusions; (16) F(ab')₂ fusion; (17) CH1/CL fusion proteins; (18) modified IgGs; and (19) non-immunoglobulin fusions.

Figure 2:
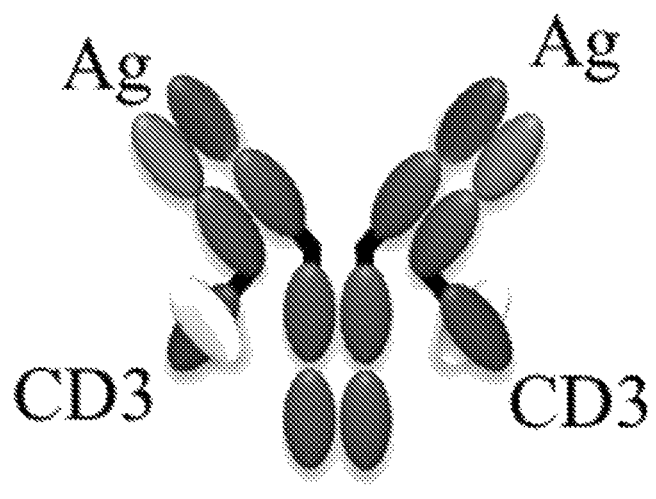
FIG. 2 is a schematic structure of a tetra-valent multi-specific antibody that is a homo-dimer with each arm having a binding site to an antigen (Ag) and a binding site to CD3.

In particular embodiments, the multi-specific antibody may be a bi-valent scFv-Fc hetero-dimer as shown in FIG. 1 or a tetra-valent homodimer "butterfly" as shown in FIG. 2. In these two structures, the reactive lymphocyte antigens are not limited to CD3, which is only depicted as a representative of a tumor-reactive lymphocyte antigen. The multi-specific antibody of FIG. 1 has a first binding site to a cell antigen (Ag), which is linked to a first heavy chain constant region (e.g., IgG) and a second binding site to a reactive lymphocyte antigen (e.g., CD3), which is linked to a second heavy chain constant region (e.g., IgG). The two heavy chains are engineered such that they can only form hetero dimers, for example, by using the knob-in-hole technique. The first and second binding sites are scFv antibodies binding to the cell antigen and reactive lymphocyte antigen, respectively. Either one or both of the first and second binding sites have a conditionally active binding activity to the respective antigen.

The multi-specific antibody of FIG. 2 may have a full-length IgG antibody binding to the cell specific antigen (Ag) and a scFv antibody binding to a reactive lymphocyte antigen (e.g., CD3). The scFv antibody is linked to the C terminus of the light chain of the IgG antibody via a linker. The linker may be a short Alanine linker $(Ala)_n$, a Serine linker $(Ser)_n$, a hydrophilic linker or a glycine-serine-rich linker. The heavy chain of the IgG antibody pairs with the light chain of the IgG antibody that has been linked to the scFv antibody, thus forming half of the homo-dimer. This multi-specific antibody has a "butterfly" configuration.

In some embodiments, the multi-specific antibody comprises an IgG antibody or fragment thereof that binds to a tumor-reactive lymphocyte antigen and a single chain antibody that binds to a tumor cell antigen, also forming a "butterfly" configuration as shown in FIG. 2. The single chain antibody may be an scFv antibody. The scFv antibody may be attached to a C terminus of the IgG antibody via a linker as described herein.

The binding sites of the multi-specific antibody of the invention each comprise a light chain variable region and a heavy chain variable region. The light chain variable region and the heavy chain variable region may be a single chain antibody format or may be a two-chain format as formed by pairing of a light chain and heavy chain (FIGS. 1-2). In a binding site that has a conditional activity, one of the light chain and heavy chain variable regions is conditionally active or both may be conditionally active. Exemplary light chain variable regions binding to CD3 include a non-conditionally active light chain variable region with an amino acid sequence of SEQ ID NO:1 and conditionally active light chain variable regions with an amino acid sequences selected from SEQ ID NOS: 2-10. Exemplary heavy chain variable regions binding to CD3 include a non-conditionally active heavy chain variable region with an amino acid sequence of SEQ ID NO: 11 and conditionally active heavy chain variable regions with amino acid sequences selected from SEQ ID NOS: 12-15.

Exemplary light chain variable regions binding to Axl include a non-conditionally active light chain variable region with an amino acid sequence of SEQ ID NO:16 and a conditionally active light chain variable region with an amino acid sequence of SEQ ID NO: 17. Exemplary heavy chain variable regions binding to Axl include a non-conditionally active heavy chain variable region with an amino acid sequence of SEQ ID NO: 18 and a conditionally active heavy chain variable region with an amino acid sequence of SEQ ID NO: 19.

An exemplary light chain variable region binding to Her2 is a non-conditionally active light chain variable region with an amino acid sequence of SEQ ID NO:20. An exemplary heavy chain variable region binding to Her2 is a non-conditionally active heavy chain variable region with an amino acid sequence of SEQ ID NO:21.

An exemplary light chain variable region binding to B7-H3 is a non-conditionally active light chain variable region with an amino acid sequence of SEQ ID NO:22. Exemplary heavy chain variable regions binding to B7-H3 include a non-conditionally active heavy chain variable region with an amino acid sequence of SEQ ID NO:23 and conditionally active heavy chain variable regions with amino acid sequences selected from SEQ ID NOS: 24-25.

Exemplary light chain variable regions binding to EpCAM are the non-conditionally active light chain variable regions with the amino acid sequences of SEQ ID NOS: 88-95. Exemplary heavy chain variable regions binding to EpCAM include non-conditionally active heavy chain variable regions with the amino acid sequences of SEQ ID NOS: 80-87. One of the light chain variable regions is combined with one of the heavy chain variable regions to form a binding site for EpCAM. The binding site for EpCAM is linked with a single chain anti-CD3 antibody having an amino acid sequence selected from the amino acid sequences of SEQ ID NOS: 26-71 to form a multi-specific antibody that binds to both EpCAM and CD3.

Some examples of multi-specific antibodies that bind to EpCAM and CD3 are shown below in Table 2.

pared to the affinity at the second physiological condition (e.g., normal physiological condition). Thus, a person skilled in the art may select proper light chain variable regions and heavy chain variable regions from those having amino acid sequences SEQ ID NOS: 1-25 and 80-95 to construct the multi-specific antibodies as shown in FIG. 1. The heavy chain fragments in FIG. 1 are selected from constant regions of IgG antibodies, including any subclass of IgG: IgG1, IgG2, IgG3, IgG4.

In some other embodiments, the multi-specific antibody may be constructed as shown in FIG. 2. Similarly, the light chain variable region and heavy chain variable region in the scFv antibody and the light chain variable region and heavy chain variable region in the full-length IgG antibody may also be selected from the light chain and heavy chain variable regions having the amino acid sequences of SEQ ID NOS: 1-25 and 80-95. At each binding site having a conditional activity, at least one of the light chain variable region and the heavy chain variable region has an increased affinity to its antigen at the first physiological condition (e.g., aberrant condition) as compared to the affinity at the second physiological condition (e.g., normal physiological condition). Thus, a person skilled in the art may select proper light chain variable regions and heavy chain variable regions from those having amino acid sequences SEQ ID NOS: 1-25 and 80-95 to construct the multi-specific antibodies shown in FIG. 2. The constant regions in FIG. 2 are selected from constant regions of IgG antibodies, including any subclass of IgG: IgG1, IgG2, IgG3, IgG4.

In some embodiments, the multi-specific antibody binds to CD3 as a tumor-reactive lymphocyte antigen and to another tumor associated antigen (TAA) as the cell specific

TABLE 2

Multi-Specific Antibodies That bind to EpCAM and CD3

| Multi-specific antibody that binds to EpCAM and CD3 | Anti-EpCAM light chain variable region | Anti-EpCAM heavy chain variable region | Anti-CD3 single chain antibody |
|---|---|---|---|
| BAP150-02-BF2 | SEQ ID NO: 88 | SEQ ID NO: 80 | SEQ ID NO: 27 |
| BAP150-02-BF3 | SEQ ID NO: 89 | SEQ ID NO: 81 | SEQ ID NO: 28 |
| BAP150-02-BF4 | SEQ ID NO: 90 | SEQ ID NO: 82 | SEQ ID NO: 29 |
| BAP150-02-BF5 | SEQ ID NO: 91 | SEQ ID NO: 83 | SEQ ID NO: 30 |
| BAP150-02-BF6 | SEQ ID NO: 92 | SEQ ID NO: 84 | SEQ ID NO: 31 |
| BAP150-02-BF7 | SEQ ID NO: 93 | SEQ ID NO: 85 | SEQ ID NO: 32 |
| BAP150-02-BF8 | SEQ ID NO: 94 | SEQ ID NO: 86 | SEQ ID NO: 33 |
| BAP150-02-BF9 | SEQ ID NO: 95 | SEQ ID NO: 87 | SEQ ID NO: 34 |

In some other embodiments, the multi-specific antibody may be constructed as shown in FIG. 1, having two variable regions forming the binding site for the cell specific antigen and two other variable regions forming the binding site for the reactive lymphocyte antigen. These variable regions may be selected from the light chain and heavy chain variable regions having the amino acid sequences of SEQ ID NOS: 1-25 and 80-95. One or both of the binding sites must have a conditional activity to their respective antigen. At each binding site having a conditional activity, at least one of the light chain variable region and the heavy chain variable region has an increased affinity to its antigen at the first physiological condition (e.g., aberrant condition) as comantigen. The multi-specific antibody has a binding site to CD3 that comprises a light chain variable region and the heavy chain variable region selected from light chain variable regions having the amino acid sequences of SEQ ID NOS: 1-10 and heavy variable regions having the amino acid sequences of SEQ ID NOS: 11-15. Alternatively, the binding site to CD3 comprises an anti-CD3 single chain antibody having an amino acid sequence selected from the amino acid sequences of SEQ ID NOS: 26-71. The multi-specific antibody has a binding site to TAA comprising a light chain variable region and the heavy chain variable region selected from light chain variable regions binding to one of Axl, Her2 and B7-H3 having the amino acid sequences of SEQ ID NOS: 16-17, 20, and 22, and heavy chain variable regions binding to one of Axl, Her2 and B7-H3 having the amino acid sequences of SEQ ID NOS: 18-19, 21, and 23-25. The binding site to EpCAM comprises a light chain variable region with an amino acid sequence selected from SEQ ID NOS: 88-95, and a heavy chain variable region with an amino acid sequence selected from SEQ ID NOS: 80-87. At least one of the binding site to CD3 and the binding site to Axl, EpCAM, Her2 or B7-H3 is conditionally active.

Some examples of multi-specific antibodies are shown in Table 3. These examples have each have a binding site to a TAA and CD3. "WT" indicates that the affinity of the binding site is non-conditional, i.e., the multi-specific antibodies have an affinity to the antigen not significantly different between the first condition (e.g., aberrant condition) and the second condition (e.g., normal physiological condition). CAB indicates that the affinity of the biding site is conditional, i.e., the multi-specific antibodies have a greater affinity to the antigen at the first condition (e.g., aberrant condition) than at the second condition (e.g., normal physiological condition).

TABLE 3

Examples of Multi-Specific Antibodies Bind to TAA and CD3

| Example Type | Binding Activity to TAA | Linker | Binding Activity to CD3 |
|---|---|---|---|
| Comparative | Axl WT | $(Ala)_n$ | CD3 WT |
| Inventive | Axl WT | $(Ala)_n$ | CD3 CAB1 |
| Inventive | Axl WT | $(Ala)_n$ | CD3 CAB3 |
| Inventive | Axl WT | $(Ala)_n$ | CD3 CAB4 |
| Inventive | Axl CAB | $(Ala)_n$ | CD3 CAB1 |
| Inventive | Axl CAB | $(Ala)_n$ | CD3 CAB3 |
| Inventive | Axl CAB | $(Ala)_n$ | CD3 CAB4 |
| Comparative | B7-H3 WT | $(Ala)_n$ | CD3 WT |
| Inventive | B7-H3 CAB | $(Ala)_n$ | CD3 CAB1 |
| Inventive | B7-H3 CAB | $(Ala)_n$ | CD3 CAB3 |
| Inventive | B7-H3 CAB | $(Ala)_n$ | CD3 CAB4 |
| Inventive | Her2 WT | $(Ala)_n$ | CD3 CAB1 |
| Inventive | Her2 WT | $(Ala)_n$ | CD3 CAB3 |
| Inventive | Her2 WT | $(Ala)_n$ | CD3 CAB4 |
| Comparative | EpCAM WT | $(GlyGlySer)_n$ | CD3-WT |
| Inventive | EpCAM WT | $(GlyGlySer)_n$ | CD3-BF2 |
| Inventive | EpCAM WT | $(GlyGlySer)_n$ | CD3-BF3 |
| Inventive | EpCAM WT | $(GlyGlySer)_n$ | CD3-BF4 |
| Inventive | EpCAM WT | $(GlyGlySer)_n$ | CD3-BF5 |
| Inventive | EpCAM WT | $(GlyGlySer)_n$ | CD3-BF6 |
| Inventive | EpCAM WT | $(GlyGlySer)_n$ | CD3-BF7 |
| Inventive | EpCAM WT | $(GlyGlySer)_n$ | CD3-BF8 |
| Inventive | EpCAM WT | $(GlyGlySer)_n$ | CD3-BF8 |

In some embodiments, one or both of the IgG antibody and the single chain antibody is a therapeutic or prophylactic antibody for administration to a subject for treating or preventing a disease or condition or improving the health of the subject. The therapeutic or prophylactic antibody may be approved for therapeutic or prophylactic use for human or animal by a regulatory agency in a country or region such as U.S. Food and Drug Administration and European Medicines Agency.

In some other embodiments, one or both of IgG antibody and the single chain antibody is a biosimilar, which is a biopharmaceutical that is deemed to be comparable in quality, safety, and efficacy to a reference biologic product marketed by an innovator pharmaceutical company (as defined in Section 351(i) of the Public Health Service Act (42 U.S.C. 262(i) in the U.S.). There may be minor differences in clinically inactive components between the biosimilar and reference biologic product.

In one embodiment, the multi-specific antibody binds to a cancer cell specific antigen with a greater affinity at the aberrant condition than at the normal physiological condition. In another embodiment, the multi-specific antibody binds to the reactive lymphocyte antigen with a greater affinity at the aberrant physiological condition than at the normal physiological condition. In another embodiment, the multi-specific antibody binds to both the cancer cell specific antigen and the reactive lymphocyte antigen with a greater affinity at the aberrant condition than at the normal physiological condition. In another embodiment, the multi-specific antibody binds to a combination of the cancer cell specific antigen and the reactive lymphocyte antigen with a greater avidity at the aberrant condition than at the normal physiological condition. The aberrant condition and normal physiological condition may be selected from pH, oxygen concentration, or any other condition that differentiates the tumor microenvironment from the blood of the subject.

In one embodiment, the multi-specific antibody binds to a senescent cell specific antigen with a greater affinity at the aberrant condition in the senescent cell microenvironment than at the normal physiological condition. In another embodiment, the multi-specific antibody binds to the reactive lymphocyte antigen with a greater affinity at the aberrant condition in the senescent cell microenvironment than at the normal physiological condition. In another embodiment, the multi-specific antibody binds to both the cancer cell specific antigen and the reactive lymphocyte antigen with a greater affinity at the aberrant condition in the senescent cell microenvironment than at the normal physiological condition. In another embodiment, the multi-specific antibody binds to a combination of the cancer cell specific antigen and the reactive lymphocyte antigen with a greater avidity at the aberrant condition in the senescent cell microenvironment than at the normal physiological condition. The aberrant condition and normal physiological condition may be selected from pH, oxygen concentration, or any other condition that differentiates the senescent cell microenvironment from the blood or normal tissues of the subject.

In another aspect, the present invention provides a multi-specific antibody that comprises an IgG antibody that binds to a first antigen (e.g., a cell specific antigen) and at least one scFv antibody that binds a second antigen (e.g., a reactive lymphocyte antigen) that is different from the first antigen. The scFv antibody may be linked to a C terminus of the IgG antibody via a linker as described herein. The multi-specific antibody reversibly binds to at least one of the first and second antigens with a greater affinity at the aberrant condition than at the normal physiological condition.

The first and second antigens are not limited to specific antigens but instead may be any pair of antigens which have some relationship that facilitates achieving the desired outcome. In one embodiment, the first antigen is a cell surface antigen. The first antigen may be a cancer cell specific antigen such as Axl, Ror2, Her2, EpCAM, or B7-H3. In another embodiment, the second antigen is an antigen of a tumor-reactive lymphocyte such as CD3. More examples of suitable cancer cell antigens and antigens of reactive lymphocytes are described elsewhere in this application.

In some embodiments, the multi-specific antibodies are in the format as shown in FIG. 2, where the scFv antibody binds to CD3 and comprises a light chain variable region and the heavy chain variable region selected from light chain variable regions having the amino acid sequences of SEQ ID NOS: 1-10 and heavy variable regions having the amino acid sequences of SEQ ID NOS: 11-15. Alternatively, the binding site to CD3 comprises an anti-CD3 single chain antibody having an amino acid sequence selected from the amino acid sequences of SEQ ID NOS: 26-71. The IgG antibody binds to a TAA and comprises a light chain variable region and the heavy chain variable region selected from light chain variable regions binding to one of Axl, Her2 and B7-H3 having the amino acid sequences of SEQ ID NOS: 16-17, 20, and 22, and heavy chain variable regions binding to one of Axl, Her2 and B7-H3 having the amino acid sequences of SEQ ID NOS: 18-19, 21, and 23-25. The binding site to EpCAM comprises a light chain variable region with an amino acid sequence selected from SEQ ID NOS: 88-95, and a heavy chain variable region with an amino acid sequence selected from SEQ ID NOS: 80-87. The constant regions of the light and heavy chains of the IgG antibody may be selected from constant regions of IgG antibodies, including any subclass of IgG: IgG1, IgG2, IgG3, IgG4. Among these multi-specific antibodies, as long as at least one of binding site to CD3 and the binding site to Axl, EpCAM, Her2 or B7-H3 is conditionally active, the multi-specific antibody is considered to be conditionally active and within the scope of the invention.

The present invention provides a platform to produce multi-specific antibodies, which can significantly reduce development time. This platform may be called "plug and play" in which a single conditionally active anti-tumor reactive lymphocyte antigen antibody or antibody fragment (e.g., anti-CD3 antibody) may be covalently attached to another antibody or antibody fragment against another antigen (e.g., a cancer cell surface antigen) to generate a conditionally active multi-specific antibody. The antibody or antibody fragment against the other antigen may or may not be conditionally active.

The advantage of this "plug and play" platform is that, for example, once a conditionally active anti-tumor reactive lymphocyte antigen antibody or antibody fragment (e.g., anti-CD3 antibody) is available, a conditionally active multi-specific antibody may be produced by linking it to another antibody or antibody fragment. The conditionally active anti-tumor reactive lymphocyte antibody or antibody fragment may be a full-length antibody, an antibody fragment including the $V_H$ and $V_L$ regions, or a single chain antibody. Successful production of conditionally active multi-specific antibodies or antibody fragments is reasonably expected with minimal development time since the two components of the produced conditionally active multi-specific antibody are known to have conditional binding activity and binding to their respective antigens, respectively. As demonstrated by the present invention, this platform has been successfully applied to generate multi-specific antibodies binding to both CD3 and each of the antigens AXL, EpCAM, HER2, and B7-H3.

In some embodiments, the aberrant condition is an acidic pH in the range of from about 5.0 to about 7.0, or from about 5.2 to about 6.8, or from about 5.4 to about 6.8, or from about 5.6 to about 6.8, or from about 5.8 to about 6.8, or from about 6.0 to about 6.8, or from about 6.2 to about 6.8, or from about 6.4 to about 6.8, or from about 6.6 to about 6.8. In some embodiments, the acidic pH may be in the range of from about 6.4 to about 7.0, or from about 6.6 to about 7.0, or from about 6.8 to about 7.0. The normal physiological condition may be a normal physiological pH in the blood, which is well-established in the art.

In some embodiments, the normal physiological pH in the blood may be in the range of from about 7.0 to about 7.8, or from about 7.1 to about 7.7, or from about 7.2 to about 7.6, or from about 7.2 to about 7.5, or from about 7.2 to about 7.4.

In certain embodiments, the multi-specific antibody of the present invention has a ratio of the affinity or avidity to the cell antigen and/or tumor-reactive lymphocyte antigen at the aberrant condition to the same affinity or avidity at the normal physiological condition of at least about 1.3:1, or at least about 2:1, or at least about 3:1, or at least about 4:1, or at least about 5:1, or at least about 6:1, or at least about 7:1, or at least about 8:1, or at least about 9:1, or at least about 10:1, or at least about 11:1, or at least about 12:1, or at least about 13:1, or at least about 14:1, or at least about 15:1, or at least about 16:1, or at least about 17:1, or at least about 18:1, or at least about 19:1, or at least about 20:1, or at least about 30:1, or at least about 40:1, or at least about 50:1, or at least about 60:1, or at least about 70:1, or at least about 80:1, or at least about 90:1, or at least about 100:1.

In one embodiment, the multi-specific antibody consist only of naturally occurring amino acids. There are twenty naturally occurring amino acids that are referred as: alanine (ala or A), arginine (arg or R), asparagine (asn or N), aspartic acid (asp or D), cysteine (cys or C), gluatamic acid (glu or E), glutamine (gin or Q), glycine (gly or G), histidine (his or H), isoleucine (ile or I), leucine (leu or L), lysine (lys or K), methionine (met or M), phenylalanine (phe or F), proline (pro or P), serine (ser or S), threonine (thr or T), tryptophan (tip or W), tyrosine (tyr or Y), and valine (val or V).

In some embodiments, the multi-specific antibody comprises one or more non-naturally occurring amino acids. For example, the non-naturally occurring amino acid comprises a carbonyl group, an acetyl group, an aminooxy group, a hydrazine group, a hydrazide group, a semicarbazide group, an azide group, or an alkyne group. See, e.g., U.S. Pat. No. 7,632,924 for suitable non-naturally occurring amino acids. The term "non-naturally occurring amino acid" also includes amino acids produced by modification (e.g. post-translational modifications) of a naturally occurring amino acid but are not themselves naturally incorporated into a growing polypeptide chain by the translation complex of a living organism. Examples of such non-naturally-occurring amino acids include, but are not limited to, N-acetylglucosaminyl-L-serine, N-acetylglucosaminyl-L-threonine, and O-phosphotyrosine.

In some embodiments, the multi-specific antibody is in a "mimetic" or "peptidomimetic" form, which contains either entirely composed of synthetic, non-natural analogues of amino acids, or, is a chimeric molecule of partly natural occurring amino acids and partly non-natural analogs of amino acids. The mimetic can also incorporate any amount of natural occurring amino acid conservative substitutions as long as such substitutions also do not substantially alter the antibody's structure and/or activity.

The mimetic form can contain any combination of non-natural structural components. In one aspect, mimetic of the disclosure includes one or all of the following three structural groups: a) residue linkage groups other than the natural amide bond ("peptide bond") linkages; b) non-natural residues in place of naturally occurring amino acid residues; or c) residues which induce secondary structural mimicry, i.e., to induce or stabilize a secondary structure, e.g., a beta turn, gamma turn, beta sheet, alpha helix conformation, and the like. For example, the multi-specific antibody can be characterized as a mimetic when all or some of its residues are joined by chemical means other than natural peptide bonds. Individual peptidomimetic residues can be joined by peptide bonds, other chemical bonds or coupling means, such as, e.g., glutaraldehyde, N-hydroxysuccinimide esters, bifunctional maleimides, N,N'-dicyclohexylcarbodiimide (DCC) or N,N'-diisopropylcarbodiimide (DIC). Linking groups that can be an alternative to the traditional amide bond ("peptide bond") linkages include, e.g., ketomethylene (e.g., –C(=O)—CH$_2$– for —C(=O)–NH—), aminomethylene (CH$_2$—NH), ethylene, olefin (CH=CH), ether (CH$_2$–O), thioether (CH$_2$–S), tetrazole, thiazole, retroamide, thioamide, or ester (see, e.g., Spatola (1983) in Chemistry and Biochemistry of Amino Acids, *Peptides and Proteins*, vol. 7, pp 267-357, "Peptide Backbone Modifications," in *Chemistry and Biochemistry of Amino Acids, Peptides, and Proteins*, vol. 7, B. Weistein, ed., New York: Marcell Dekker, pp. 257-267).

More examples of non-natural occurring amino acid residues include D- or L-naphylalanine; D- or L-phenylglycine; D- or L-2 thieneylalanine; D- or L-1, -2, 3-, or 4-pyreneylalanine; D- or L-3 thieneylalanine; D- or L-(2-pyridinyl)-alanine; D- or L-(3-pyridinyl)-alanine; D- or L-(2-pyrazinyl)-alanine; D- or L-(4-isopropyl)-phenylglycine; D-(trifluoromethyl)-phenylglycine; D-(trifluoromethyl)-phenylalanine; D-p-fluoro-phenylalanine; D- or L-p-biphenylphenylalanine; D- or L-p-methoxy-biphenylphenylalanine; D- or L-2-indole(alkyl)alanines; and, D- or L-alkylanines, where alkyl can be substituted or unsubstituted methyl, ethyl, propyl, hexyl, butyl, pentyl, isopropyl, iso-butyl, sec-isobutyl, iso-pentyl, or a non-acidic amino acids. Aromatic rings of a non-natural amino acid include, e.g., thiazolyl, thiophenyl, pyrazolyl, benzimidazolyl, naphthyl, furanyl, pyrrolyl, and pyridyl aromatic rings.

Acidic non-natural amino acids may be generated by substitution by, e.g., non-carboxylate amino acids while maintaining a negative charge, such as (phosphono)alanine; sulfated threonine. Carboxyl side groups (e.g., aspartyl or glutamyl) can also be selectively modified by reaction with carbodiimides (R'–N—C—N—R') such as, e.g., 1-cyclohexyl-3(2-morpholinyl-(4-ethyl) carbodiimide or 1-ethyl-3 (4-azonia-4,4-dimetholpentyl) carbodiimide. Aspartyl or glutamyl can also be converted to asparaginyl and glutaminyl residues by reaction with ammonium ions.

Basic non-natural amino acids can be generated by substitution with, e.g., (in addition to lysine and arginine) ornithine, citrulline, or (guanidino)-acetic acid, or (guanidino)alkyl-acetic acid, where alkyl is defined above. Nitrile derivative (e.g., containing the CN-moiety in place of COOH) can be substituted for asparagine or glutamine. Asparaginyl and glutaminyl residues can be deaminated to the corresponding aspartyl or glutamyl residues. Arginine residue mimetics can be generated by reacting arginyl with, e.g., one or more conventional reagents, including, e.g., phenylglyoxal, 2,3-butanedione, 1,2-cyclo-hexanedione, or ninhydrin, may be under alkaline conditions. Tyrosine residue mimetics can be generated by reacting tyrosyl with, e.g., aromatic diazonium compounds or tetranitromethane. N-acetylimidizol and tetranitromethane can be used to form O-acetyl tyrosyl species and 3-nitro derivatives, respectively. Cysteine residue mimetics can be generated by reacting cysteinyl residues with, e.g., alpha-haloacetates such as 2-chloroacetic acid or chloroacetamide and corresponding amines; to give carboxymethyl or carboxyamidomethyl derivatives. Cysteine residue mimetics can also be generated by reacting cysteinyl residues with, e.g., bromo-trifluoroacetone, alpha-bromo-beta-(5-imidozoyl) propionic acid; chloroacetyl phosphate, N-alkylmaleimides, 3-nitro-2-pyridyl disulfide; methyl 2-pyridyl disulfide; p-chloromercuribenzoate; 2-chloromercuri-4 nitrophenol; or, chloro-7-nitrobenzo-oxa-1,3-diazole. Lysine mimetics can be generated (and amino terminal residues can be altered) by reacting lysinyl with, e.g., succinic or other carboxylic acid anhydrides. Lysine and other alpha-amino-containing residue mimetics can also be generated by reaction with imidoesters, such as methyl picolinimidate, pyridoxal phosphate, pyridoxal, chloroborohydride, trinitrobenzenesulfonic acid, O-methylisourea, 2,4, pentanedione, and transamidase-catalyzed reactions with glyoxylate. Mimetics of methionine can be generated by reaction with, e.g., methionine sulfoxide. Mimetics of proline include, e.g., pipecolic acid, thiazolidine carboxylic acid, 3- or 4-hydroxy proline, dehydroproline, 3- or 4-methylproline, or 3,3-dimethylproline. Histidine residue mimetics can be generated by reacting histidyl with, e.g., diethylprocarbonate or para-bromophenacyl bromide. Other mimetics include, e.g., those generated by hydroxylation of proline and lysine; phosphorylation of the hydroxyl groups of seryl or threonyl residues; methylation of the alpha-amino groups of lysine, arginine and histidine; acetylation of the N-terminal amine; methylation of main chain amide residues or substitution with N-methyl amino acids; or amidation of C-terminal carboxyl groups.

The mimetic form of the multi-specific antibody may also contain one or more amino acid of the opposite chirality. Thus, any amino acid naturally occurring in the L-configuration (which can also be referred to as the R or S, depending upon the structure of the chemical entity) can be replaced with the amino acid of the same chemical structural type or a peptidomimetic, but of the opposite chirality, referred to as the D-amino acid, but also can be referred to as the R- or S-form.

The mimetic form of the multi-specific antibody may be synthesized using any protein chemical synthesis techniques. In a typical in vitro protein synthesis process, a peptide is extended in length by one amino acid through forming a peptide bond between the peptide and an amino acid. The formation of the peptide bond is carried out using a ligation reaction, which can use a natural amino acid or a non-natural amino acid. Thus, in this manner non-natural amino acids can be introduced into the multi-specific antibody of the present invention to make mimetics.

In some embodiments, the non-naturally occurring amino acid in the multi-specific antibody can provide for linkage to macromolecule such as a polymer, a protein, or a fatty acid, etc. In some embodiments, the multi-specific antibody is linked (e.g., covalently linked) to a polymer (e.g., a polymer other than a polypeptide). Suitable polymers include, e.g., biocompatible polymers, and water-soluble biocompatible polymers. Suitable polymers include synthetic polymers and naturally-occurring polymers. Examples of polymers include substituted or unsubstituted straight or branched chain polyalkylene, polyalkenylene or polyoxyalkylene polymers or branched or unbranched polysaccharides, e.g. a homo- or hetero-polysaccharide. More examples of polymers include ethylene vinyl alcohol copolymer (commonly known by the generic name EVOH or by the trade name EVAL); polybutylmethacrylate; poly(hydroxyvalerate); poly(L-lactic acid); polycaprolactone; poly(lactide-co-glycolide); poly(hydroxybutyrate); poly(hydroxybutyrate-co-valerate); polydioxanone; polyorthoester; polyanhydride; poly(glycolic acid); poly(D,L-lactic acid); poly(glycolic acid-co-trimethylene carbonate); polyphosphoester; polyphosphoester urethane; poly(amino acids); cyanoacrylates; poly(trimethylene carbonate); poly(iminocarbonate); copoly (ether-esters) (e.g., poly(ethylene oxide)-poly(lactic acid) (PEO/PLA) co-polymers); polyalkylene oxalates; polyphosphazenes; biomolecules, such as fibrin, fibrinogen, cellulose, starch, collagen and hyaluronic acid; polyurethanes; silicones; polyesters; polyolefins; polyisobutylene and ethylene-alphaolefin copolymers; acrylic polymers and copolymers; vinyl halide polymers and copolymers, such as polyvinyl chloride; polyvinyl ethers, such as polyvinyl methyl ether; polyvinylidene halides, such as polyvinylidene fluoride and polyvinylidene chloride; polyacrylonitrile; polyvinyl ketones; polyvinyl aromatics, such as polystyrene; polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; polyamides, such as Nylon 66 and polycaprolactam; alkyd resins; polycarbonates; polyoxymethylenes; polyimides; polyethers; epoxy resins; polyurethanes; rayon; rayon-triacetate; cellulose; cellulose acetate; cellulose butyrate; cellulose acetate butyrate; cellophane; cellulose nitrate; cellulose propionate; cellulose ethers; amorphous Teflon; poly (ethylene glycol); and carboxymethyl cellulose.

Examples of synthetic polymers include unsubstituted and substituted straight or branched chain poly(ethyleneglycol), poly(propyleneglycol) poly(vinylalcohol), and derivatives thereof, e.g., substituted poly(ethyleneglycol) such as methoxypoly(ethyleneglycol), and derivatives thereof. Suitable naturally-occurring polymers include, e.g., albumin, amylose, dextran, glycogen, and derivatives thereof.

The linked polymers can have an average molecular weight in a range of from 500 Da to 50000 Da, e.g., from 5000 Da to 40000 Da, or from 25000 to 40000 Da. For example, in some embodiments, where the multi-specific antibody comprises a poly(ethylene glycol) (PEG) or methoxypoly(ethyleneglycol) polymer, the PEG or methoxypoly(ethyleneglycol) polymer can have a molecular weight in a range of from about 0.5 kiloDaltons (kDa) to 1 kDa, from about 1 kDa to 5 kDa, from 5 kDa to 10 kDa, from 10 kDa to 25 kDa, from 25 kDa to 40 kDa, or from 40 kDa to 60 kDa.

For example, a water-soluble polymer (e.g., PEG) can be linked to the multi-specific antibody by reacting a water-soluble polymer comprising a carbonyl group with a multi-specific antibody having a non-naturally occurring amino acid that comprises an aminooxy, hydrazine, hydrazide or semicarbazide group. As another example, the multi-specific antibody can be linked to a water-soluble polymer by reacting a multi-specific antibody that comprises an alkyne-containing amino acid with a water-soluble polymer that comprises an azide moiety. In some cases, the azide or alkyne group is linked to the PEG molecule through an amide linkage.

In some embodiments, the macromolecule linked to the multi-specific antibody is an albumin. The albumin may be for example the albumin of the subject that receives the multi-specific antibody. For example, if the multi-specific antibody is intended to be used in human, a human albumin is linked to the multi-specific antibody. If the multi-specific antibody is intended to be used in a dog, a dog albumin is linked to the multi-specific antibody. Generally speaking, an albumin from a species is linked to the multi-specific antibody if the multi-specific antibody is intended to be used in the species.

Examples of the linkers for conjugating the macromolecule to the multi-specific antibody include glutaraldehyde, a homobifunctional cross-linker, or a heterobifunctional cross-linker Glutaraldehyde cross-links polypeptides via their amino moieties. Homobifunctional cross-linkers (e.g., a homobifunctional imidoester, a homobifunctional N-hydroxysuccinimidyl (NHS) ester, or a homobifunctional sulfhydryl reactive cross-linker) contain two or more identical reactive moieties and can be used in a one-step reaction procedure in which the cross-linker is added to a solution containing a mixture of the macromolecule and multi-specific antibody to be linked. In a mild alkaline pH, imido esters react only with primary amines to form imidoamides, and overall charge of the cross-linked macromolecule and multi-specific antibody is not affected. Homobifunctional sulfhydryl reactive cross-linkers includes bismaleimidhexane (BMH), 1,5-difluoro-2,4-dinitrobenzene (DFDNB), and 1,4-di-(3',2'-pyridyldithio) propinoamido butane (DPDPB).

Heterobifunctional cross-linkers have two or more different reactive moieties (e.g., amine reactive moiety and a sulfhydryl-reactive moiety) and are cross-linked with one of the macromolecule and multi-specific antibody via the amine or sulfhydryl reactive moiety, then reacted with the other one of macromolecule and multi-specific antibody via the non-reacted moiety. Multiple heterobifunctional haloacetyl cross-linkers are available, as are pyridyl disulfide cross-linkers. Carbodiimides are a classic example of heterobifunctional cross-linking reagents for coupling carboxyl groups to amines, which results in an amide bond.

The multi-specific antibody can be glycosylated, e.g., covalently linked to a carbohydrate or polysaccharide moiety. Glycosylation of multi-specific antibody is typically through N-linking or O-linking. The N-linking glycosylation refers to the attachment of the carbohydrate moiety to the side chain of an asparagine residue of the multi-specific antibody. The tripeptide sequences "asparagine-X-serine" or "asparagine-X-threonine," where X is any amino acid except proline, are the recognition sequences for enzymatic attachment of the carbohydrate moiety to the asparagine side chain. Thus, the presence of either of these tripeptide sequences in the multi-specific antibody creates a potential glycosylation site. O-linking glycosylation refers to the attachment of one of the sugars N-acetylgalactosamine, galactose, or xylose to a hydroxyamino acid, most commonly serine or threonine, although 5-hydroxyproline or 5-hydroxylysine may also be used.

Addition of glycosylation sites to the multi-specific antibody may be accomplished by altering its amino acid sequence such that it contains one or more of the above-described tripeptide sequences (for N-linking glycosylation sites). The alteration may also be made by the addition of, or substitution by, one or more serine or threonine residues to the sequence of the original antibody (for O-linking glycosylation sites). Conversely, removal of glycosylation sites can be accomplished by amino acid alteration within the native glycosylation sites of the multi-specific antibody.

The multi-specific antibody can be covalently linked to another macromolecule (e.g., a lipid, a polypeptide, a synthetic polymer, a carbohydrate, and the like) using a linker selected from glutaraldehyde, a homobifunctional cross-linker, or a heterobifunctional cross-linker. Glutaraldehyde cross-links multi-specific antibody via their amino moieties. The homobifunctional cross-linkers and heterobifunctional cross-linkers are described in this application.

Conditionally active antibodies or fragments thereof described in WO 2017/078839 may be used in constructing the multi-specific antibodies. These conditionally active antibodies (full length antibodies, fragments, or single chain antibodies) have an increased affinity to their antigen at an aberrant condition than at a normal physiological condition. The multi-specific antibodies may be constructed by linking a conditionally active antibody (full length antibody, fragment or single chain antibody) with one or more antibody (full length antibody, fragment or single chain antibody) that may or may not have a conditional activity.

The linker used to construct the multi-specific antibodies may be a flexible peptide that ensures proper folding of the multi-specific antibodies. Exemplary linkers include (Ser)n, (Ser-Ala)n and (Ala)n.

In some embodiments, a multi-purpose conditionally active antibody (full length antibody, fragment or single chain antibody) can be made that binds to an antigen on a reactive lymphocyte and that is linked with various antibodies to antigens of different target cells (e.g., different tumors). These multi-specific antibodies can bring the same reactive lymphocyte to each of these different target cells (e.g. different types of tumors). Thus, such multi-specific antibodies are capable of being used to target multiple different types of tumor cells, for example when a subject has multiple different tumors or even a single, unidentified tumor. This may be particularly useful in cases where the tumor is present at a location that makes it difficult to biopsy.

In some embodiments, a multi-purpose conditionally active antibody (full length or single chain antibody) that binds to an antigen on a cancer cell (e.g., a breast cancer cell) can be linked with various antibodies that bind to antigens of different reactive lymphocytes to generate multi-specific antibodies that bring the different reactive lymphocytes to the same target cancer cell. These multi-purpose multi-specific antibodies have a conditional affinity to the cancer cell antigen with a greater affinity at a condition in the tumor microenvironment. Thus, such multi-specific antibodies are capable of bringing different reactive lymphocytes (e.g. T cells, macrophages, NK cells) to the same tumor (breast tumor) for increasing the effectiveness of the treatment.

To generate a conditionally active antibody against the first antigen (e.g., a cell antigen) or the second antigen (e.g., a tumor-reactive lymphocyte antigen) that has greater affinity to the antigen (first or second antigen) at an aberrant condition than at a normal physiological condition, the method as described in WO 2016/138071 may be used, starting from a parent antibody that binds to either or both the first and second antigen. The conditionally active antibody may be used to construct the multi-specific antibody of the present invention.

The parent antibody may be a monoclonal antibody or polyclonal antibody generated by immunizing an animal with the antigen. Methods of immunization, producing and isolating antibodies (polyclonal and monoclonal) are known to those of skill in the art and described in the scientific and patent literature, see, e.g., Coligan, *Current Protocols In Immunology*, Wiley/Greene, NY (1991); Stites (eds.) *Basic And Clinical Immunology* (7th ed.) Lange Medical Publications, Los Altos, Calif ("Stites"); Goding, *Monoclonal Antibodies: Principles And Practice* (2d ed.) Academic Press, New York, N. Y. (1986); Kohler (1975) "Continuous cultures of fused cells secreting antibody of predefined specificity", Nature 256:495; Harlow (1988) *Antibodies, A Laboratory Manual*, Cold Spring Harbor Publications, New York. Antibodies also can be generated in vitro, e.g., using recombinant antibody binding site expressing phage display libraries, in addition to the traditional in vivo methods using animals. See, e.g., Hoogenboom (1997) "Designing and optimizing library selection strategies for generating high-affinity antibodies", *Trends Biotechnol.* 15:62-70; and Katz (1997) "Structural and mechanistic determinants of affinity and specificity of ligands discovered or engineered by phage display", *Annu. Rev. Biophys. Biomol. Struct.* 26:27-45.

The assay solutions for the first and second assays may include a buffer selected from citrate buffers such as sodium citrate, phosphate buffers, bicarbonate buffers such as the Krebs buffer, phosphate buffered saline (PBS) buffer, Hank's buffer, Tris buffer, HEPES buffer, etc. Other buffers known to a person skilled in the art to be suitable for the assays may also be used.

The assay solutions for the first and second assays may contain at least one molecule selected from inorganic compounds, ions and organic molecules, or ones that are commonly found in a bodily fluid of a mammal such as a human or animal. These inorganic compounds, ions and organic molecules are described in detail in WO 2016/138071.

The conditionally active antibody may interact with a molecule or ion selected from inorganic compounds, ions, and organic molecules. interactions between the conditionally active antibody and the molecule or ions may include hydrogen bond bonding, hydrophobic interaction, and Van der Waals interactions.

For example, molecules or ions such as bicarbonate may reduce the binding activity of the conditionally active antibody to its antigen by forming salt bridges in the conditionally active antibody. For example, at a pH lower than its pKa of 6.4, bicarbonate is protonated and thus not charged. The uncharged bicarbonate is not capable of forming salt bridges, thus has little effect on the binding of the conditionally active antibody with its antigen. Hence, the conditionally active antibody has high binding activity with its antigen at the low pH. On the other hand, at a high pH greater than the pKa of bicarbonate, bicarbonate is ionized by losing the proton, thus becoming negatively charged. The negatively charged bicarbonate will form salt bridges between positively charged moieties or polarized moieties on the conditionally active antibody to stabilize the structure of the conditionally active antibody. This will block or reduce the binding of the conditionally active antibody with its antigen. Hence the conditionally active antibody has low activity at the high pH. The conditionally active antibody thus has a pH-dependent activity at the presence of bicarbonate with higher binding activity at low pH than at high pH.

When a molecule or ion such as bicarbonate is absent from the assay solutions, the conditionally active antibody may lose its conditional activity. This is likely due to the lack of salt bridges on the conditionally active antibody to stabilize (fix) the structure of the protein. Thus, the partner will have similar access to the binding site on the conditionally active antibody at any pH, producing similar activity at the first pH and second pH.

It is to be understood that, though the salt bridges (ion bonds) are the strongest and most common manner for the molecules or ions to affect the activity of the conditionally active antibody, the other interactions between such molecules or ions and the conditionally active antibody mentioned above may also contribute to stabilize (fix) the structure of the conditionally active antibody.

Exemplary molecules and ions are selected from bisulfide, hydrogen sulfide, histidine, histamine, citrate, bicarbonate, acetate, and lactate. Each of these small molecules has a pKa between 6.2 and 7.0. Other suitable small molecules may be found in textbooks using the principles of the present application, such as *CRC Handbook of Chemistry and Physics*, 96th Edition, by CRC press, 2015; *Chemical Properties Handbook*, McGraw-Hill Education, 1998.

The molecules or ions may have a low molecular weight and/or a relatively small conformation to ensure maximum access to small pockets on conditionally active protein by minimizing steric hindrance. For this reason, small molecules or ions that typically have a molecular weight of less than 900 Da, or less than 500 Da or less than 200 Da or less than 100 Da are often employed. For example, hydrogen sulfide, bisulfide and bicarbonate all have low molecular weights and small structures that provide access to pockets on conditionally active protein.

In one embodiment, human serum may be added to both assay solutions for normal physiological condition and aberrant condition at substantially the same concentration. Because the human serum has a large number of inorganic compounds, ions, organic molecules (including proteins), the assay solutions will have multiple and large number of components selected from inorganic compounds, ions, organic molecules presented at substantially the same concentrations between the two assay solutions.

In some embodiments, certain components of serum may be purposely minimized or omitted from the assay solutions. For example, when screening antibodies, components of serum that bind with or adsorb proteins can be minimized in or omitted from the assay solutions. Such bound proteins may give false positives thereby including bound mutant proteins that are not conditionally active but rather are merely bound to a component present in serum under a variety of different conditions. Thus, careful selection of assay components to minimize or omit such molecules that can potentially bind with mutant proteins in the assay may reduce the number of false positive mutant proteins that may be inadvertently identified as positive for conditional activity due to binding to a molecule in the assay other than the desired binding partner. For example, in some embodiments where mutant proteins having a propensity to bind with components in human serum are being screened, bovine serum albumin may be used in the assay solution in order to reduce or eliminate the possibility of false positives caused by mutant proteins binding to components of human serum. Other similar replacements can also be made in particular cases to achieve the same goal, which is well appreciated by skilled person in the art.

In another aspect, the present invention provides a method for making a multi-specific antibody. The method comprises steps of:
 a) obtaining an IgG antibody that binds to a first antigen; and
 b) attaching at least one single chain antibody that binds to a second antigen to a C-terminus of at least one light chain of the IgG antibody via a linker to form one or more constructs;
 c) screening the one or more constructs of b) for binding to at least one of the first or second antigens under an aberrant condition and a normal physiological condition; and
 d) selecting a multi-specific antibody from the constructs that reversibly binds to at least one of the first or second antigens with a greater affinity at the aberrant condition than at the normal physiological condition.

In some embodiments, the first antigen may be a cell specific antigen, particularly cancer cell specific antigen or senescent cell specific antigen as described herein. In one embodiment, the first antigen is selected from Axl, EpCAM, Ror2, Her2, and B7-H3. The second antigen may be a tumor-reactive lymphocyte antigen, such as CD3. More examples of suitable reactive lymphocyte antigens are also described herein.

In some other embodiments, the second antigen is a neoantigen, as described herein.

In some embodiments, the multi-specific antibody binds to CD3 as the tumor-reactive lymphocyte antigen and another tumor associated antigen (TAA) as the cell specific antigen. The multi-specific antibody has a binding site to CD3 that comprises a light chain variable region and the heavy chain variable region selected from light chain variable regions having the amino acid sequences of SEQ ID NOS: 1-10 and heavy variable regions having the amino acid sequences of SEQ ID NOS: 11-15. Alternatively, the binding site to CD3 comprises an anti-CD3 single chain antibody having an amino acid sequence selected from the amino acid sequences of SEQ ID NOS: 26-71. The multi-specific antibody has a binding site to TAA comprising a light chain variable region and the heavy chain variable region selected from light chain variable regions binding to one of Axl, Her2 and B7-H3 having the amino acid sequences of SEQ ID NOS: 16-17, 20, and 22, and heavy chain variable regions binding to one of Axl, Her2 and B7-H3 having the amino acid sequences of SEQ ID NOS: 18-19, 21, and 23-25. The binding site to EpCAM comprises a light chain variable region with an amino acid sequence selected from SEQ ID NOS: 88-95, and a heavy chain variable region with an amino acid sequence selected from SEQ ID NOS: 80-87. Among these multi-specific antibodies, as long as at least one of the binding site to CD3 and the binding site to Axl, EpCAM, Her2 or B7-H3 is conditionally active, the multi-specific antibody is conditionally active and is considered to be within the scope of the invention.

In one example, the multi-specific antibody binds to the first antigen with a greater affinity at the aberrant condition than at the normal physiological condition. In another example, the multi-specific antibody binds to the second antigen with a greater affinity at the aberrant condition than at the normal physiological condition. In yet another example, the multi-specific antibody binds to both the first antigen and the second antigen with a greater affinity at the aberrant condition than at the normal physiological condition. In yet another example, the multi-specific antibody binds to a combination of the first antigen and the second antigen with a greater avidity at the aberrant condition than at the normal physiological condition.

In some embodiments, the aberrant condition is an acidic pH in the range of from about 5.0 to about 7.0, or from about 5.2 to about 6.8, or from about 5.4 to about 6.8, or from about 5.6 to about 6.8, or from about 5.8 to about 6.8, or from about 6.0 to about 6.8, or from about 6.2 to about 6.8, or from about 6.4 to about 6.8, or from about 6.6 to about 6.8. In some embodiments, the acidic pH may be in the range of from about 6.4 to about 7.0, or from about 6.6 to about 7.0, or from about 6.8 to about 7.0. The normal physiological condition may be the normal physiological pH in the blood, which is well-established in the art. In some embodiments, the normal physiological pH in the blood may be in the range of from about 7.0 to about 7.8, or from about 7.1 to about 7.7, or from about 7.2 to about 7.6, or from about 7.2 to about 7.5, or from about 7.2 to about 7.4.

Generating a Multi-Specific Antibody

In another aspect, a method for generating multi-specific antibodies is provided. The method generates the multi-specific antibodies from two starting materials: an IgG antibody or fragment thereof that binds to a first antigen and an scFv antibody that binds to a second antigen. One or both of these two antibodies are evolved to produce evolved antibodies, which are screened for IgG antibodies and/or scFv antibodies that bind to their respective first antigen or second antigen with greater affinity under an aberrant condition than under a normal physiological condition. At least one scFv antibody that binds to the second antigen is linked to a C-terminus of at least one light chain of the IgG antibody or fragment to produce one or more constructs. At least one of the scFv antibody and IgG antibody in an antibody screened from the antibodies evolved from one or both of the starting IgG and scFv antibodies. If a starting antibody is evolved, the starting antibody can be referred to as the "parent antibody" and the one or more antibodies evolved therefrom can be referred to as "mutant antibodies" or "evolved antibodies."

The constructs are further screened under the aberrant condition and the normal physiological condition for binding to at least one of the first antigen and the second antigen for selection of the multi-specific antibody that binds to at least one of the first antigen and the second antigen with a greater affinity at the aberrant condition than at the normal physiological condition. The binding of the multi-specific antibody to the first antigen or to the second antigen may be reversible.

Suitable methods of evolving the starting materials IgG antibody and scFv antibody are described in, for example, WO 2012/009026. Suitable methods of screening the evolved antibodies or constructs are described, for example, in WO 2017/078839.

In another aspect, a method of generating the multi-specific antibody is provided. This method starts from an IgG antibody or fragment thereof that binds to a first antigen and an scFv antibody that binds to a second antigen with greater affinity at an aberrant condition than at a normal physiological condition. The method comprises the steps of linking the scFv antibody that binds to the second antigen to a C-terminus of at least one light chain of the IgG antibody or fragment thereof to produce one or more constructs, screening the one or more constructs at the normal physiological condition and the aberrant condition for binding activity to the first antigen and second antigen, and selecting the multi-specific antibody that binds to the first antigen and reversibly binds to the second with a greater affinity at the aberrant condition than at said normal physiological condition.

Multi-specific antibodies generated by the above-described methods are also provided. Such multi-specific antibodies comprise an IgG antibody or fragment thereof that binds to a cell-specific antigen and at least one scFv antibody that binds a T-lymphocyte antigen linked to a C terminus of at least one light chain or at least one heavy chain of the IgG antibody or fragment thereof. The at least one scFv antibody reversibly binds to the t-lymphocyte antigen with a greater affinity at an aberrant condition than at a normal physiological condition.

The starting materials for making the multi-specific antibodies include the IgG antibody or fragment thereof that binds to a first antigen and the scFv antibody that binds to a second antigen described herein. Other characteristics of these multi-specific antibodies are also described elsewhere herein.

Conjugation to An Agent

In some embodiments, the multi-specific antibody may be conjugated to an agent, which may be a therapeutic agent, a prophylactic agent, a diagnostic agent, a detectable label, a chelator or a contrast agent. In some embodiments, the conjugated agent on the multi-specific antibody may optionally be released from the multi-specific antibody once the multi-specific antibody has reached the site of action (e.g., tumors). In these embodiments, the multi-specific antibody may act as a delivery vehicle for transporting the conjugated agents (such as therapeutic agents, prophylactic agents or diagnostic agents) to the site of action in the subject.

The multi-specific antibody may be conjugated to the agent through a covalent conjugation or non-covalent conjugation. Covalent conjugation can either be direct or via a linker. In certain embodiments, direct conjugation is by construction of a fusion protein of the agent and the multi-specific antibody (i.e., by genetic fusion of the two genes encoding the multi-specific antibody and the agent and expression as a single protein). In certain embodiments, direct conjugation is by formation of a covalent bond between a reactive group on the multi-specific antibody and a corresponding group on the agent. In certain embodiments, direct conjugation is by modification (i.e., genetic modification) of the multi-specific antibody to include a reactive group (as non-limiting examples, a sulfhydryl group or a carboxyl group) that forms a covalent attachment to the agent under appropriate conditions, or vice versa. For example, an amino acid with a desired reactive group (i.e., a cysteine residue) may be introduced into the multi-specific antibody to form a disulfide bond formed with the agent. Methods for covalent conjugation of an agent to the multi-specific antibodies are also known in the art (i.e., photo-crosslinking, see, e.g., Zatsepin et al. *Russ. Chem. Rev.,* 74: 77-95 (2005)).

Non-covalent conjugation can be by any non-covalent attachment means, including hydrophobic bonds, ionic bonds, electrostatic interactions, and the like, as will be readily understood by one of ordinary skill in the art.

Conjugation may also be performed using a variety of linkers. For example, a multi-specific antibody and the agent may be conjugated using a variety of bifunctional protein coupling agents such as N-succinimidyl-3-(2-pyridyldithio) propionate (SPDP), succinimidyl-4-(N-maleimidomethyl) cyclohexane-1-carboxylate (SMCC), iminothiolane (IT), bifunctional derivatives of imidoesters (such as dimethyl adipimidate HCl), active esters (such as disuccinimidyl suberate), aldehydes (such as glutaraldehyde), bis-azido compounds (such as bis (p-azidobenzoyl) hexanediamine), bis-diazonium derivatives (such as bis-(p-diazoniumben-zoyl)-ethylenediamine), diisocyanates (such as toluene 2,6-diisocyanate), and bis-active fluorine compounds (such as 1,5-difluoro-2,4-dinitrobenzene). Peptide linkers, comprised of from one to twenty amino acids joined by peptide bonds, may also be used. In certain such embodiments, the amino acids are selected from the twenty naturally-occurring amino acids. In certain other such embodiments, one or more of the amino acids are selected from glycine, alanine, proline, asparagine, glutamine and lysine.

The linker may be a "cleavable linker" facilitating release of the agent upon delivery to the site of action. For example, an acid-labile linker, peptidase-sensitive linker, photolabile linker, dimethyl linker or disulfide-containing linker (Chari et al., Cancer Res., 52:127-131 (1992); U.S. Pat. No. 5,208, 020) may be used.

The conjugated therapeutic agent or prophylactic agent may be toxic to the body, such as a radioactive particle, chemotherapy drug, or a cell toxin (i.e., cytotoxin). Using the multi-specific antibodies of the present invention to deliver the conjugated therapeutic agent to the action site will significantly reduce the toxic effects of these therapeutic agents in areas of the body where their activity is undesirable. The technology for conjugating radioactive particles to antibodies is known in the art. Ibritumomab tiuxetan (Zevalin®) and tositumomab (Bexxar®) are examples of radioactive particle conjugated monoclonal antibodies. Both are antibodies against the CD20 antigen conjugated with a different radioactive particle. Similarly, the technology for conjugating chemotherapy drugs to antibodies is also known in the art. There are at least two marketed antibodies that are conjugated with a chemotherapy drug: brentuximab vedotin (Adcetris@) and ado-trastuzumab emtansine (Kadcyla™). The technology for conjugating a cell toxin to an antibody is also known in the art. For example, denileukin diftitox (Ontak®, a cancer drug) consists of an immune system protein known as interleukin-2 (IL-2) attached to a toxin from the germ that causes diphtheria.

It is contemplated that any kind of radioactive particles, chemotherapy drugs and cell toxins may be conjugated to the multi-specific antibodies of the present invention in order to reduce the side effects of these agents during delivery of these agents to the action or disease site.

In some embodiments, the radioactive particles conjugated to the multi-specific antibody comprise particles impregnated with one or more radioactive isotopes, and have sufficient radioactivity for locoregional ablation of cells. The particles may comprise glass, metal, resin, albumin, or polymer(s). Metals in the radioactive particles may be selected from iron, gadolinium, and calcium. Examples of the one or more radioactive isotopes in the radioactive particles are selected from Gallium-67 ($^{67}$Ga), Yttrium-90 ($^{90}$Y), Gallium-68 ($^{68}$Ga), Thallium-201 ($^{201}$Tl), Strontium-89 ($^{89}$Sr), Indium-III ($^{111}$In), Iodine-131 (1311), Samarium-153 ($^{153}$Sm), Technetium-99m ($^{99m}$Tc), Rhenium-186 ($^{186}$Re), Rhenium-188 ($^{188}$Re), Copper-62 ($^{62}$Cu), and Copper-64 ($^{64}$Cu). The radioactive isotope(s) in the composition may emit beta radiation, gamma radiation, and/or positrons.

In some embodiments, the chemotherapy drugs conjugated to the multi-specific antibodies are selected from anthracyclines, topoisomerase I and/or II inhibitors, spindle poison plant alkaloids, alkylating agents, anti-metabolites, ellipticine and harmine.

Anthracyclines (or anthracycline antibiotics) are derived from *Streptomyces* bacteria. These compounds are used to treat a wide range of cancers, including for example hepatocellular carcinoma, leukemias, lymphomas, and breast, uterine, ovarian, and lung cancers. Anthracyclines include, but are not limited to doxorubicin, daunorubicin, epirubicin, idarubicin, valrubicin, pirarubicin, zorubicin, aclarubicin, detorubicin, carminomycin, morpholinodoxorubicin, morpholinodaunorubicin, methoxymorpholinyldoxorubicin, and pharmaceutically acceptable salts thereof.

Topoisomerases are essential enzymes that maintain the topology of DNA. Inhibition of type I or type II topoisomerases interferes with both transcription and replication of DNA by upsetting proper DNA supercoiling. Some type I topoisomerase inhibitors include camptothecins derivatives Camptothecin derivatives refer to camptothecin analogs such as irinotecan, topotecan, hexatecan, silatecan, lutortecan, karenitecin (BNP1350), gimatecan (ST1481), belotecan (CKD602), or their pharmaceutically acceptable salts. Examples of type II topoisomerase inhibitors include, but are not limited to, amsacrine, etoposide, etoposide phosphate and teniposide These are semisynthetic derivatives of epipodophyllotoxins, alkaloids naturally occurring in the root of American Mayapple (*Podophyllum peltatum*).

Spindle poison plant alkaloids are derived from plants and block cell division by preventing microtubule function, essential for cell division. These alkaloids include, but are not limited to, *vinca* alkaloids (like vinblastine, vincristine, vindesine, vinorelbine and vinpocetine) and taxanes. Taxanes include, but are not limited to, paclitaxel, docetaxel, larotaxel, cabazitaxel, ortataxel, tesetaxel, and their pharmaceutically acceptable salts.

Alkylating agents include, but are not limited to, mechlorethamine, cyclophosphamide, chlorambucil, ifosfamide and platinum compounds such as oxaliplatin, cisplatin or carboplatin.

An anti-metabolite is a chemical that inhibits the use of a metabolite, which is part of normal metabolism. The presence of anti-metabolites alters cell growth and cell division. Purine or pyrimidine analogues prevent the incorporation of nucleotides into DNA, stopping DNA synthesis and thus cell division. They also affect RNA synthesis. Examples of purine analogues include azathioprine, mercaptopurine, thioguanine, fludarabine, pentostatin and cladribine. Examples of pyrimidine analogues include 5-fluorouracil (5FU), which inhibits thymidylate synthase, floxuridine (FUDR) and cytosine arabinoside (Cytarabine).

Antifolates are chemotherapy drugs which impair the function of folic acids. A well-known example is Methotrexate, which is a folic acid analogue that inhibits the enzyme dihydrofolate reductase (DHFR), and thus prevents the formation of tetrahydrofolate. This leads to inhibited production of DNA, RNA and proteins (as tetrahydrofolate is also involved in the synthesis of amino acids serine and methionine). Other antifolates include, but are not limited to, trimethoprim, raltitrexed, pyrimethamine and pemetrexed.

Other chemotherapy drugs may also be conjugated to the multi-specific antibodies, such as ellipticine and harmine. Ellipticine and its derivatives such as 9-hydroxyellipticinium, N2-methyl-9-hydroxyellipticinium, 2-(diethyiamino-2-ethyl)9-hydroxyellipticinium acetate, 2-(diisopropylamino-ethyl)9-hydroxy-ellipticinium acetate and 2-(beta piperidino-2-ethyl)9-hydroxyellipticinium are all effective chemotherapy drugs.

Harmine is a natural plant alkaloid product which was isolated from the Peganum harmala seeds. Harmine-based chemotherapy drugs include harmine, harmaline, harmol, harmalol and harman, and quinazoline derivatives: vasicine and vasicinone.

In some embodiments, the cell toxins conjugated to the multi-specific antibodies include taxol, cytochalasin B, gramicidin D, ethidium bromide, emetine, mitomycin, etoposide, tenoposide, vincristine, vinblastine, colchicin, doxorubicin, daunorubicin, dihydroxy anthracinedione, mitoxantrone, mithramycin, actinomycin D, 1-dehydrotestosterone, glucocorticoids, procaine, tetracaine, lidocaine, propranolol, and puromycin and analogs or homologs thereof. Other toxins include, for example, ricin, CC-1065 and analogues, duocarmycins. Still other toxins include diptheria toxin, and snake venom (e.g., cobra venom).

In some embodiments, the multi-specific antibodies may be conjugated to a diagnostic agent. A diagnostic agent used in the present invention can include any diagnostic agent known in the art, as provided, for example, in the following references: Armstrong et al, *Diagnostic Imaging*, 5$^{th}$ Ed., Blackwell Publishing (2004); Torchilin, V. P., Ed., *Targeted Delivery of Imaging Agents*, CRC Press (1995); Vallabhajosula, S., *Molecular Imaging: Radiopharmaceuticals for PET and SPECT*, Springer (2009). A diagnostic agent can be detected by a variety of methods, including using the agent to provide and/or enhance a detectable signal that includes, but is not limited to, gamma-emitting, radioactive, echogenic, optical, fluorescent, absorptive, magnetic or tomography signals. Techniques for imaging the diagnostic agent can include, but are not limited to, single photon emission computed tomography (SPECT), magnetic resonance imaging (MRI), optical imaging, fluorescence imaging, positron emission tomography (PET), computed tomography (CT), x-ray imaging, gamma ray imaging, and the like.

In some embodiments, the multi-specific antibody may be conjugated to a chelator that binds, e.g., to metal ions to be used for a variety of diagnostic imaging techniques. Exemplary chelators include but are not limited to ethylenediaminetetraacetic acid (EDTA), [4-(1,4,8, 11-tetraazacyclotetradec-1-yl) methyl]benzoic acid (CPTA), Cyclohexanediaminetetraacetic acid (CDTA), ethylenebis (oxyethylenenitrilo)tetraacetic acid (EGTA), diethylenetriaminepentaacetic acid (DTPA), citric acid, hydroxyethyl ethylenediamine triacetic acid (HEDTA), iminodiacetic acid (IDA), triethylene tetraamine hexaacetic acid (TTHA), 1,4, 7, 10-tetraazacyclododecane-1,4,7, 10-tetra(methylene phosphonic acid) (DOTP), 1,4,8,1 1-tetraazacyclododecane-1,4,8, 11-tetraacetic acid (TETA), 1,4,7, 10-tetraazacyclododecane-1,4,7, 10-tetraacetic acid (DOTA), and derivatives thereof.

The multi-specific antibodies may be conjugated to a detectable label. Suitable detectable labels include any composition detectable by spectroscopic, photochemical, biochemical, immunochemical, electrical, optical or chemical means. Suitable detectable labels include, but are not limited to, magnetic beads (e.g. Dynabeads™), fluorescent dyes (e.g., fluorescein isothiocyanate, TEXAS RED®, rhodamine, a green fluorescent protein, a red fluorescent protein, a yellow fluorescent protein, and the like), radiolabels (e.g., $^{3}$H, $^{125}$I, $^{35}$S $^{14}$C or $^{32}$P), enzymes (e.g., horse radish peroxidase, alkaline phosphatase, luciferase, and others commonly used in an enzyme-linked immunosorbent assay (ELISA)), and colorimetric labels such as colloidal gold or colored glass or plastic beads (e.g. multistyrene, multipropylene, latex, etc.).

In other embodiments, the detectable label is selected from optical agents such as fluorescent agents, phosphorescent agents, chemiluminescent agents, and the like. Numerous agents (e.g., dyes, probes, labels, or indicators) are known in the art and can be used in the present invention. (See, e.g., Invitrogen, *The Handbook: A Guide to Fluorescent Probes and Labeling Technologies*, Tenth Edition (2005)). Fluorescent agents can include a variety of organic and/or inorganic small molecules or a variety of fluorescent proteins and derivatives thereof. For example, fluorescent agents can include but are not limited to cyanines, phthalocyanines, porphyrins, indocyanines, rhodamines, phenoxazines, phenylxanthenes, phenothiazines, phenoselenazines, fluoresceins, benzoporphyrins, squaraines, dipyrrolo pyrimidones, tetracenes, quinolines, pyrazines, corns, croconiums, acridones, phenanthridines, rhodamines, acridines, anthraquinones, chalcogenopyrylium analogues, chlorins, naphthalocyanines, methine dyes, indolenium dyes, azo compounds, azulenes, azaazulenes, triphenyl methane dyes, indoles, benzoindoles, indocarbocyanines, benzoindocarbocyanines, and BODIPY™ derivatives having the general structure of 4,4-difluoro-4-bora-3a,4a-diaza-s-indacene, and/or conjugates and/or derivatives of any of these.

Other detectable agents include fluorescein, fluorescein-polyaspartic acid conjugates, fluorescein-polyglutamic acid conjugates, fluorescein-polyarginine conjugates, indocyanine green, indocyanine-dodecaaspartic acid conjugates, indocyanine (NIRD)-polyaspartic acid conjugates, isosulfan blue, indole disulfonates, benzoindole disulfonate, bis(ethylcarboxymethyl)indocyanine, bis(pentylcarboxymethyl)indocyanine, polyhydroxyindole sulfonates, polyhydroxybenzoindole sulfonate, rigid heteroatomic indole sulfonate, indocyaninebispropanoic acid, indocyaninebishexanoic acid, 3,6-dicyano-2,5-[(N,N,N',N'-tetrakis(carboxymethyl) amino]pyrazine, 3,6-[(N,N,N',N'-tetrakis(2-hydroxyethyl) amino]pyrazine-2,5-dicarboxylic acid, 3,6-bis(N-azatedino) pyrazine-2,5-dicarboxylic acid, 3,6-bis(N-morpholino) pyrazine-2,5-dicarboxylic acid, 3,6-bis(N-piperazino) pyrazine-2,5-dicarboxylic acid, 3,6-bis(N-thiomorpholino) pyrazine-2,5-dicarboxylic acid, 3,6-bis(N-thiomorpholino) pyrazine-2,5-dicarboxylic acid S-oxide, 2,5-dicyano-3,6-bis (N-thiomorpholino)pyrazine S,S-dioxide, indocarbocyaninetetrasulfonate, chloroindocarbocyanine, and 3,6-diaminopyrazine-2,5-dicarboxylic acid.

In some embodiments, the multi-specific antibodies may be conjugated to a contrast agent, where the contrast agent is one that is suitable for use in imaging, e.g., imaging procedures carried out on humans. Non-limiting examples of contrast agent include gadolinium (Gd), dysprosium, and iron. The multi-specific antibodies can be conjugated to the contrast agent using standard techniques. For example, the multi-specific antibodies can be iodinated using chloramine T or 1,3,4,6-tetrachloro-3a,6a-dephenylglycouril. For fluorination, fluorine is conjugated to the multi-specific antibodies during the synthesis by a fluoride ion displacement reaction. See, Muller-Gartner, H., *TIB Tech.*, 16:122-130 (1998) and Saji, H., *Crit. Rev. Ther. Drug Carrier Syst.*, 16(2):209-244 (1999) for a review of synthesis of proteins with such radioisotopes. For example, the multi-specific antibodies in can be conjugated to Gd by conjugating low molecular Gd chelates such as Gd diethylene triamine pentaacetic acid (GdDTPA) or Gd tetraazacyclododecanetetraacetic (GdDOTA) to the antibody. See, Caravan et al., *Chem. Rev.* 99:2293-2352 (1999) and Lauffer et al., *J. Magn. Reson. Imaging*, 3:11-16 (1985). The multi-specific antibodies can also be conjugated to Gd by, for example, conjugating polylysine-Gd chelates to the antibody. See, for example, Curtet et al., *Invest. Radiol.*, 33(10):752-761 (1998). Alternatively, the multi-specific antibodies can be conjugated to Gd by incubating paramagnetic polymerized liposomes that include Gd chelator lipid with avidin and biotinylated antibody. See, for example, Sipkins et al., *Nature Med.*, 4:623-626 (1998).

In yet other embodiments, the contrast agents may be x-ray contrast agents as described in the following references: H. S Thomsen, R. N. Muller and R. F. Mattrey, Eds., *Trends in Contrast Media*, (Berlin: Springer-Verlag, 1999); P. Dawson, D. Cosgrove and R. Grainger, Eds., *Textbook of Contrast Media* (ISIS Medical Media 1999); Torchilin, V. P., *Curr. Pharm. Biotech.*, vol. 1, pages 183-215 (2000); Bogdanov, A. A. et al, *Adv. Drug Del. Rev.*, Vol. 37, pages 279-293 (1999); Sachse, A. et ah, *Investigative Radiology*, vol. 32, pages 44-50 (1997). Examples of x-ray contrast agents include, without limitation, iopamidol, iomeprol, iohexol, iopentol, iopromide, iosimide, ioversol, iotrolan, iotasul, iodixanol, iodecimol, ioglucamide, ioglunide, iogulamide, iosarcol, ioxilan, iopamiron, metrizamide, iobitridol and iosimenol. In certain embodiments, the x-ray contrast agents can include iopamidol, iomeprol, iopromide, iohexol, iopentol, ioversol, iobitridol, iodixanol, iotrolan and iosimenol.

The multi-specific antibodies may in some embodiments conjugated with a "radiopaque" label, e.g. a label that can be easily visualized using for example x-rays. Radiopaque materials are well known to those of skill in the art. The most common radiopaque materials include iodide, bromide or barium salts. Other radiopaque materials are also known and include, but are not limited to, organic bismuth derivatives (see, e.g., U.S. Pat. No. 5,939,045), radiopaque multiurethanes (see U.S. Pat. No. 5,346,981), organobismuth composites (see, e.g., U.S. Pat. No. 5,256,334), radiopaque barium multimer complexes (see, e.g., U.S. Pat. No. 4,866, 132), and the like.

Suitable fluorescent proteins that can be conjugated to the multi-specific antibodies include, but are not limited to, a green fluorescent protein (GFP) from *Aequoria victoria* or a mutant or derivative thereof e.g., as described in U.S. Pat. Nos. 6,066,476; 6,020,192; 5,985,577; 5,976,796; 5,968, 750; 5,968,738; 5,958,713; 5,919,445; 5,874,304. Examples of GFP are available commercially, e.g., from Clontech, Inc.; a red fluorescent protein; a yellow fluorescent protein; any of a variety of fluorescent and colored proteins from Anthozoan species, as described in, e.g., Matz et al. (1999) *Nature Biotechnol.* 17:969-973; and the like.

In some embodiments, the conjugation is on the Fc region of the multi-specific antibody. The conjugating molecules, compounds or drugs described above may be conjugated to the Fc region, as described in U.S. Pat. No. 8,362,210. For example, the Fc region may be conjugated to a therapeutic prophylactic agent or diagnostic agent to be delivered to the site with the aberrant condition where the multi-specific antibody displays preferentially activity. Additional methods for conjugating to the Fc region of an antibody are known in the art. See, e.g., U.S. Pat. Nos. 5,336,603, 5,622,929, 5,359,046, 5,349,053, 5,447,851, 5,723,125, 5,783,181, 5,908,626, 5,844,095, and 5,112,946; EP 307,434; EP 367, 166; EP 394,827; PCT publications WO 91/06570, WO 96/04388, WO 96/22024, WO 97/34631, and WO 99/04813; Ashkenazi et al., *Proc. Natl. Acad. Sci. USA*, vol. 88, pages 10535-10539, 1991; Traunecker et al., *Nature*, vol. 331, pages 84-86, 1988; Zheng et al., *J. Immunol.*, vol. 154, pages 5590-5600, 1995; and Vie et al., *Proc. Natl. Acad. Sci. USA*, vol. 89, pages 11337-11341, 1992.

Composition, Formulation, Kit

The multi-specific antibodies of the present invention may be included in pharmaceutical compositions, medical devices, kits, or articles of manufacture for therapeutic, prophylactic or diagnostic use. Suitable pharmaceutical compositions, medical devices, kits, or articles of manufacture are described in detail in WO 2016/138071.

In some embodiments, the pharmaceutical composition may be in a liquid form, a lyophilized form or a liquid form reconstituted from a lyophilized form. The lyophilized preparation is typically reconstituted with a sterile solution prior to administration. The standard procedure for reconstituting a lyophilized composition is to add a volume of pure water (typically about equivalent to the volume removed during lyophilization). Solutions comprising antibacterial agents may also be used for the production of pharmaceutical compositions for parenteral administration; see also Chen, *Drug Dev Ind Pharm*, vol. 18, pp. 1311-54, 1994.

A pharmaceutically acceptable tonicity agent may be included in the composition to modulate the tonicity of the formulation. Exemplary tonicity agents include sodium chloride, potassium chloride, glycerin and any component from the group of amino acids, sugars as well as combinations thereof. In some embodiments, the aqueous formulation is isotonic, although hypertonic or hypotonic solutions may also be suitable. The term "isotonic" denotes a solution having the same tonicity as some other solution with which it is compared, such as physiological salt solution or serum. Tonicity agents may be used in an amount of about 5 mM to about 350 mM, e.g., in an amount of 100 mM to 350 nM.

A pharmaceutically acceptable surfactant may be added to the composition to reduce aggregation of the formulated multi-specific antibody and/or minimize the formation of particulates in the formulation and/or reduce adsorption. Exemplary surfactants include polyoxyethylensorbitan fatty acid esters, polyoxyethylene alkyl ethers, alkylphenylpolyoxyethylene ethers (Triton-X™), polyoxyethylene-polyoxypropylene copolymer (Poloxamer, Pluronic™), and sodium dodecyl sulfate (SDS). Examples of suitable polyoxyethylenesorbitan-fatty acid esters are polysorbate 20, (sold under the trademark Tween 20™) and polysorbate 80 (sold under the trademark Tween 80™). Examples of suitable polyethylene-polypropylene copolymers are those sold under the names Pluronic® F68 or Poloxamer 188™. Examples of suitable Polyoxyethylene alkyl ethers are those sold under the trademark Brij™. Exemplary concentrations of surfactant in the composition may range from about 0.001% to about 1% w/v.

A lyoprotectant may be added to the composition in order to protect the labile active ingredient (e.g. a protein) against destabilizing conditions during the lyophilization process. For example, known lyoprotectants include sugars (including glucose and sucrose), polyols (including mannitol, sorbitol and glycerol), and amino acids (including alanine, glycine and glutamic acid). Lyoprotectants can be included in an amount of about 10 nM to 500 nM.

In some embodiments, the composition, containing one or more of a surfactant, a buffer, a stabilizer, and a tonicity agent, is essentially free of one or more preservatives, such as ethanol, benzyl alcohol, phenol, m-cresol, p-chlor-m-cresol, methyl or propyl parabens, benzalkonium chloride, and combinations thereof. In other embodiments, a preservative selected from ethanol, benzyl alcohol, phenol, m-cresol, p-chlor-m-cresol, methyl or propyl parabens, benzalkonium chloride, and combinations thereof, may be is included in the formulation, e.g., at concentrations ranging from about 0.001 to about 2% (w/v).

Unit dosage forms for oral administration such as syrups, elixirs, and suspensions may be provided where each dosage unit, for example, teaspoonful, tablespoonful, tablet or vile, contains a predetermined amount of the composition. Similarly, unit dosage forms for injection or intravenous administration may comprise the multi-specific antibody in a composition as a solution in sterile water, normal saline or another pharmaceutically acceptable carrier.

The multi-specific antibody may be formulated as an injectable formulation. Typically, injectable compositions are prepared as liquid solutions or suspensions, solid forms suitable for solution in, or suspension in, liquid vehicles prior to injection may also be prepared. The preparation may also be emulsified the multi-specific antibody encapsulated in liposome vehicles.

In some embodiments, the multi-specific antibody may be formulated as aerosol and intranasal compositions. For suppositories, the composition will include traditional binders and carriers such as, polyalkylene glycols, or triglycerides. Such compositions may be formed from mixtures containing the multi-specific antibody in the range of about 0.5% to about 10% (w/w), e.g., about 1% to about 2%.

The multi-specific antibody may be formulated as intranasal formulations including vehicles that neither cause irritation to the nasal mucosa nor significantly disturb ciliary function. Diluents such as water, aqueous saline or other known substances can be employed with the subject invention. The nasal formulations may also contain preservatives such as, but not limited to, chlorobutanol and benzalkonium chloride. A surfactant may be present to enhance absorption of the multi-specific antibody by the nasal mucosa.

In some embodiments, the multi-specific antibody is formulated in a controlled release formulation.

Controlled release within the scope of this invention means one of a number of extended release dosage forms. The following types of controlled release may be used for the purposes of the present invention: continuous release, delayed release, gradual release, long-term release, programmed release, prolonged release, proportionate release, protracted release, slow release, spaced release, sustained release, timed release, delayed action, extended action, layered-time action, long acting, prolonged action, repeated action, sustained action, and extended release. Further discussions of these terms and methods for making the same may be found in Lesczek Krowczynski, *Extended-Release Dosage Forms,* 1987 (CRC Press, Inc.).

Controlled release composition may be prepared using methods known in the art. Examples of controlled-release preparations include semipermeable matrices of solid hydrophobic polymers containing the multi-specific antibody in which the matrices are in the form of shaped articles, e.g. films or microcapsules. Examples of sustained-release matrices include polyesters, copolymers of L-glutamic acid and ethyl-L-glutamate, non-degradable ethylene-vinyl acetate, hydrogels, polylactides, degradable lactic acid-glycolic acid copolymers and poly-D-(-)-3-hydroxybutyric acid. Possible loss of biological activity and possible changes in immunogenicity of the multi-specific antibody comprised in sustained-release formulation may be reduced or prevented by using appropriate additives, by controlling moisture content and by developing specific polymer matrix compositions.

Controlled release technologies include both physical systems and chemical systems. Physical systems include reservoir systems with rate-controlling membranes, such as microencapsulation, macroencapsulation, and membrane systems; reservoir systems without rate-controlling membranes, such as hollow fibers, ultra microporous cellulose triacetate, and porous polymeric substrates and foams; monolithic systems, including those systems physically dissolved in non-porous, polymeric, or elastomeric matrices (e.g., nonerodible, erodible, environmental agent ingression, and degradable), and materials physically dispersed in non-porous, polymeric, or elastomeric matrices (e.g., nonerodible, erodible, environmental agent ingression, and degradable); laminated structures, including reservoir layers chemically similar or dissimilar to outer control layers; and other physical methods, such as osmotic pumps, or adsorption onto ion-exchange resins.

Chemical systems include chemical erosion of polymer matrices (e.g., heterogeneous, or homogeneous erosion), or biological erosion of a polymer matrix (e.g., heterogeneous, or homogeneous). Additional discussion of categories of systems for controlled release may be found in Agis F. Kydonieus, *Controlled Release Technologies: Methods, Theory and Applications,* 1980 (CRC Press, Inc.).

There are a number of controlled release drug formulations for oral administration may be used to formulate the multi-specific antibody. These controlled release formulations include osmotic pressure-controlled gastrointestinal delivery systems; hydrodynamic pressure-controlled gastrointestinal delivery systems; membrane permeation-controlled gastrointestinal delivery systems, which include microporous membrane permeation-controlled gastrointestinal delivery devices; gastric fluid-resistant intestine targeted controlled-release gastrointestinal delivery devices; gel diffusion-controlled gastrointestinal delivery systems; and ion-exchange-controlled gastrointestinal delivery systems, which include cationic and anionic drugs. Additional information regarding controlled release drug delivery systems may be found in Yie W. Chien, *Novel Drug Delivery Systems,* 1992 (Marcel Dekker, Inc.).

The multi-specific antibody may be administered to a patient/subject using any available method and route suitable for drug delivery, including in vivo and ex vivo methods, as well as systemic and localized routes of administration. Conventional and pharmaceutically acceptable routes of administration include intranasal, intramuscular, intratracheal, subcutaneous, intradermal, topical application, intravenous, intraarterial, rectal, nasal, oral, and other enteral and parenteral routes of administration. Routes of administration may be combined, if desired, or adjusted depending upon the multi-specific antibodies and/or the desired effect. The multi-specific antibody can be administered in a single dose or in multiple doses. In some embodiments, the multi-specific antibody is administered orally. In some embodiments, the multi-specific antibody is administered via an inhalational route. In some embodiments, the multi-specific antibody is administered intranasally. In some embodiments, the multi-specific antibody is administered locally. In some embodiments, the multi-specific antibody is administered intracranially. In some embodiments, the multi-specific antibody is administered intravenously.

In another aspect, the invention provides a method of treatment of cancers (tumors) using the multi-specific antibody described herein. The method involves administering the multi-specific antibody to a subject with the cancer or tumor.

In some embodiments, the multi-specific antibody is administered in conjunction with a cancer neoantigen vaccine, or administered after the administration of the cancer neoantigen vaccine. Neoantigen vaccine and its generation is described in US2017/0202939.

The following examples are illustrative, but not limiting, of the methods of the present disclosure. Other suitable modifications and adaptations of the variety of conditions and parameters normally encountered in the field, and which are obvious to those skilled in the art, are within the scope of the disclosure.

EXAMPLES

Examples 1-15 for making conditionally active antibodies are described in WO 2017/078839. These are not examples of the present invention.

Example 16: Multi-Specific Antibodies that Bind to CD3 and Axl

Two multi-specific antibodies were constructed. One multi-specific antibody used a non-conditionally active binding site (scFv antibody) to CD3 (WT-CD3) paired with a non-conditionally active binding site (IgG antibody) to Axl (WT-Axl) to provide a butterfly configuration WT-CD3-WT-Axl (FIGS. 2 and 3A-3C). Similarly, the second multi-specific antibody used a non-conditionally active binding site (scFv antibody) to CD3 (WT-CD3) paired with a conditionally active binding site (IgG antibody) to Axl (CAB-Axl) to form a butterfly configuration WT-CD3-CAB-Axl (FIGS. 2 and 3A-3C).

Figure 3A:
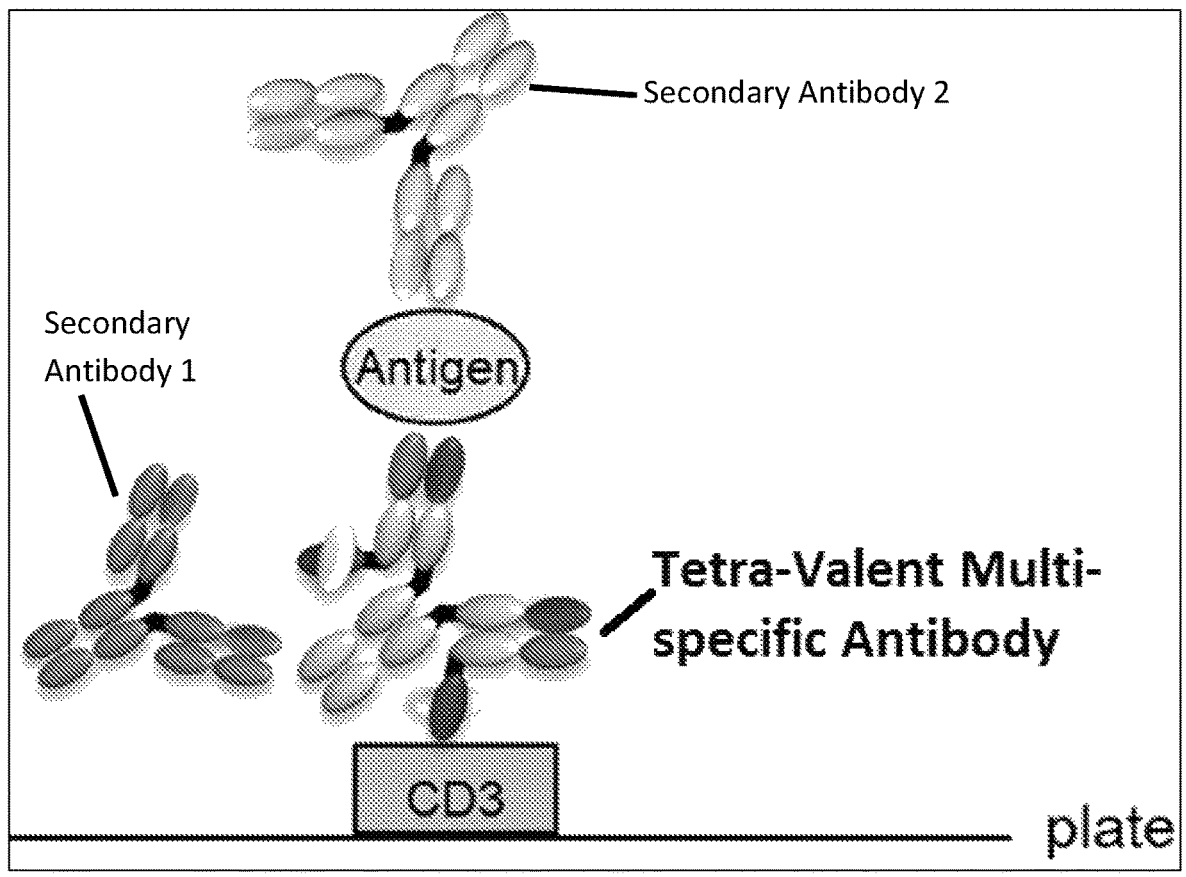
FIG. 3A shows a representation of the general method used to measure the binding of the tetra-valent multi-specific antibody of FIG. 2 to an antigen and CD3 at the same time.
Figure 3B:
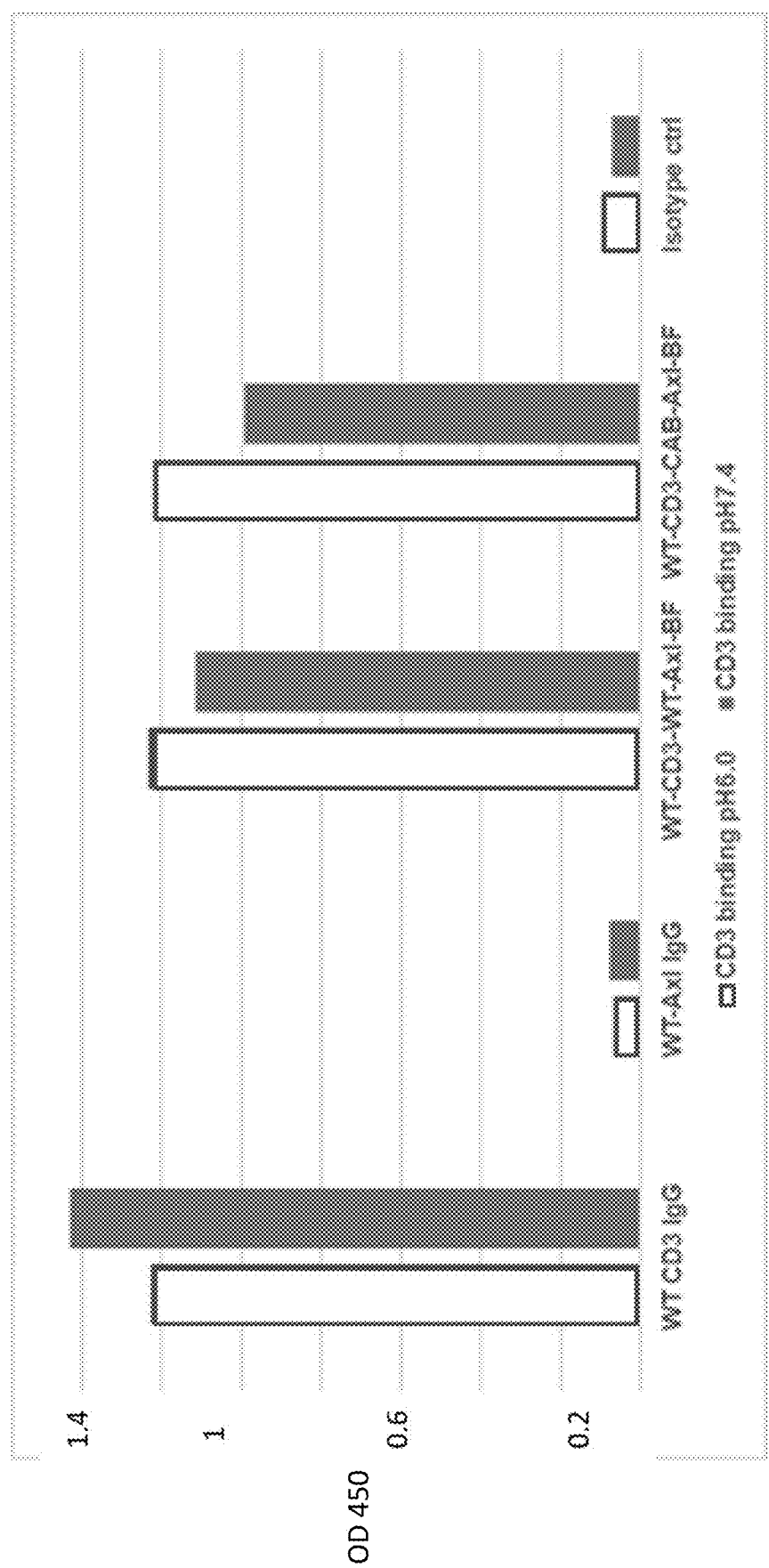
FIG. 3B shows non-conditional binding activity to CD3 by multi-specific antibodies to CD3/Axl at pH's of 6.0 and 7.4. Antibodies were added to CD3 coated ELISA plates and binding detected using an HRP labelled anti-IgG antibody (secondary antibody 1 of FIG. 3A)
Figure 3C:
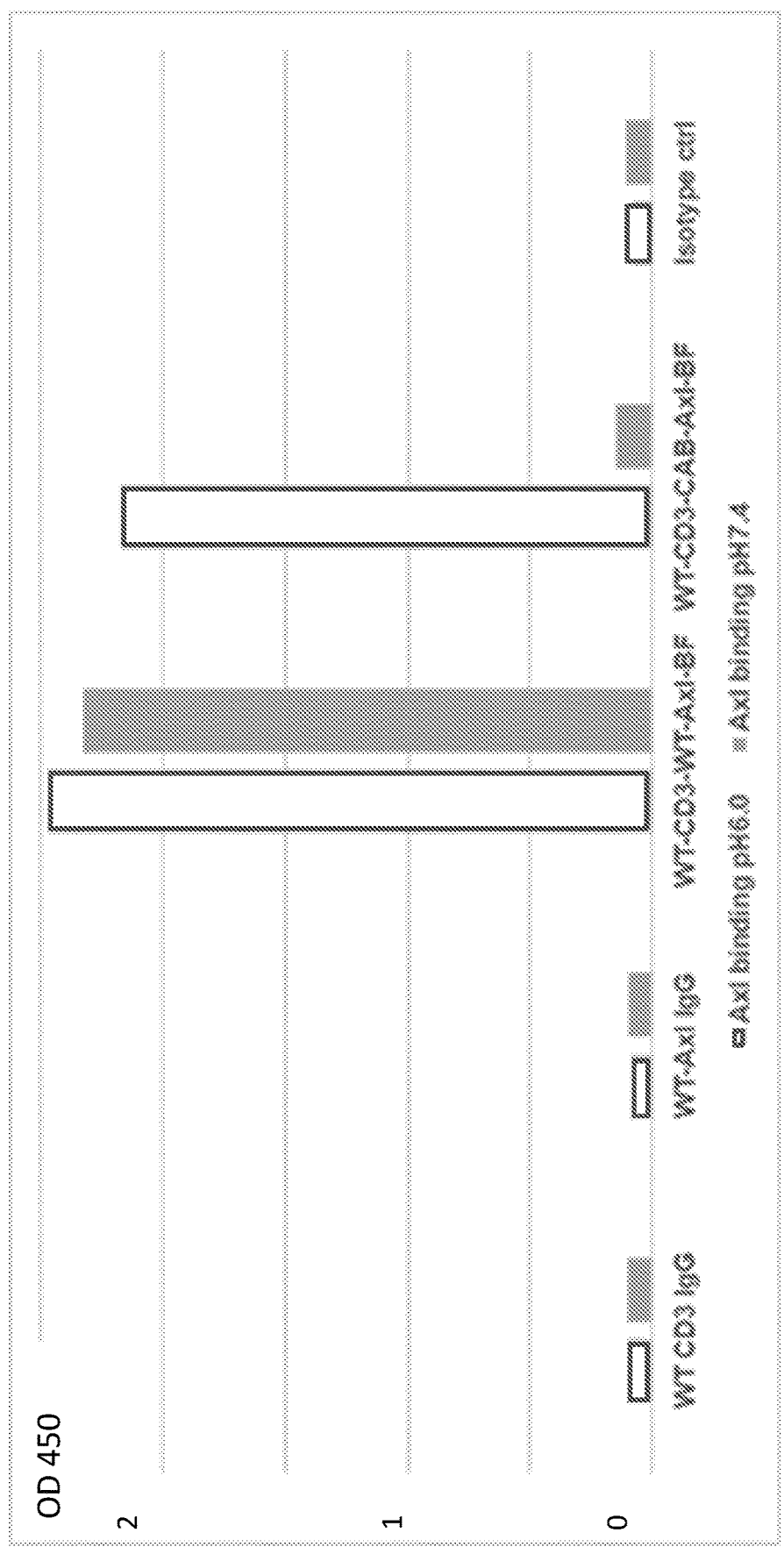
FIG. 3C shows conditional binding activity to Axl by multi-specific antibodies at pH's of 6.0 and 7.4. Antibodies were added to CD3 coated ELISA plates and binding detected using AXL protein (Antigen in FIG. 3A) and an HRP labelled anti-AXL antibody (secondary antibody 2 in FIG. 3A).

The two multi-specific antibodies were assayed for their affinity to CD3 and Axl respectively at pH 6.0 and pH 7.4 using ELISA assay (FIGS. 3B-3C). The ELISA assay of this application used the following protocol:
1. One day before ELISA, a 96 well plate was coated with 100 µl of 0.5 µg/ml recombinant CD3 or Axl overnight in ELISA coating buffer at 4° C.
2. Dilute samples in ELISA assay buffer.
3. Flicked off buffer from the plate coated with antigen, blot dry on paper towels.
4. Block plate with 200 µl ELISA assay buffer at room temperature for 1 hour.
5. Add 100 µl of diluted samples to each well.
6. Incubate the plate at room temperature for 1 hour.

7. Prepare the secondary antibody in screening buffers according to the layout of the plate.
8. Flicked off buffer from the plate, blot dry on paper towels.
9. Wash the plate for a total of 3 times with ELISA wash buffer.
10. Add 100 μl of diluted corresponding secondary antibodies in ELISA assay buffer to the wells:
    For wells coated with recombinant CD3, add anti-human HRP secondary antibody.
    For wells coated with Axl, add recombinant CD3 then detect with anti-His antibody and anti-mouse HRP secondary antibody.
11. Incubate the plate at room temperature for 1 hour.
12. Flicked off buffer from the plate, blot dry on paper towels.
13. Wash the plate for a total of 3 times with ELISA wash buffer.
14. Flick off buffers from plate, blot dry on paper towels.
15. Add 50 μl of 3,3',5,5'-Tetramethylbenzidine (TMB) substrate according to the plate layout.
16. Stop development with 50 μl 1N HCl.
17. Read at OD450 nm using a plate reader The negative controls (wild-type IgG antibody of CD3, wild-type IgG antibody of Axl and isotype controlled negative control) did not show a significant difference in their affinity to CD3 at the two different pH's of 6.0 and 7.4 (FIG. 3B). Similarly, the negative controls did not show a significant difference in their affinity to Axl at the two different pH's of 6.0 and 7.4 (FIG. 3C).

For the two multi-specific antibodies, neither WT-CD3-WT-Axl nor WT-CD3-CAB-Axl showed a significant difference in their affinity to CD3 at the two different pH's of 6.0 and 7.4, because their CD3 binding sites are not conditionally active (FIG. 3B). Further, WT-CD3-WT-Axl showed no significant difference in its affinity to Axl at the two different pH's of 6.0 and 7.4, because its Axl binding site is not conditionally active (FIG. 3C). However, WT-CD3-CAB-Axl showed a significantly increased affinity to Axl at pH 6.0 as compared to the affinity to Axl at pH 7.4 (FIG. 3C), due to the inclusion of the conditionally active binding site to Axl in this multi-specific antibody.

Example 17: Multi-Specific Antibodies that Bind to CD3 and Axl

In this example, additional multi-specific antibodies that bind to CD3 and Axl were constructed. The multi-specific antibodies were made as described in Example 16 and named in the same way as in Example 16:
  Axl-WT×CD3-CAB1: non-conditionally active binding site for Axl paired with conditionally active binding site for CD3;
  Axl-WT×CD3-CAB3: non-conditionally active binding site for Axl paired with conditionally active binding site for CD3;
  Axl-WT×CD3-CAB4: non-conditionally active binding site for Axl paired with conditionally active binding site for CD3;
  Axl-WT×CD3-WT: non-conditionally active binding site for Axl paired with non-conditionally active binding site for CD3;
  Axl-CAB×CD3-CAB1: conditionally active binding site for Axl paired with conditionally active binding site for CD3;
  Axl-CAB×CD3-CAB3: non-conditionally active binding site for Axl paired with conditionally active binding site for CD3; and
  Axl-CAB×CD3-CAB4: non-conditionally active binding site for Axl paired with conditionally active binding site for CD3.

Figure 4A:
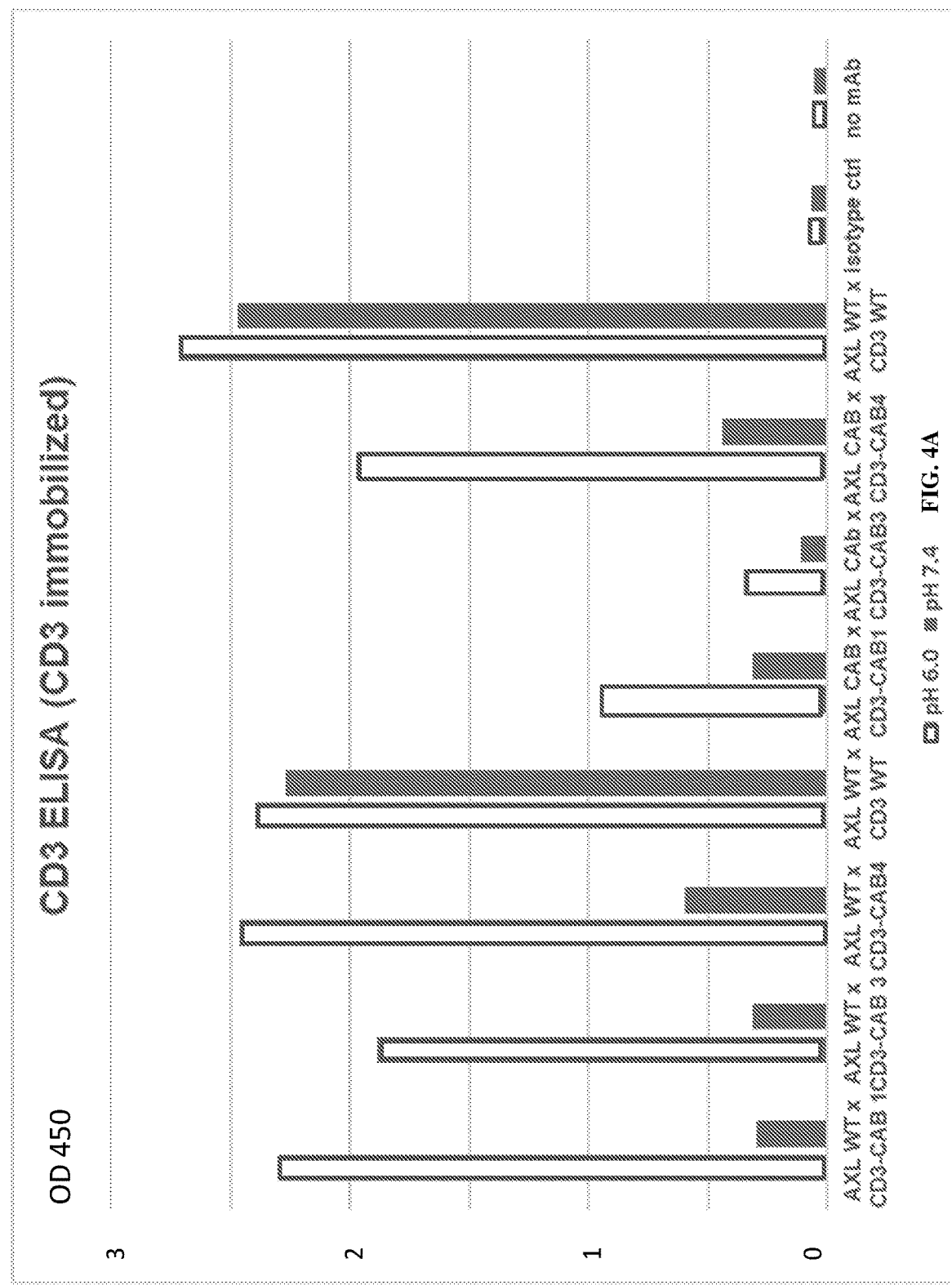
FIG. 4A shows conditional and non-conditional binding activities to immobilized CD3 by multi-specific antibodies to CD3/Axl at pH's of 6.0 and 7.4.

The foregoing multi-specific antibodies were assayed for their affinity to CD3 at pH's 6.0 and 7.4 with CD3 immobilized in the ELISA assay (FIG. 4A). It was observed that when the multi-specific antibodies included a conditionally active variable region with a binding site for CD3, they showed increased affinity to CD3 at pH 6.0 as compared to the affinity to CD3 at pH 7.4. The two negative controls were an isotype-controlled antibody that does not bind to CD3 and buffer with no antibody added.

Figure 4B:
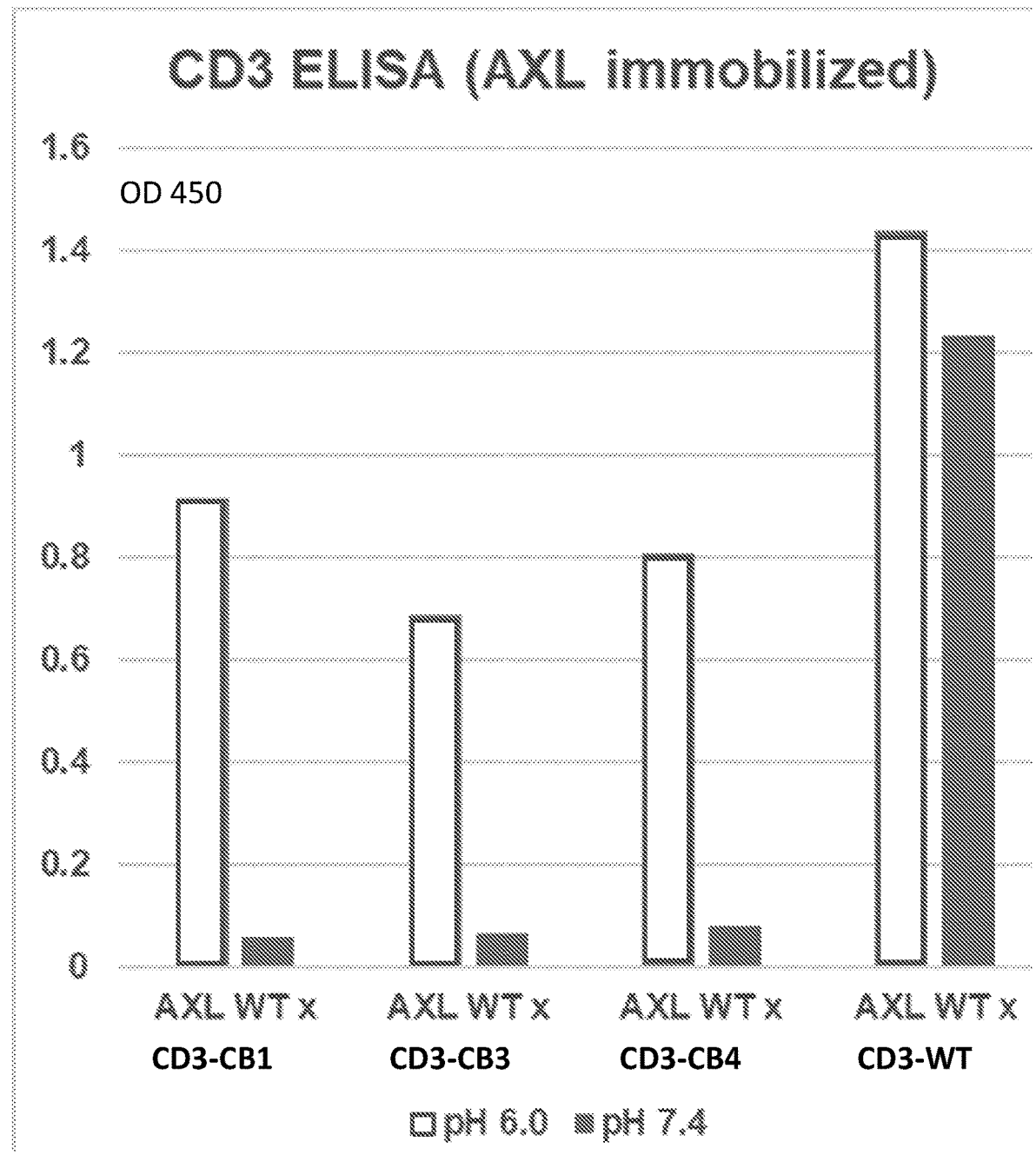
FIG. 4B shows conditional and non-conditional binding activities to CD3 by some of the multi-specific antibodies of FIG. 4A at pH's of 6.0 and 7.4, when the Axl was immobilized.

Some of the multi-specific antibodies were assayed for their binding to CD3 with immobilized Axl. The multi-specific antibodies that included a conditionally active variable region of a CD3 antibody increased affinity to CD3 at pH 6.0 as compared to their affinity to CD3 at pH 7.4 (FIG. 4B).

Example 18: Multi-Specific Antibodies that Bind to CD3 and Her2

In this example, multi-specific antibodies that bind to CD3 and Her2 were constructed. The multi-specific antibodies were made as described in Example 16 and named in the same way as in Example 16:
  Her2-WT×CD3-CAB1: non-conditionally active binding site for Her2 paired with conditionally active binding site for CD3;
  Her2-WT×CD3-CAB3: non-conditionally active binding site for Her2 paired with conditionally active binding site for CD3; and
  Her2-WT×CD3-CAB4: non-conditionally active binding site for Her2 paired with conditionally active binding site for CD3;
  Her2-WT×CD3-WT: non-conditionally active binding site for Her2 paired with non-conditionally active binding site for CD3.

Figure 5A:
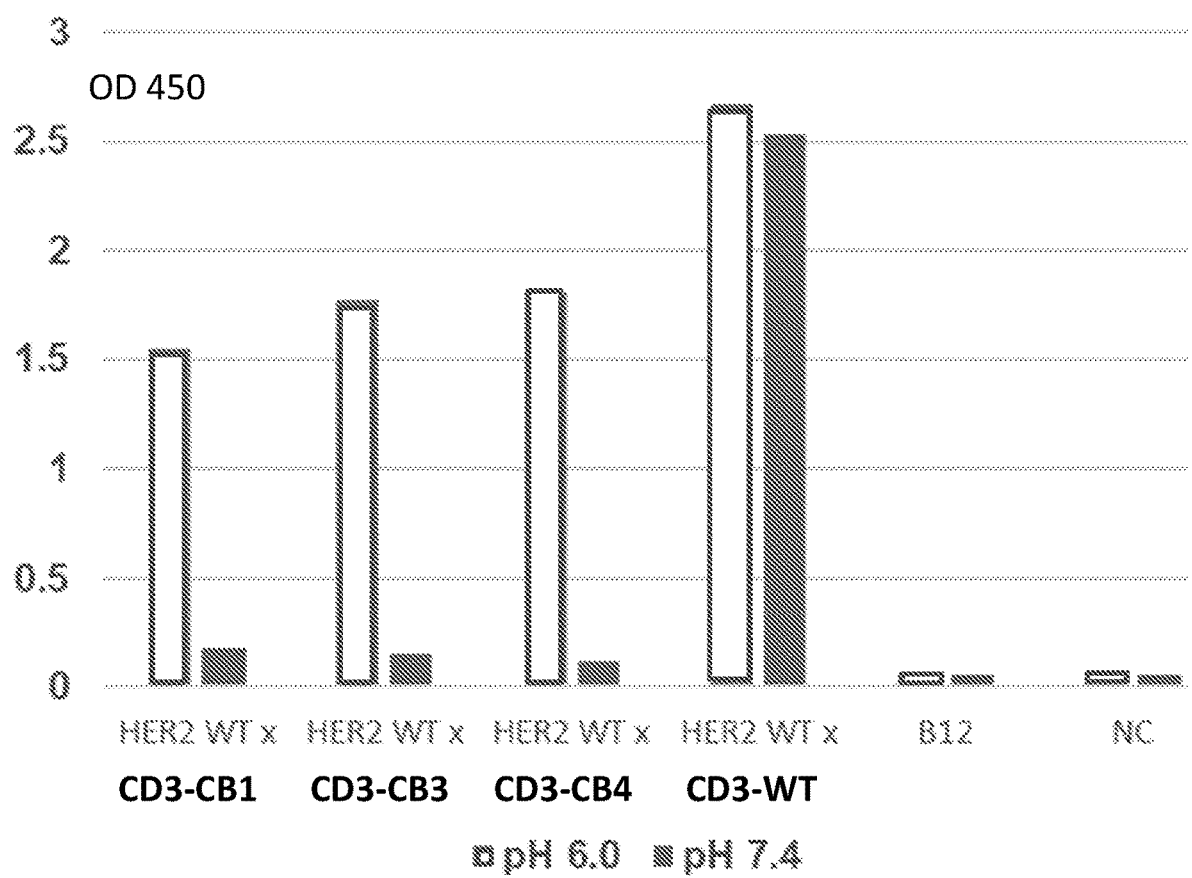
FIG. 5A shows conditional and non-conditional binding activities to immobilized CD3 by multi-specific antibodies to CD3/Her2 at pH's of 6.0 and 7.4.

The above multi-specific antibodies were assayed for their affinity to CD3 at pH's of 6.0 and 7.4 with CD3 immobilized in the ELISA assay. The two negative controls were antibodies that do not bind to CD3 (B12 and NC). It was observed that in cases where the multi-specific antibodies included a conditionally active variable region of a CD3 antibody, the antibodies showed increased affinity to CD3 at pH 6.0 as compared to their affinity to CD3 at pH 7.4 (FIG. 5A).

Figure 5B:
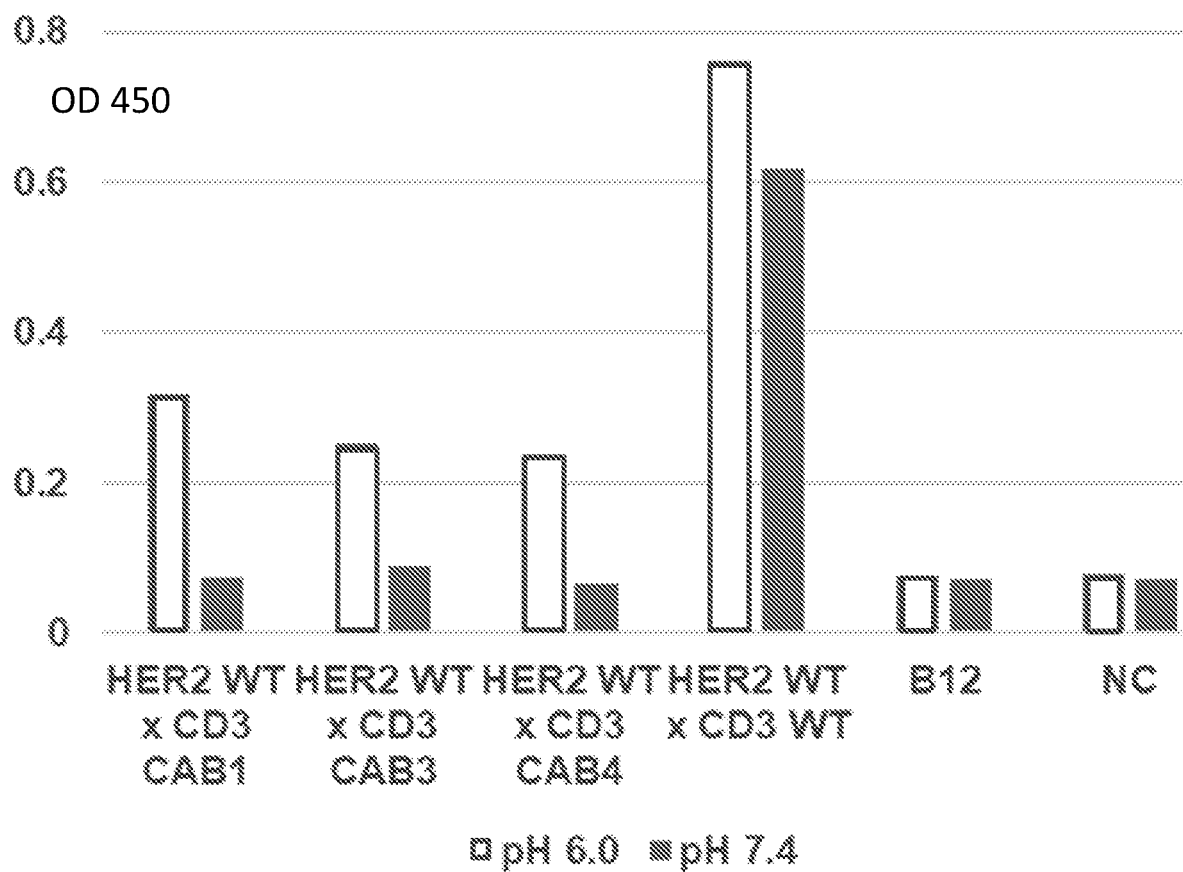
FIG. 5B shows conditional and non-conditional binding activities to CD3 by the multi-specific antibodies of FIG. 5A at pH's of 6.0 and 7.4, when the Her2 was immobilized.

In addition, the multi-specific antibodies were assayed for their binding to CD3 with Her2 immobilized in the assay. The multi-specific antibodies that included a conditionally active variable region of a CD3 antibody showed increased affinity to CD3 at pH 6.0 as compared to their affinity to CD3 at pH 7.4 (FIG. 5B).

Example 19: Multi-Specific Antibodies Bind to CD3 and B7-H3

In this example, multi-specific antibodies that bind to CD3 and B7-H3 were constructed. The multi-specific antibodies were made as described in Example 16 and named in the same way in Example 16:
  B7-H3-WT×CD3-WT: non-conditionally active binding site for B7-H3 paired with non-conditionally active binding site for CD3;

B7-H3-WT×CD3-CAB3: non-conditionally active binding site for B7-H3 paired with conditionally active binding site for CD3; and B7-H3-WT×CD3-CAB4: non-conditionally active binding site for B7-H3 paired with conditionally active binding site for CD3;

B7-H3-CAB1×CD3-CAB4: conditionally active binding site for B7-H3 paired with conditionally active binding site for CD3; and B7-H3-CAB2×CD3-CAB4: conditionally active binding site for B7-H3 paired with conditionally active binding site for CD3.

Figure 6:
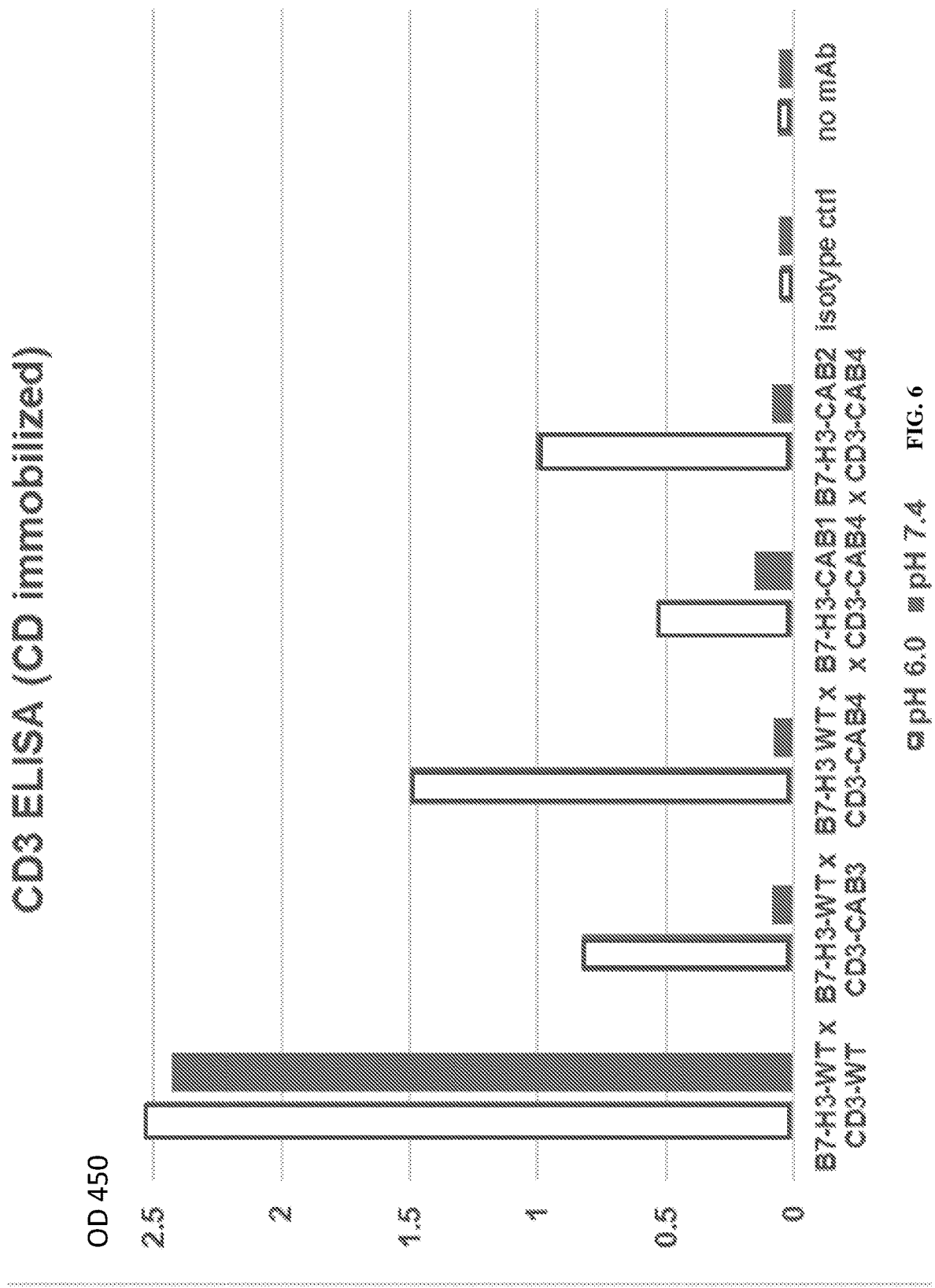
FIG. 6 shows conditional binding activity to immobilized CD3 by multi-specific antibodies to CD3/B7-H3 at pH's of 6.0 and 7.4.

The above multi-specific antibodies were assayed for their affinity to CD3 at pH's 6.0 and 7.4 with CD3 immobilized in the ELISA assay. The two negative controls were an isotype-controlled antibody that does not bind to CD3 and buffer with no antibody added. It was observed that in cases where the multi-specific antibodies included a conditionally active variable region of a CD3 antibody, they showed increased affinity to CD3 at pH 6.0 as compared to their affinity to CD3 at pH 7.4 (FIG. 6).

Example 20: Functional Assay of Multi-Specific Antibodies Bind to CD3 and Axl

Figure 7:
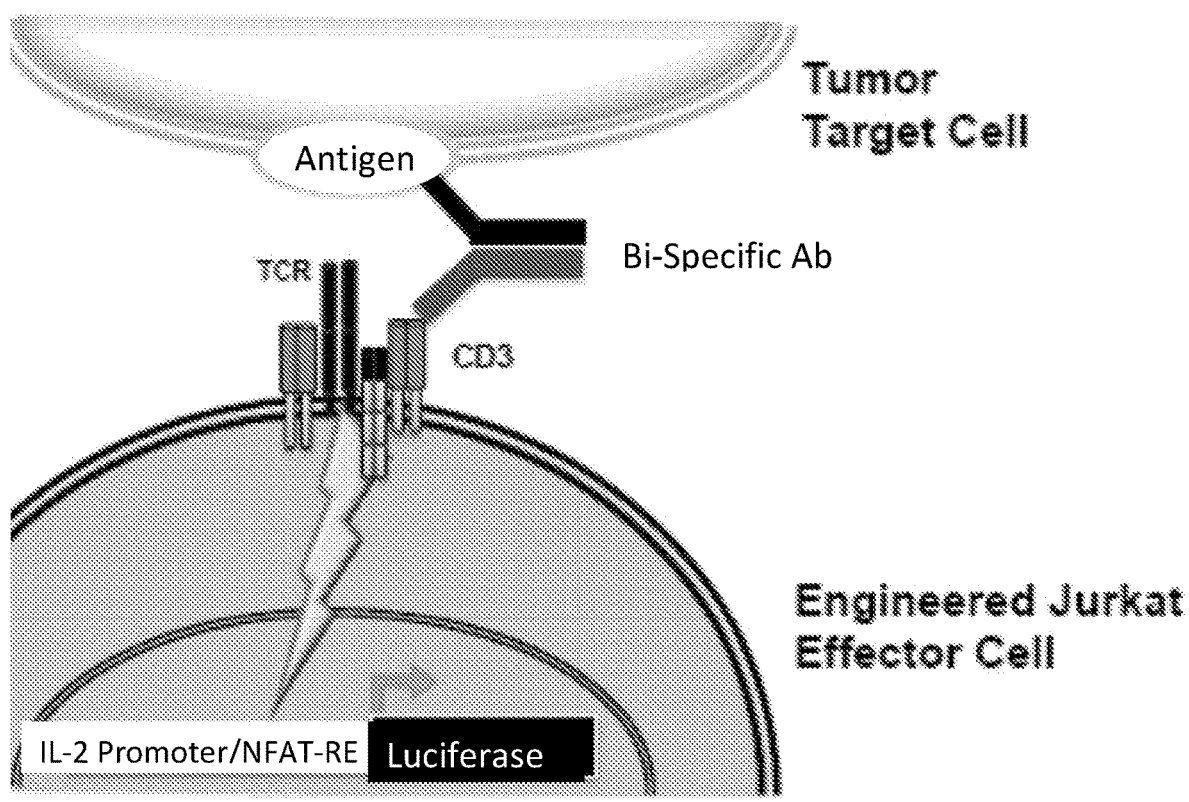
FIG. 7 shows a schematic of a working model for the multi-specific antibody of the present invention for binding to both CD3 on an engineered Jurkat effector cell and an antigen on a tumor target cell.

In this example, two multi-specific antibodies were assayed for their function in stimulating a tumor-reactive lymphocyte, Jurkat cells (FIG. 7). The assay used engineered Jurkat cells having a construct that expressed luciferase driven by an IL-2 promoter or a NFAT regulatory element (RE). Once the multi-specific antibody bound to Axl on a tumor cell and CD3 on the Jurkat cell, the luciferase construct in the Jurkat cell was activated and luciferase was expressed. The amount of luciferase was then measured. In this example, the tumor cells were represented by target CHO cells engineered to express Axl. The measured amount of luciferase indicated the level of stimulation of the Jurkat cells by the multi-specific antibodies after binding to the engineered target CHO cells.

The functional assay (Promega CD3-Assay) used the following protocol:

1. Add target cells to wells (5000 cells/100 µL media, Costar #3917 96-well white plate) and incubate at 37° C. overnight.
2. Remove media from the wells.
3. Add 25 µL/well of 2XAb dilutions in pH 10% RPMI media (final concentration according plate layout).
4. Add 25 µL/well NFAT-Luc2P Jurkat cells (1.2 mL frozen cells=>6 mL pH 10% RPMI).
5. Incubate at 37° C. for 5 hrs.
6. Add 50 µL/well Bio-Glo, 5 min RT.
7. Measure luminescence by Promega Bio-Glo program.

Figure 8A:
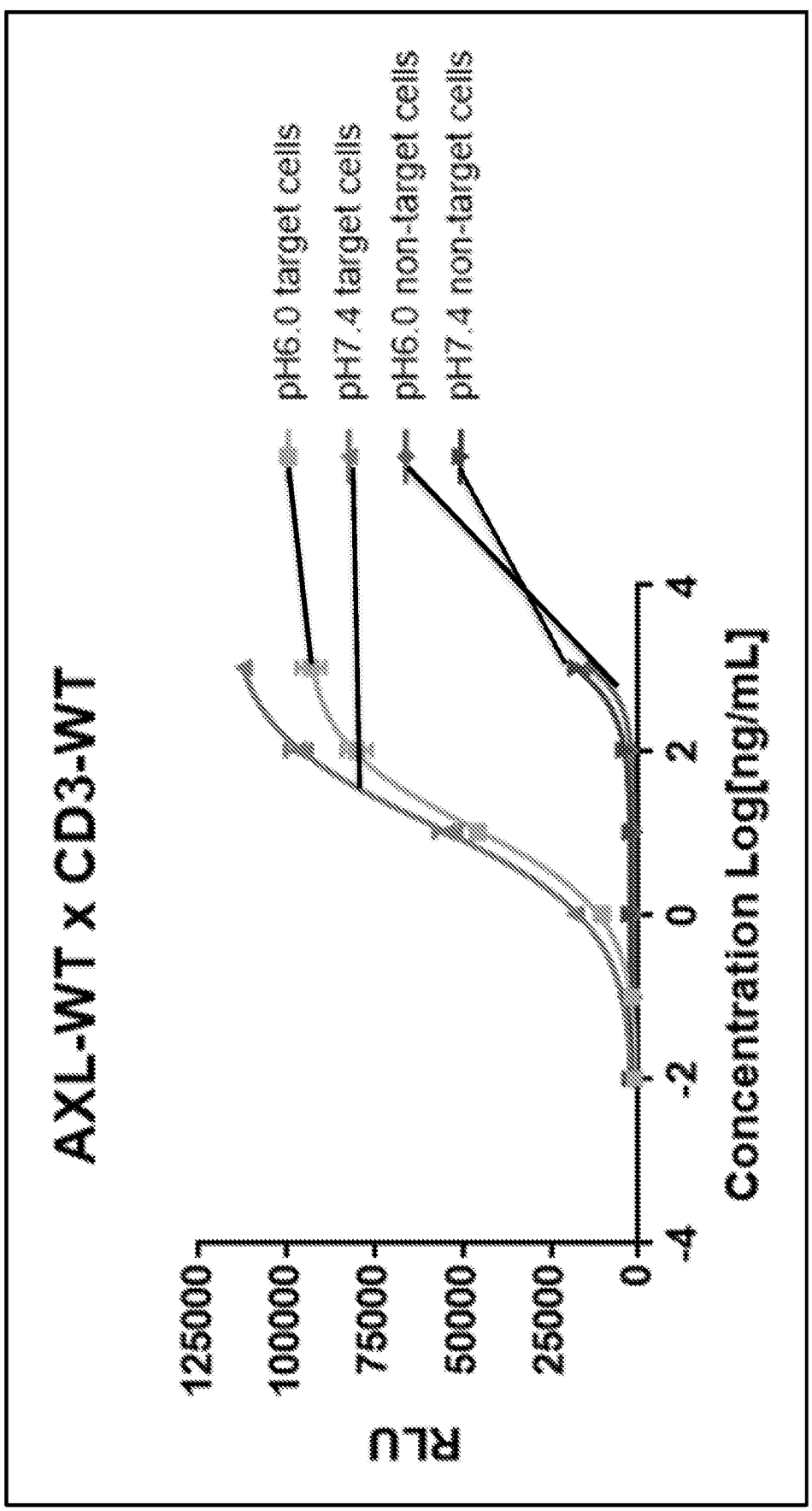
FIG. 8A shows the activity for stimulation of Jurkat effector cells by a bispecific antibody with non-conditional binding activities to both CD3 and Axl.

In FIG. 8A, the multi-specific antibody assayed was the Axl-WT×CD3-WT of Example 17. The multi-specific antibody was shown to provide a similar level of stimulation of the Jurkat cells at both pH 6.0 and pH 7.4, since the measured amount of luciferase (relative luciferase unit, RLU) was similar at both pH's as the amount of target cells increased (the concentration of CHO-Axl cells is shown on the X-axis). Thus, the multi-specific antibody was not conditionally active for pH's of 6.0 and 7.4.

Figure 8B:
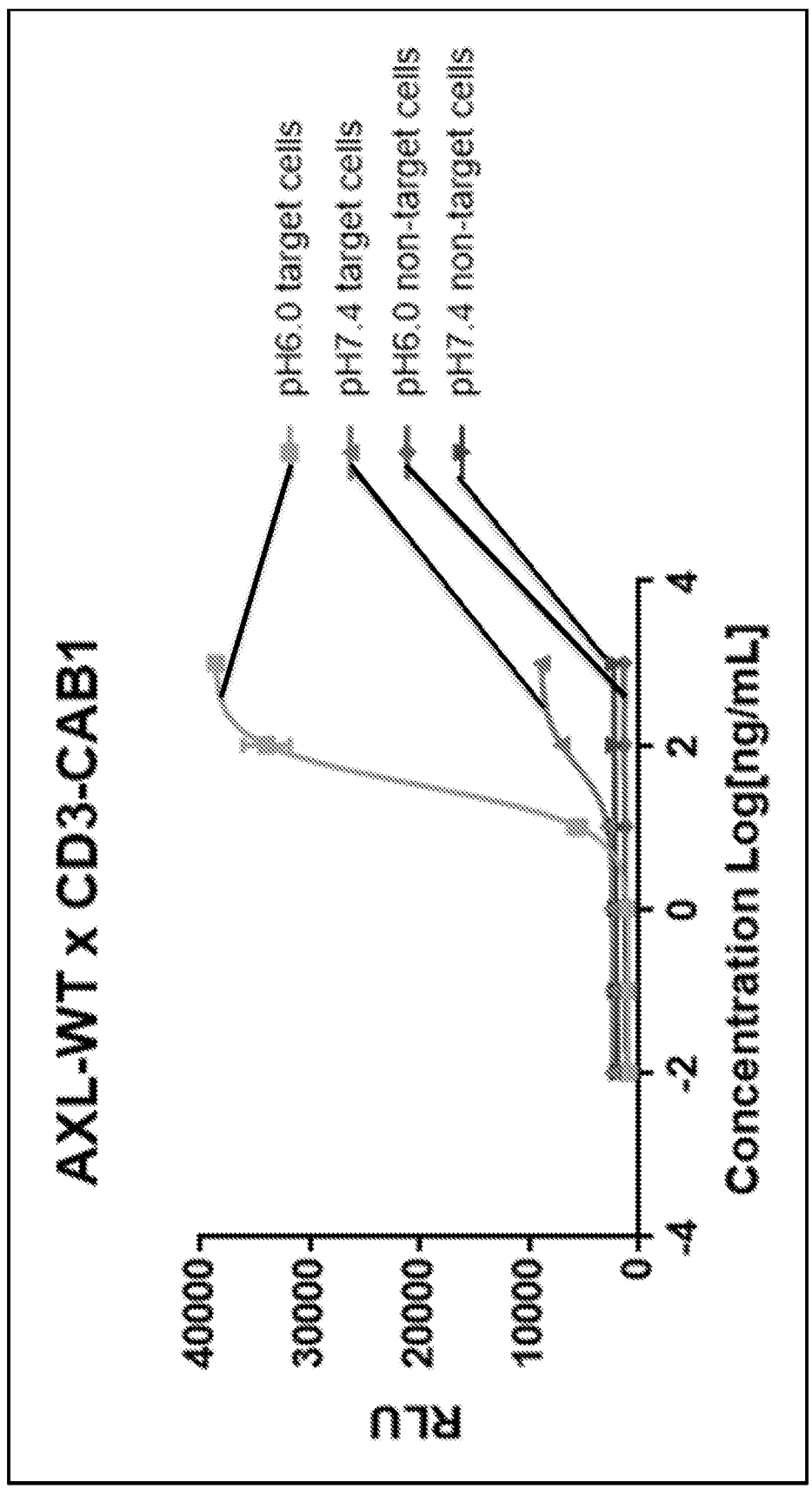
FIG. 8B shows the activity for stimulation of Jurkat effector cells by a bispecific antibody with non-conditional binding activity to Axl and conditional binding activity to CD3.

In FIG. 8B, the multi-specific antibody Axl-WT×CD3-CAB1 is shown to provide a significant increase in the stimulation of the Jurkat cells at pH 6.0 relative to the amount of stimulation at pH 7.4. Thus, this multi-specific antibody was conditionally active in stimulating Jurkat cells as indicated by the significantly increased amount of luciferase that was produced by the stimulated Jurkat cells at pH 6.0 relative to the amount of luciferase produced by the stimulated Jurkat cells at pH 7.4.

The measured luciferase amounts at pH 6.0 and 7.4 for different concentrations of CHO-Axl cells are shown in Table 4.

TABLE 4

| | Luciferase expression in the functional assay | | | | | | | |
|---|---|---|---|---|---|---|---|---|
| CHO-Axl concentration (ng/ml) | Luciferase Amount, pH 6.0 | | | | Luciferase Amount, pH 7.4 | | | |
| 10000.0 | 100080 | 102225 | 28988 | 29976 | 135273 | 139153 | 10497 | 10081 |
| 1000.0 | 90351 | 96185 | 38522 | 38864 | 112604 | 112090 | 9292 | 8616 |
| 100.0 | 77191 | 83231 | 35502 | 32522 | 94102 | 99220 | 7183 | 6999 |
| 10.00 | 44948 | 46733 | 6187 | 5118 | 51811 | 57094 | 3057 | 2660 |
| 1.000 | 10721 | 10023 | 1220 | 1088 | 17742 | 18418 | 2605 | 2429 |
| 0.1000 | 2311 | 1999 | 1036 | 999 | 3928 | 3972 | 2212 | 2436 |
| 0.01000 | 1227 | 1334 | 941 | 988 | 2274 | 2348 | 2351 | 2451 |
| 0.00000 | 893 | 937 | 944 | 922 | 2282 | 2164 | 2186 | 2252 |
| Multi-specific Antibody | AXL-WT × CD3-WT | | AXL-WT × CD3-CAB1 | | AXL-WT × CD3-WT | | AXL-WT × CD3-CAB1 | |

In this example, the negative controls were CHO cells that do not express Axl (i.e., non-target cells). The multi-specific antibodies did not activate the Jurkat cells when the non-target cells were present (FIGS. 8A-8B), indicating that the activation of Jurkat cells was dependent on the presence of the target cells.

Example 21: Multi-Specific Antibodies that Bind to CD3 and EpCAM

In this example, multi-specific antibodies that bind to CD3 and EpCAM were constructed. The multi-specific antibodies were made as described in Example 16 and named in the same way as in Example 16:

EpCAM-WT×CD3-BF1: a non-conditionally active binding site for EpCAM paired with a non-conditionally active binding site for CD3 (BAP150-07-BF1);

EpCAM-WT×CD3-BF3: a non-conditionally active binding site for EpCAM paired with a conditionally active binding site for CD3 (BAP150-07-BF3);

EpCAM-WT×CD3-BF5: a non-conditionally active binding site for EpCAM paired with a conditionally active binding site for CD3 (BAP150-07-BF5);

EpCAM-WT×CD3-BF11: a non-conditionally active binding site for EpCAM paired with a conditionally active binding site for CD3 (BAP150-07-BF11);

EpCAM-WT×CD3-BF36: a non-conditionally active binding site for EpCAM paired with a conditionally active binding site for CD3 (BAP150-07-BF36);

EpCAM-WT×CD3-BF37: a non-conditionally active binding site for EpCAM paired with a conditionally active binding site for CD3 (BAP150-07-BF37);

EpCAM-WT×CD3-BF38: a non-conditionally active binding site for EpCAM paired with a conditionally active binding site for CD3 (BAP150-07-BF38);

EpCAM-WT×CD3-BF39: a non-conditionally active binding site for EpCAM paired with a conditionally active binding site for CD3 (BAP150-07-BF39);

EpCAM-WT×CD3-BF40: a non-conditionally active binding site for EpCAM paired with a conditionally active binding site for CD3 (BAP150-07-BF40); and EpCAM-WT×CD3-BF41: a non-conditionally active binding site for EpCAM paired with a conditionally active binding site for CD3 (BAP150-07-BF41).

The EpCAM-WT portion of each multi-specific antibody is identical and has an anti-EpCAM heavy chain variable region (SEQ ID NO: 85) and a full light chain comprising an anti-EpCAM light chain variable region (SEQ ID NO: 93). The C-terminus of the full length light chain is linked to the binding sites for CD3. Among the binding sites for CD3, CD3-BF1 (SEQ ID NO: 26) is non-conditionally active single chain anti-CD3 antibody, whereas CD3-BF3 (SEQ ID NO: 28), CD3-BF5 (SEQ ID NO: 30), CD3-BF11 (SEQ ID NO: 36), CD3-BF36 (SEQ ID NO: 61), CD3-BF37 (SEQ ID NO: 62), CD3-BF38 (SEQ ID NO: 63), CD3-BF39 (SEQ ID NO: 64), CD3-BF40 (SEQ ID NO: 65), and CD3-BF41 (SEQ ID NO: 66) are conditionally active single chain anti-CD3 antibodies.

Figure 9:
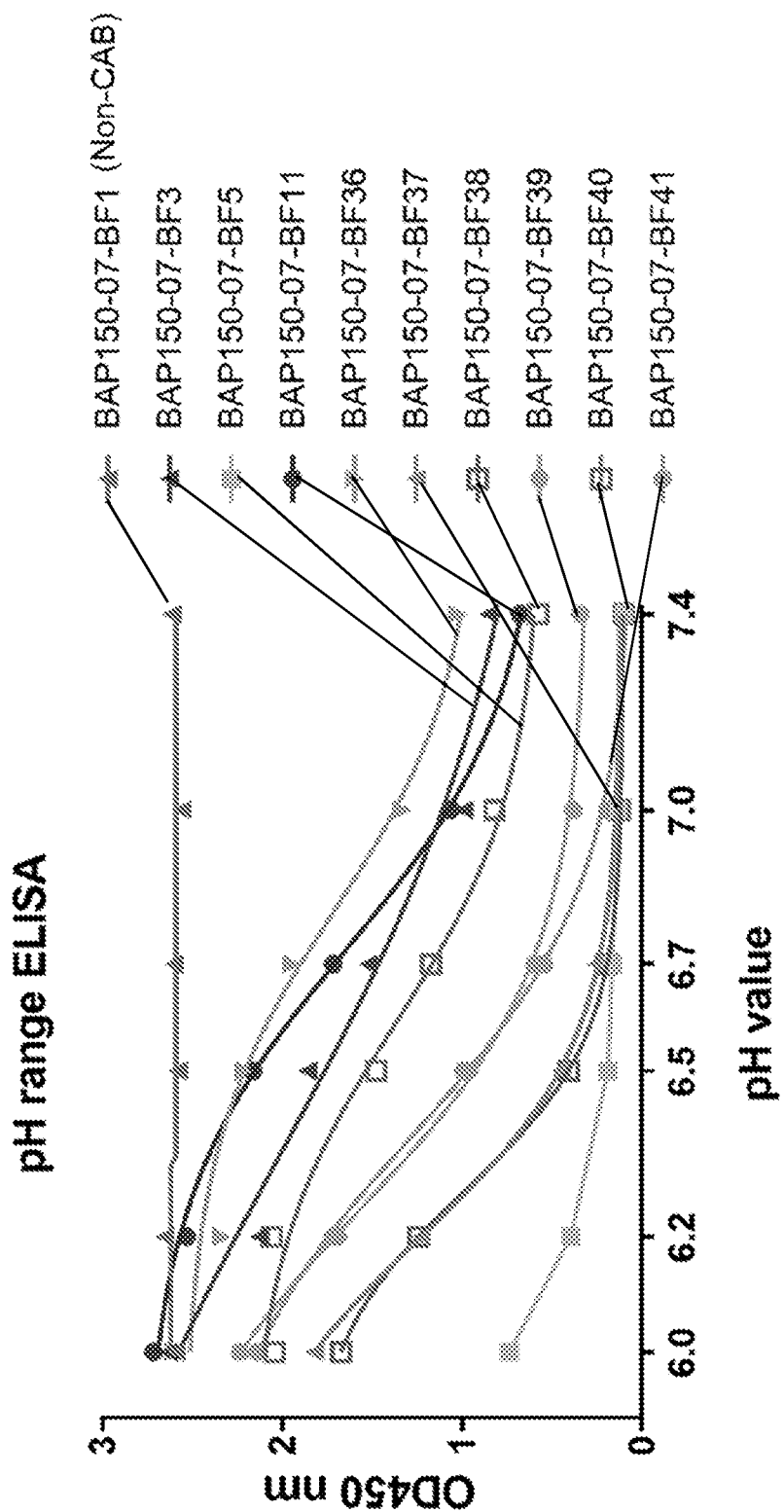
FIG. 9 shows the conditional binding activity to CD3 of multi-specific antibodies of the present invention at pH values of from 6.0 to 7.4, as measured by ELISA. These multi-specific antibodies bind to both CD3 and EpCAM.

The foregoing multi-specific antibodies were assayed for their affinity to CD3 at pH values of from 6.0 to 7.4 with CD3 immobilized in the ELISA assay (FIG. 9). It was observed that, when the multi-specific antibodies included a conditionally active anti-CD3 single chain antibody, they showed increased affinity to CD3 at pH 6.0 as compared to the affinity to CD3 at pH 7.4. The negative control (BAP150-07-BF1) in which the binding site to CD3 is not conditionally active, has a binding affinity to CD3 that is not pH-dependent in the pH range of from 6.0 to 7.4.

Example 22: Multi-Specific Antibodies to CD3 and EpCAM for Treatment of Tumors

A multi-specific antibody (EpCAM×CAB-CD3) comprising a non-conditionally active binding site to EpCAM and a conditionally active binding site to CD3 was used to treat a tumor xenograft mouse model in an MiXeno mouse model produced by Crown Bioscience (San Diego, CA). Particularly, colon cancer cell line HCT116 cells (EpCAM positive) were implanted in triple immunodeficient mice engrafted with human peripheral blood mononucleated cells to induce tumors in the mouse model. When the tumor volume reached approximately 150 mm$^3$, the tumor bearing animals were randomized to 4 treatment groups. The four treatment groups were treated with a vehicle as a negative control (group 1), a non-CAB-CD3 bench mark antibody as a positive control (group 2), the multi-specific antibody EpCAM×CAB-CD3 (group 3) or an isotype matched antibody as a negative control (group 4). The antibodies were administered at a dose of 2.5 mg/kg biweekly for 4 weeks. The non-CAB-CD3 bench mark antibody comprised a non-conditionally active binding site to EpCAM and a non-conditionally active binding site to CD3.

Figure 10:
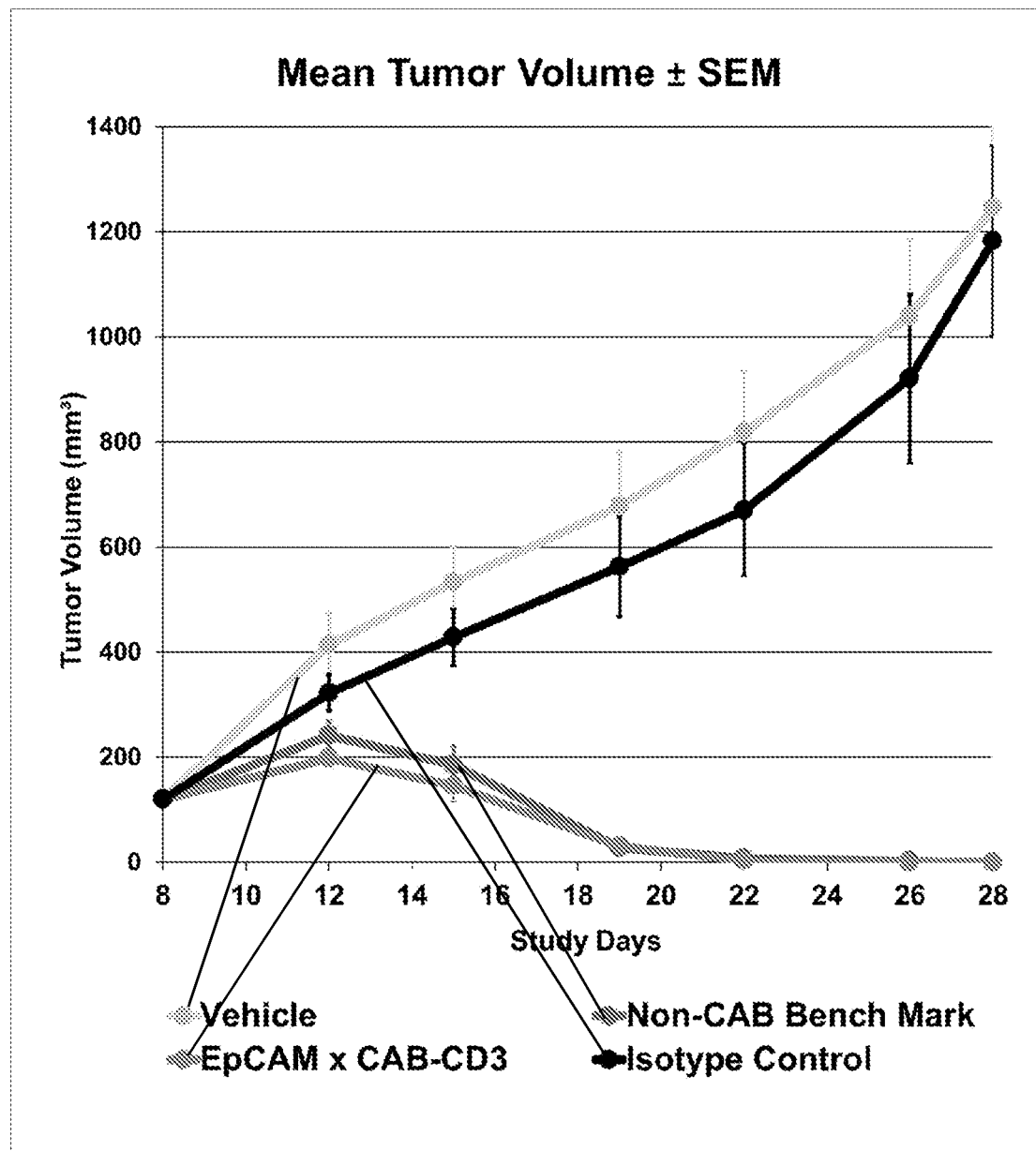
FIG. 10 shows the mean tumor volume as a result of treatment of tumor xenograft mice with the bispecific antibody (EpCAM×CAB-CD3) of the present invention.

The multi-specific antibody EpCAM×CAB-CD3 was as effective as the positive control non-CAB-CD3 bench mark antibody in causing complete tumor regression in the xenograft mouse model, while the two negative controls failed to cause tumor regression since the size of the tumors continued to increase in the mice of these negative control groups. See FIG. 10.

Figure 11:
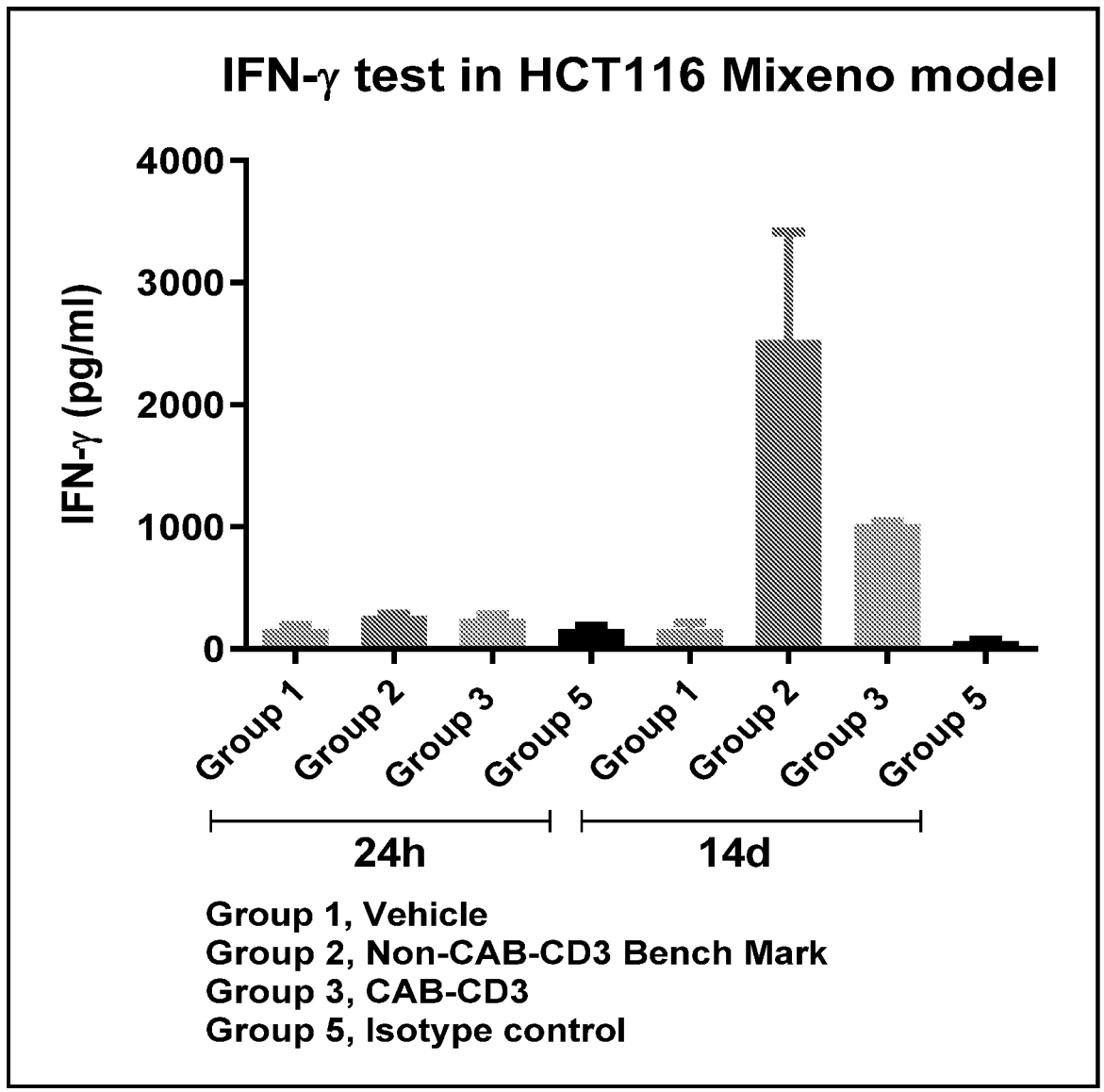
FIG. 11 shows reduced T-cell activation in the peripheral circulation system by the bispecific antibody (EpCAM×CAB-CD3) of the present invention as compared to the vehicle, the isotype control and to the non-conditionally active benchmark antibody.

Anti-CD3 antibodies have a side effect of causing T-cell activation in the peripheral circulation system, which may be measured by the serum INF-γ level using the Meso Scale Discovery (MSD) assay. The multi-specific antibody EpCAM×CAB-CD3 caused significantly reduced T-cell activation compared to the positive control non-CAB-CD3 bench mark antibody. See FIG. 11. Thus, the multi-specific antibody EpCAM×CAB-CD3, because of having a conditionally active anti-CD3 antibody component, caused significantly reduced side effects but had a comparable therapeutic effect, in comparison with the positive control non-CAB-CD3 bench mark antibody.

All documents mentioned herein are hereby incorporated by reference in their entirety and at least to provide the disclosure for which they were specifically relied upon or cited as referring to. The applicant(s) do not intend to dedicate any disclosed embodiments to the public, and to the extent any disclosed modifications or alterations may not literally fall within the scope of the claims, they are considered to be part hereof under the doctrine of equivalents.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

What is claimed is:

1. A conditionally active multi-specific antibody comprising:
   an IgG antibody or antigen binding fragment thereof having at least one binding site for a cancer cell antigen, and
   an anti-CD3 scFv antibody that binds to a CD3 antigen, wherein said anti-CD3 scFv antibody has the amino acid sequence selected from the group consisting of SEQ ID NOs: 28, 30, 36, 44, 61, 62, 63, 64, 65, 66 and 71; and;
   at least one of said anti-CD3 scFv antibody and said IgG antibody or antigen binding fragment thereof reversibly binds to its antigen with a greater affinity at a pH of 6.0 than at a pH of 7.4.

2. The conditionally active multi-specific antibody of claim 1, wherein the cancer cell antigen is a tumor cell antigen located on a surface of a tumor cell.

3. The conditionally active multi-specific antibody of claim 2, wherein the tumor cell antigen is a neoantigen.

4. The conditionally active multi-specific antibody of claim 1, wherein the cancer cell antigen is a senescent cell specific antigen.

5. The conditionally active multi-specific antibody of claim 1, wherein the conditionally active multi-specific antibody is configured in an appended IgGs-LC fusion format.

6. A conjugated conditionally active multi-specific antibody comprising the conditionally active multi-specific antibody of claim 1 conjugated to a macromolecule.

7. The conjugated conditionally active multi-specific antibody of claim 6, wherein the macromolecule is selected from the group consisting of a protein, a fatty acid, a polymer, and combinations thereof.

8. The conjugated conditionally active multi-specific antibody of claim 6, wherein the macromolecule is selected from the group consisting of an albumin and polyethylene glycol.

9. The conditionally active multi-specific antibody of claim 1, wherein said anti-CD3 scFv antibody is attached to a C terminus of at least one light chain or heavy chain of said IgG antibody or antigen binding fragment thereof via a linker.

10. The conditionally active multi-specific antibody of claim 1, wherein the CD3 antigen is on a lymphocyte selected from the group consisting of T cells, Jurkat cells, NK cells, and lymphokine-activated killer cells.

11. The conditionally active multi-specific antibody of claim 1, wherein the cancer cell antigen is selected from the group consisting of Axl, EpCAM, Ror2, Her2, B7-H3, and Nectin4.

12. The conditionally active multi-specific antibody of claim 1, wherein said conditionally active multi-specific antibody binds to the cancer cell antigen with a greater affinity at the pH of 6.0 than at the pH of 7.4.

13. The conditionally active multi-specific antibody of claim 1, wherein said conditionally active multi-specific antibody binds to the CD3 antigen with a greater affinity at the pH of 6.0 than at the pH of 7.4.

14. The conditionally active multi-specific antibody of claim 1, wherein said conditionally active multi-specific antibody binds to both of the cancer cell antigen and the CD3 antigen with a greater affinity at the pH of 6.0 than at the pH of 7.4.

15. The conditionally active multi-specific antibody of claim 1, wherein said conditionally active multi-specific antibody binds to a combination of the cancer cell antigen and the CD3 antigen with a greater avidity at the pH of 6.0 than at the pH of 7.4.

16. The conditionally active multi-specific antibody of claim 1, wherein said IgG antibody or antigen binding fragment thereof is selected from the group consisting of:
an anti-Axl IgG antibody or antigen binding fragment thereof having at least one binding site for an Axl antigen, said anti-Axl antibody or antigen binding fragment thereof including at least one of:
a light chain variable region comprising the amino acid sequence of SEQ ID NO: 17, and
a heavy chain variable region comprising the amino acid sequence of SEQ ID NO:19; and
an anti-B7-H3 IgG antibody or antigen binding fragment thereof having at least one binding site for a B7-H3 antigen, said anti-B7-H3 IgG antibody or antigen binding fragment thereof including:
a heavy chain variable region comprising the amino acid sequence selected from the group consisting of SEQ ID NOs: 24-25;
wherein each of said anti-CD3 scFv antibody and said IgG antibody or antigen binding fragment thereof reversibly binds to its antigen with a greater affinity at the pH of 6.0 than at the pH of 7.4.

17. The conditionally active multi-specific antibody of claim 1, wherein said IgG antibody or antigen binding fragment thereof is selected from the group consisting of:
an anti-Axl IgG antibody or antigen binding fragment thereof having at least one binding site for an Axl antigen, said anti-Axl IgG antibody or antigen binding fragment thereof comprising:
a light chain variable region comprising the amino acid sequence selected from the group consisting of SEQ ID NOs: 16-17, and
a heavy chain variable region comprising the amino acid sequence selected from the group consisting of SEQ ID NOs:18-19; and
an anti-Her2 IgG antibody or antigen binding fragment thereof having at least one binding site for a Her2 antigen, said anti-Her2 IgG antibody or antigen binding fragment thereof comprising:
a light chain variable region comprising the amino acid sequence of SEQ ID NO: 20, and
a heavy chain variable region comprising the amino acid sequence of SEQ ID NOs: 21; and
an anti-B7-H3 IgG antibody or antigen binding fragment thereof having at least one binding site for a B7-H3 antigen, said anti-B7-H3 IgG antibody or antigen binding fragment thereof comprising:
a light chain variable region comprising the amino acid sequence of SEQ ID NO: 22, and
a heavy chain variable region comprising the amino acid sequence selected from the group consisting of SEQ ID NOs 23-25; and
an anti-EpCAM IgG antibody or antigen binding fragment thereof having at least one binding site for an EpCAM antigen, said anti-EpCAM IgG antibody or antigen binding fragment thereof comprising:
a light chain variable region comprising the amino acid sequence selected from the group consisting of SEQ ID NOs: 88-95, and
a heavy chain variable region comprising the amino acid sequence selected from the group consisting of SEQ ID NOs: 80-87.

18. The conditionally active multi-specific antibody of claim 1, wherein said anti-CD3 scFv antibody comprises the amino acid sequence selected from the group consisting of SEQ ID NOs: 44 and 71.

19. The conditionally active multi-specific antibody of claim 4, wherein the senescent cell antigen is Nectin4.

20. The conditionally active multi-specific antibody of claim 19, wherein said anti-CD3 scFv antibody comprises the amino acid sequence selected from the group consisting of SEQ ID NOs: 44 and 71.

21. The conditionally active multi-specific antibody of claim 1, wherein said anti-CD3 scFv antibody comprises the amino acid sequence of SEQ ID NO: 44.

22. The conditionally active multi-specific antibody of claim 19, wherein said anti-CD3 scFv antibody comprises the amino acid sequence of SEQ ID NO: 44.

\* \* \* \* \*

SEQUENCE LISTING

```
<160> NUMBER OF SEQ ID NOS: 95

<210> SEQ ID NO 1
<211> LENGTH: 110
<212> TYPE: PRT
<213> ORGANISM: Artificial
<220> FEATURE:
<223> OTHER INFORMATION: Synthetic sequence

<400> SEQUENCE: 1
```

Gln Ala Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Val Gln Gln Lys Pro Gly Gln Ala Pro Arg Gly
        35                  40                  45

Leu Ile Gly Gly Thr Asn Lys Arg Ala Pro Trp Thr Pro Ala Arg Phe
    50                  55                  60

Ser Gly Ser Leu Leu Gly Gly Lys Ala Ala Leu Thr Ile Thr Gly Ala
65                  70                  75                  80

Gln Ala Glu Asp Glu Ala Asp Tyr Tyr Cys Ala Leu Trp Tyr Ser Asn
                85                  90                  95

Leu Trp Val Phe Gly Gly Gly Thr Lys Leu Thr Val Leu Gly
            100                 105                 110

<210> SEQ ID NO 2
<211> LENGTH: 110
<212> TYPE: PRT
<213> ORGANISM: Artificial
<220> FEATURE:
<223> OTHER INFORMATION: Synthetic sequence

<400> SEQUENCE: 2

Gln Ala Val Val Thr Gln Glu Pro Ser Leu Thr Val Ser Pro Gly Gly
1               5                   10                  15

Thr Val Thr Leu Thr Cys Arg Ser Pro Thr Gly Ala Val Thr Thr Ser
            20                  25                  30

Asn Tyr Ala Asn Trp Val Gln Gln Lys Pro Gly Gln Ala Pro Arg Gly
        35                  40                  45

Leu Ile Gly Gly Thr Asn Lys Arg Ala Pro Trp Thr Pro Ala Arg Phe
    50                  55                  60

Ser Gly Ser Leu Leu Gly Gly Lys Ala Ala Leu Thr Ile Thr Gly Ala
65                  70                  75                  80

Gln Ala Glu Asp Glu Ala Asp Tyr Tyr Cys Ala Leu Trp Tyr Ser Asn
                85                  90                  95

Leu Trp Val Phe Gly Gly Gly Thr Lys Leu Thr Val Leu Gly
            100                 105                 110

<210> SEQ ID NO 3
<211> LENGTH: 110
<212> TYPE: PRT
<213> ORGANISM: Artificial
<220> FEATURE:
<223> OTHER INFORMATION: Synthetic sequence

<400> SEQUENCE: 3

Gln Ala Val Val Thr Gln Glu Pro Ser Leu Thr Val Ser Pro Gly Gly
1               5                   10                  15

Thr Val Thr Leu Thr Cys Pro Ser Ser Thr Gly Ala Val Thr Thr Ser
            20                  25                  30

Asn Tyr Ala Asn Trp Val Gln Gln Lys Pro Gly Gln Ala Pro Arg Gly
        35                  40                  45

Leu Ile Gly Gly Thr Asn Lys Arg Ala Pro Trp Thr Pro Ala Arg Phe
    50                  55                  60

Ser Gly Ser Leu Leu Gly Gly Lys Ala Ala Leu Thr Ile Thr Gly Ala
65                  70                  75                  80

Gln Ala Glu Asp Glu Ala Asp Tyr Tyr Cys Ala Leu Trp Tyr Ser Asn
                85                  90                  95

```
Leu Trp Val Phe Gly Gly Gly Thr Lys Leu Thr Val Leu Gly
            100                 105                 110

<210> SEQ ID NO 4
<211> LENGTH: 110
<212> TYPE: PRT
<213> ORGANISM: Artificial
<220> FEATURE:
<223> OTHER INFORMATION: Synthetic sequence

<400> SEQUENCE: 4

Gln Ala Val Val Thr Gln Glu Pro Ser Leu Thr Val Ser Pro Gly Gly
1               5                   10                  15

Thr Val Thr Leu Thr Cys Arg Ser Ser Thr Gly Ala Val Leu Thr Ser
            20                  25                  30

Asn Tyr Ala Asn Trp Val Gln Gln Lys Pro Gly Gln Ala Pro Arg Gly
        35                  40                  45

Leu Ile Gly Gly Thr Asn Lys Arg Ala Pro Trp Thr Pro Ala Arg Phe
    50                  55                  60

Ser Gly Ser Leu Leu Gly Gly Lys Ala Ala Leu Thr Ile Thr Gly Ala
65                  70                  75                  80

Gln Ala Glu Asp Glu Ala Asp Tyr Tyr Cys Ala Leu Trp Tyr Ser Asn
                85                  90                  95

Leu Trp Val Phe Gly Gly Gly Thr Lys Leu Thr Val Leu Gly
            100                 105                 110

<210> SEQ ID NO 5
<211> LENGTH: 110
<212> TYPE: PRT
<213> ORGANISM: Artificial
<220> FEATURE:
<223> OTHER INFORMATION: Synthetic sequence

<400> SEQUENCE: 5

Gln Ala Val Val Thr Gln Glu Pro Ser Leu Thr Val Ser Pro Gly Gly
1               5                   10                  15

Thr Val Thr Leu Thr Cys Arg Ser Ser Thr Gly Ala Ser Thr Thr Ser
            20                  25                  30

Asn Tyr Ala Asn Trp Val Gln Gln Lys Pro Gly Gln Ala Pro Arg Gly
        35                  40                  45

Leu Ile Gly Gly Thr Asn Lys Arg Ala Pro Trp Thr Pro Ala Arg Phe
    50                  55                  60

Ser Gly Ser Leu Leu Gly Gly Lys Ala Ala Leu Thr Ile Thr Gly Ala
65                  70                  75                  80

Gln Ala Glu Asp Glu Ala Asp Tyr Tyr Cys Ala Leu Trp Tyr Ser Asn
                85                  90                  95

Leu Trp Val Phe Gly Gly Gly Thr Lys Leu Thr Val Leu Gly
            100                 105                 110

<210> SEQ ID NO 6
<211> LENGTH: 110
<212> TYPE: PRT
<213> ORGANISM: Artificial
<220> FEATURE:
<223> OTHER INFORMATION: Synthetic sequence

<400> SEQUENCE: 6

Gln Ala Val Val Thr Gln Glu Pro Ser Leu Thr Val Ser Pro Gly Gly
1               5                   10                  15
```

```
Thr Val Thr Leu Thr Cys Arg Phe Ser Thr Gly Ala Val Thr Ser
            20                  25                  30

Asn Tyr Ala Asn Trp Val Gln Gln Lys Pro Gly Gln Ala Pro Arg Gly
            35                  40                  45

Leu Ile Gly Gly Thr Asn Lys Arg Ala Pro Trp Thr Pro Ala Arg Phe
     50                  55                  60

Ser Gly Ser Leu Leu Gly Gly Lys Ala Ala Leu Thr Ile Thr Gly Ala
 65              70                  75                  80

Gln Ala Glu Asp Glu Ala Asp Tyr Tyr Cys Ala Leu Trp Tyr Ser Asn
                 85                  90                  95

Leu Trp Val Phe Gly Gly Gly Thr Lys Leu Thr Val Thr Gly
            100                 105                 110

<210> SEQ ID NO 7
<211> LENGTH: 110
<212> TYPE: PRT
<213> ORGANISM: Artificial
<220> FEATURE:
<223> OTHER INFORMATION: Synthetic sequence

<400> SEQUENCE: 7

Gln Ala Val Val Thr Gln Glu Pro Ser Leu Thr Val Ser Pro Gly Gly
 1               5                  10                  15

Thr Val Thr Leu Thr Cys Arg Ser Ser Thr Gly Ala Val Thr Thr Ser
            20                  25                  30

Asn Tyr Ala Asn Trp Val Gln Gln Lys Pro Gly Gln Ala Pro Arg Gly
            35                  40                  45

Leu Ile Gly Gly Thr Asn Lys Arg Ala Pro Trp Thr Pro Ala Arg Phe
     50                  55                  60

Ser Gly Ser Leu Leu Gly Gly Lys Ala Ala Leu Thr Ile Thr Gly Ala
 65              70                  75                  80

Gln Ala Glu Asp Glu Ala Asp Tyr Tyr Cys Ala Leu Trp Tyr Ser Asn
                 85                  90                  95

Leu Trp Val Phe Gly Gly Gly Thr Lys Leu Thr Val Gln Gly
            100                 105                 110

<210> SEQ ID NO 8
<211> LENGTH: 110
<212> TYPE: PRT
<213> ORGANISM: Artificial
<220> FEATURE:
<223> OTHER INFORMATION: Synthetic sequence

<400> SEQUENCE: 8

Gln Ala Val Val Thr Gln Glu Pro Ser Leu Thr Val Ser Pro Gly Gly
 1               5                  10                  15

Thr Val Thr Leu Thr Cys Arg Ser Ser Thr Gly Ala Val Thr Thr Ser
            20                  25                  30

Asn Tyr Asp Asn Trp Val Gln Gln Lys Pro Gly Gln Ala Pro Arg Gly
            35                  40                  45

Leu Ile Gly Gly Thr Asn Lys Arg Ala Pro Trp Thr Pro Ala Arg Phe
     50                  55                  60

Ser Gly Ser Leu Leu Gly Gly Lys Ala Ala Leu Thr Ile Thr Gly Ala
 65              70                  75                  80

Gln Ala Glu Asp Glu Ala Asp Tyr Tyr Cys Ala Leu Trp Tyr Ser Asn
                 85                  90                  95

Leu Trp Val Phe Gly Gly Gly Thr Lys Leu Thr Val Leu Gly
            100                 105                 110
```

<210> SEQ ID NO 9
<211> LENGTH: 110
<212> TYPE: PRT
<213> ORGANISM: Artificial
<220> FEATURE:
<223> OTHER INFORMATION: Synthetic sequence

<400> SEQUENCE: 9

Gln Ala Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Glu Asn Trp Val Gln Gln Lys Pro Gly Gln Ala Pro Arg Gly
        35                  40                  45

Leu Ile Gly Gly Thr Asn Lys Arg Ala Pro Trp Thr Pro Ala Arg Phe
    50                  55                  60

Ser Gly Ser Leu Leu Gly Gly Lys Ala Ala Leu Thr Ile Thr Gly Ala
65                  70                  75                  80

Gln Ala Glu Asp Glu Ala Asp Tyr Tyr Cys Ala Leu Trp Tyr Ser Asn
                85                  90                  95

Leu Trp Val Phe Gly Gly Gly Thr Lys Leu Thr Val Leu Gly
            100                 105                 110

<210> SEQ ID NO 10
<211> LENGTH: 110
<212> TYPE: PRT
<213> ORGANISM: Artificial
<220> FEATURE:
<223> OTHER INFORMATION: Synthetic sequence

<400> SEQUENCE: 10

Gln Ala Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Val Gln Gln Lys Pro Gly Gln Ala Pro Arg Gly
        35                  40                  45

Leu Ile Gly Gly Thr Asn Lys Arg Ala Pro Trp Thr Pro Ala Arg Phe
    50                  55                  60

Ser Gly Ser Leu Leu Gly Gly Lys Ala Ala Leu Thr Ile Thr Gly Ala
65                  70                  75                  80

Gln Ala Glu Asp Glu Ala Asp Tyr Tyr Cys Lys Leu Trp Tyr Ser Asn
                85                  90                  95

Leu Trp Val Phe Gly Gly Gly Thr Lys Leu Thr Val Leu Gly
            100                 105                 110

<210> SEQ ID NO 11
<211> LENGTH: 125
<212> TYPE: PRT
<213> ORGANISM: Artificial
<220> FEATURE:
<223> OTHER INFORMATION: Synthetic sequence

<400> SEQUENCE: 11

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

```
Ala Met Asn Trp Val Arg Gln Ala Pro Gly Lys Gly Leu Glu Trp Val
            35                  40                  45

Ala Arg Ile Arg Ser Lys Tyr Asn Asn Tyr Ala Thr Tyr Tyr Ala Asp
        50                  55                  60

Ser Val Lys Asp Arg Phe Thr Ile Ser Arg Asp Asp Ser Lys Asn Ser
 65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser
        115                 120                 125

<210> SEQ ID NO 12
<211> LENGTH: 125
<212> TYPE: PRT
<213> ORGANISM: Artificial
<220> FEATURE:
<223> OTHER INFORMATION: Synthetic sequence

<400> SEQUENCE: 12

Glu Val Gln Leu Val Glu Ser Gly Gly Gly Leu Val Gln Pro Gly Gly
 1               5                  10                  15

Ser Leu Arg Leu Ser Cys Ala Ala Ser Gly Phe Thr Phe Asn Thr Tyr
                20                  25                  30

Ala Met Asn Trp Val Arg Gln Ala Pro Gly Lys Gly Leu Glu Trp Val
            35                  40                  45

Ala Lys Ile Arg Ser Lys Tyr Asn Asn Tyr Ala Thr Tyr Tyr Ala Asp
        50                  55                  60

Ser Val Lys Asp Arg Phe Thr Ile Ser Arg Asp Asp Ser Lys Asn Ser
 65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser
        115                 120                 125

<210> SEQ ID NO 13
<211> LENGTH: 125
<212> TYPE: PRT
<213> ORGANISM: Artificial
<220> FEATURE:
<223> OTHER INFORMATION: Synthetic sequence

<400> SEQUENCE: 13

Glu Val Gln Leu Val Glu Ser Gly Gly Gly Leu Val Gln Pro Gly Gly
 1               5                  10                  15

Ser Leu Arg Leu Ser Cys Ala Ala Ser Gly Phe Thr Phe Asn Thr Tyr
                20                  25                  30

Ala Met Asp Trp Val Arg Gln Ala Pro Gly Lys Gly Leu Glu Trp Val
            35                  40                  45

Ala Arg Ile Arg Ser Lys Tyr Asn Asn Tyr Ala Thr Tyr Tyr Ala Asp
        50                  55                  60

Ser Val Lys Asp Arg Phe Thr Ile Ser Arg Asp Asp Ser Lys Asn Ser
 65                  70                  75                  80

Leu Tyr Leu Gln Met Asn Ser Leu Lys Thr Glu Asp Thr Ala Val Tyr
                85                  90                  95
```

```
Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser
        115                 120                 125
```

<210> SEQ ID NO 14
<211> LENGTH: 125
<212> TYPE: PRT
<213> ORGANISM: Artificial
<220> FEATURE:
<223> OTHER INFORMATION: Synthetic sequence

<400> SEQUENCE: 14

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Glu Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser
        115                 120                 125
```

<210> SEQ ID NO 15
<211> LENGTH: 125
<212> TYPE: PRT
<213> ORGANISM: Artificial
<220> FEATURE:
<223> OTHER INFORMATION: Synthetic sequence

<400> SEQUENCE: 15

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Glu His Gly Asn Phe Gly Asn Ser Tyr Val Ser Trp Phe
            100                 105                 110

Ala Tyr Trp Gly Gln Gly Thr Leu Val Thr Val Ser Ser
        115                 120                 125
```

<210> SEQ ID NO 16
<211> LENGTH: 107
<212> TYPE: PRT

<213> ORGANISM: Artificial
<220> FEATURE:
<223> OTHER INFORMATION: Synthetic sequence

<400> SEQUENCE: 16

```
Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Ser Ser Ala
            20                  25                  30

Val Ala Trp Tyr Gln Gln Lys Pro Gly Gln Ala Pro Arg Leu Leu Ile
        35                  40                  45

Tyr Trp Ala Ser Thr Arg His Thr Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Asp Asp Phe Ala Thr Tyr Tyr Cys Gln Glu His Phe Ser Thr Pro Leu
                85                  90                  95

Thr Phe Gly Gln Gly Thr Lys Val Glu Ile Lys
            100                 105
```

<210> SEQ ID NO 17
<211> LENGTH: 107
<212> TYPE: PRT
<213> ORGANISM: Artificial
<220> FEATURE:
<223> OTHER INFORMATION: Synthetic sequence

<400> SEQUENCE: 17

```
Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Val Ser Ala
            20                  25                  30

Val Ala Trp Tyr Gln Gln Lys Pro Gly Gln Ala Pro Arg Leu Leu Ile
        35                  40                  45

Tyr Trp Gln Asp Thr Arg His Thr Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Asp Asp Phe Ala Thr Tyr Tyr Cys Gln Glu His Phe Ser Pro Pro Leu
                85                  90                  95

Thr Phe Gly Gln Gly Thr Lys Val Glu Ile Lys
            100                 105
```

<210> SEQ ID NO 18
<211> LENGTH: 120
<212> TYPE: PRT
<213> ORGANISM: Artificial
<220> FEATURE:
<223> OTHER INFORMATION: Synthetic sequence

<400> SEQUENCE: 18

```
Glu Val Gln Leu Val Gln Ser Gly Ala Glu Val Lys Lys Pro Gly Ala
1               5                   10                  15

Thr Val Lys Ile Ser Cys Lys Val Ser Gly Tyr Ser Phe Thr Gly His
            20                  25                  30

Thr Met Asn Trp Ile Arg Gln Pro Pro Gly Lys Gly Leu Glu Trp Ile
        35                  40                  45

Gly Leu Ile Lys Pro Ser Asn Gly Gly Thr Ser Tyr Asn Gln Lys Phe
    50                  55                  60
```

```
Lys Gly Arg Val Thr Ile Ser Ala Asp Lys Ser Ile Ser Thr Ala Tyr
 65                  70                  75                  80

Leu Gln Trp Ser Ser Leu Lys Ala Ser Asp Thr Ala Met Tyr Tyr Cys
                 85                  90                  95

Ala His Gly His Tyr Glu Ser Tyr Phe Ala Met Asp Tyr Trp Gly Gln
            100                 105                 110

Gly Thr Ser Val Thr Val Ser Ser
            115                 120

<210> SEQ ID NO 19
<211> LENGTH: 120
<212> TYPE: PRT
<213> ORGANISM: Artificial
<220> FEATURE:
<223> OTHER INFORMATION: Synthetic sequence

<400> SEQUENCE: 19

Glu Val Gln Leu Val Gln Ser Gly Ala Glu Val Lys Lys Pro Gly Ala
 1               5                  10                  15

Thr Val Lys Ile Ser Cys Lys Val Ser Gly Tyr Ser Phe Trp Gly Ala
                 20                  25                  30

Thr Met Asn Trp Ile Arg Gln Pro Pro Gly Lys Gly Leu Glu Trp Ile
             35                  40                  45

Gly Leu Ile Lys Pro Ser Asn Gly Gly Thr Ser Tyr Asn Gln Lys Phe
 50                  55                  60

Lys Gly Arg Val Thr Ile Ser Ala Asp Lys Ser Ile Ser Thr Ala Tyr
 65                  70                  75                  80

Leu Gln Trp Ser Ser Leu Lys Ala Ser Asp Thr Ala Met Tyr Tyr Cys
                 85                  90                  95

Ala His Gly His Tyr Glu Ser Tyr Glu Ala Met Asp Tyr Trp Gly Gln
            100                 105                 110

Gly Thr Leu Val Thr Val Ser Ser
            115                 120

<210> SEQ ID NO 20
<211> LENGTH: 107
<212> TYPE: PRT
<213> ORGANISM: Artificial
<220> FEATURE:
<223> OTHER INFORMATION: Synthetic sequence

<400> SEQUENCE: 20

Asp Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Val Asn Thr Ala
                 20                  25                  30

Val Ala Trp Tyr Gln Gln Lys Pro Gly Lys Ala Pro Lys Leu Leu Ile
             35                  40                  45

Tyr Ser Ala Ser Phe Leu Tyr Ser Gly Val Pro Ser Arg Phe Ser Gly
 50                  55                  60

Ser Arg Ser Gly Thr Asp Phe Thr Leu Thr Ile Ser Ser Leu Gln Pro
 65                  70                  75                  80

Glu Asp Phe Ala Thr Tyr Tyr Cys Gln Gln His Tyr Thr Thr Pro Pro
                 85                  90                  95

Thr Phe Gly Gln Gly Thr Lys Val Glu Ile Lys
            100                 105
```

-continued

```
<210> SEQ ID NO 21
<211> LENGTH: 120
<212> TYPE: PRT
<213> ORGANISM: Artificial
<220> FEATURE:
<223> OTHER INFORMATION: Synthetic sequence

<400> SEQUENCE: 21

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val
        35                  40                  45

Ala Arg Ile Tyr Pro Thr Asn Gly Tyr Thr Arg Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ser Arg Trp Gly Gly Asp Gly Phe Tyr Ala Met Asp Tyr Trp Gly Gln
            100                 105                 110

Gly Thr Leu Val Thr Val Ser Ser
        115                 120

<210> SEQ ID NO 22
<211> LENGTH: 112
<212> TYPE: PRT
<213> ORGANISM: Artificial
<220> FEATURE:
<223> OTHER INFORMATION: Synthetic sequence

<400> SEQUENCE: 22

Asp Val Val Met Thr Gln Thr Pro Leu Ser Leu Pro Val Ser Leu Gly
1               5                   10                  15

Asp His Ala Ser Ile Ser Cys Arg Ser Ser Gln Ser Leu Ile His Ser
            20                  25                  30

Asn Gly Ile Thr Tyr Leu His Trp Tyr Leu Gln Lys Pro Gly Gln Ser
        35                  40                  45

Pro Lys Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Phe Cys Ser Gln Ser
                85                  90                  95

Thr His Val Pro Trp Thr Phe Gly Gly Gly Thr Lys Leu Glu Ile Lys
            100                 105                 110

<210> SEQ ID NO 23
<211> LENGTH: 116
<212> TYPE: PRT
<213> ORGANISM: Artificial
<220> FEATURE:
<223> OTHER INFORMATION: Synthetic sequence

<400> SEQUENCE: 23

Gln Ile Gln Leu Val Gln Ser Gly Pro Glu Leu Lys Lys Pro Gly Glu
1               5                   10                  15

Thr Val Lys Ile Ser Cys Lys Ala Ser Gly His Asn Tyr Gly Met Asn
            20                  25                  30
```

Trp Val Lys Gln Ala Pro Gly Lys Gly Leu Lys Trp Met Gly Trp Ile
            35                  40                  45

Asn Pro Tyr Ser Gly Val Pro Thr Tyr Ala Asp Asp Phe Lys Gly Arg
 50                  55                  60

Phe Ala Phe Ser Leu Glu Thr Ser Ala Ser Thr Ala Tyr Leu Gln Ile
65                  70                  75                  80

Asn Asn Leu Lys Asn Glu Asp Thr Ala Thr Tyr Phe Cys Ala Arg Asp
                85                  90                  95

Asp Gly Tyr Phe Tyr Thr Met Asp Tyr Trp Gly Gln Gly Thr Ser Val
                100                 105                 110

Thr Val Ser Ser
        115

<210> SEQ ID NO 24
<211> LENGTH: 116
<212> TYPE: PRT
<213> ORGANISM: Artificial
<220> FEATURE:
<223> OTHER INFORMATION: Synthetic sequence

<400> SEQUENCE: 24

Gln Ile Gln Leu Val Gln Ser Gly Pro Glu Leu Lys Lys Pro Gly Glu
1               5                   10                  15

Thr Val Lys Ile Ser Cys Lys Ala Ser Gly His Asn Tyr Gly Asp Asn
            20                  25                  30

Trp Val Lys Gln Ala Pro Gly Lys Gly Leu Lys Trp Met Gly Trp Ile
            35                  40                  45

Asn Pro Tyr Ser Gly Val Pro Thr Tyr Ala Asp Asp Phe Lys Gly Arg
 50                  55                  60

Phe Ala Phe Ser Leu Glu Thr Ser Ala Ser Thr Ala Tyr Leu Gln Ile
65                  70                  75                  80

Asn Asn Leu Lys Asn Glu Asp Thr Ala Thr Tyr Phe Cys Ala Arg Asp
                85                  90                  95

Asp Gly Tyr Phe Tyr Thr Met Asp Tyr Trp Gly Gln Gly Thr Ser Val
                100                 105                 110

Thr Val Ser Ser
        115

<210> SEQ ID NO 25
<211> LENGTH: 116
<212> TYPE: PRT
<213> ORGANISM: Artificial
<220> FEATURE:
<223> OTHER INFORMATION: Synthetic sequence

<400> SEQUENCE: 25

Gln Ile Gln Leu Val Gln Ser Gly Pro Glu Leu Lys Lys Pro Gly Glu
1               5                   10                  15

Thr Val Lys Ile Ser Cys Lys Ala Ser Gly His Asn Tyr Gly Met Asn
            20                  25                  30

Trp Val Lys Gln Ala Pro Gly Lys Gly Leu Lys Trp Met Gly Trp Ile
            35                  40                  45

Asn Pro Tyr Ser Gly Val Pro Thr Tyr Ala Asp Asp Phe Lys Gly Arg
 50                  55                  60

Phe Ala Phe Ser Leu Glu Thr Ser Ala Ser Thr Ala Tyr Leu Gln Ile
65                  70                  75                  80

Asn Asn Leu Lys Asn Glu Asp Thr Ala Thr Tyr Phe Cys Ala Arg Asp 85                  90                  95

Asp Gly Tyr Phe Tyr Asp Met Asp Tyr Trp Gly Gln Gly Thr Ser Val
            100                 105                 110

Thr Val Ser Ser
        115

<210> SEQ ID NO 26
<211> LENGTH: 248
<212> TYPE: PRT
<213> ORGANISM: Artificial
<220> FEATURE:
<223> OTHER INFORMATION: Synthetic sequence

<400> SEQUENCE: 26

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Ala Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 27
<211> LENGTH: 248
<212> TYPE: PRT
<213> ORGANISM: Artificial
<220> FEATURE:
<223> OTHER INFORMATION: Synthetic sequence

<400> SEQUENCE: 27

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 28
<211> LENGTH: 248
<212> TYPE: PRT
<213> ORGANISM: Artificial
<220> FEATURE:
<223> OTHER INFORMATION: Synthetic sequence

<400> SEQUENCE: 28

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Gly Asn Ser Tyr Val Ser Trp Phe
            100                 105                 110

Ala Tyr Trp Gly Gln Gly Thr Leu Val Thr Val Ser Ser Gly Gly Ser
        115                 120                 125

```
Gly Gly Ser Gly Gly Ser Gly Ser Gly Gly Gln Ala Val Val Thr
        130             135             140
Gln Glu Pro Ser Leu Thr Val Ser Pro Gly Gly Thr Val Thr Leu Thr
145                 150                 155                 160
Cys Arg Ser Ser Thr Gly Ala Val Thr Thr Ser Asn Tyr Asp Asn Trp
                165                 170                 175
Val Gln Gln Lys Pro Gly Gln Ala Pro Arg Gly Leu Ile Gly Gly Thr
            180                 185                 190
Asn Lys Arg Ala Pro Trp Thr Pro Ala Arg Phe Ser Gly Ser Leu Leu
            195                 200                 205
Gly Gly Lys Ala Ala Leu Thr Ile Thr Gly Ala Gln Ala Glu Asp Glu
        210                 215                 220
Ala Asp Tyr Tyr Cys Ala Leu Trp Tyr Ser Asn Leu Trp Val Phe Gly
225                 230                 235                 240
Gly Gly Thr Lys Leu Thr Val Leu
                245
```

<210> SEQ ID NO 29
<211> LENGTH: 248
<212> TYPE: PRT
<213> ORGANISM: Artificial
<220> FEATURE:
<223> OTHER INFORMATION: Synthetic sequence

<400> SEQUENCE: 29

```
Glu Val Gln Leu Val Glu Ser Gly Gly Gly Leu Val Gln Pro Gly Gly
1               5                   10                  15
Ser Leu Arg Leu Ser Cys Ala Ala Ser Gly Phe Thr Phe Asn Thr Tyr
            20                  25                  30
Ala Met Asn Trp Val Arg Gln Ala Pro Gly Lys Gly Leu Glu Trp Val
        35                  40                  45
Ala Arg Ile Arg Ser Lys Tyr Asn Asn Tyr Ala Thr Tyr Tyr Ala Asp
    50                  55                  60
Ser Val Lys Asp Arg Phe Thr Ile Ser Arg Asp Asp Ser Lys Asn Ser
65                  70                  75                  80
Leu Tyr Leu Gln Met Asn Ser Leu Lys Thr Glu Asp Thr Ala Val Tyr
                85                  90                  95
Tyr Cys Val Arg His Gly Asn Phe Pro Asn Ser Tyr Val Ser Trp Phe
            100                 105                 110
Ala Tyr Trp Gly Gln Gly Thr Leu Val Thr Val Ser Ser Gly Gly Ser
        115                 120                 125
Gly Gly Ser Gly Gly Ser Gly Ser Gly Gly Gln Ala Val Val Thr
        130             135             140
Gln Glu Pro Ser Leu Thr Val Ser Pro Gly Gly Thr Val Thr Leu Thr
145                 150                 155                 160
Cys Arg Ser Ser Thr Gly Ala Val Thr Thr Ser Asn Tyr Asp Asn Trp
                165                 170                 175
Val Gln Gln Lys Pro Gly Gln Ala Pro Arg Gly Leu Ile Gly Gly Thr
            180                 185                 190
Asn Lys Arg Ala Pro Trp Thr Pro Ala Arg Phe Ser Gly Ser Leu Leu
            195                 200                 205
Gly Gly Lys Ala Ala Leu Thr Ile Thr Gly Ala Gln Ala Glu Asp Glu
        210                 215                 220
Ala Asp Tyr Tyr Cys Ala Leu Trp Tyr Ser Asn Leu Trp Val Phe Gly
225                 230                 235                 240
```

Gly Gly Thr Lys Leu Thr Val Leu
            245

<210> SEQ ID NO 30
<211> LENGTH: 248
<212> TYPE: PRT
<213> ORGANISM: Artificial
<220> FEATURE:
<223> OTHER INFORMATION: Synthetic sequence

<400> SEQUENCE: 30

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Lys Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
            245

<210> SEQ ID NO 31
<211> LENGTH: 248
<212> TYPE: PRT
<213> ORGANISM: Artificial
<220> FEATURE:
<223> OTHER INFORMATION: Synthetic sequence

<400> SEQUENCE: 31

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

-continued

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 32
<211> LENGTH: 248
<212> TYPE: PRT
<213> ORGANISM: Artificial
<220> FEATURE:
<223> OTHER INFORMATION: Synthetic sequence

<400> SEQUENCE: 32

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

```
Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 33
<211> LENGTH: 248
<212> TYPE: PRT
<213> ORGANISM: Artificial
<220> FEATURE:
<223> OTHER INFORMATION: Synthetic sequence

<400> SEQUENCE: 33

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn His Trp Val Phe Gly
225                 230                 235                 240

Gly Gly Thr Lys Leu Thr Val Leu
                245

<210> SEQ ID NO 34
```

<211> LENGTH: 248
<212> TYPE: PRT
<213> ORGANISM: Artificial
<220> FEATURE:
<223> OTHER INFORMATION: Synthetic sequence

<400> SEQUENCE: 34

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Tyr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 35
<211> LENGTH: 248
<212> TYPE: PRT
<213> ORGANISM: Artificial
<220> FEATURE:
<223> OTHER INFORMATION: Synthetic sequence

<400> SEQUENCE: 35

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser

```
            65                  70                  75                  80
Leu Tyr Leu Gln Met Asn Ser Leu Lys Thr Glu Asp Thr Ala Val Tyr
                    85                  90                  95

Tyr Cys Val Arg His Ser Asn Phe Pro Asn Ser Tyr Val Ser Trp Phe
                    100                 105                 110

Ala Tyr Trp Gly Gln Gly Thr Leu Val Thr Val Ser Ser Gly Gly Ser
                    115                 120                 125

Gly Gly Ser Gly Gly Ser Gly Gly Ser Gly Gly Gln Ala Val Val Thr
        130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                    165                 170                 175

Val Gln Gln Lys Pro Gly Gln Ala Pro Arg Gly Leu Ile Gly Gly Thr
                    180                 185                 190

Asn Lys Arg Ala Pro Trp Thr Pro Ala Arg Phe Ser Gly Ser Leu Leu
                    195                 200                 205

Gly Gly Lys Ala Ala Leu Thr Ile Thr Gly Ala Gln Ala Glu Asp Glu
        210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                    245
```

<210> SEQ ID NO 36
<211> LENGTH: 248
<212> TYPE: PRT
<213> ORGANISM: Artificial
<220> FEATURE:
<223> OTHER INFORMATION: Synthetic sequence

<400> SEQUENCE: 36

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
                20                  25                  30

Ala Met Asn Trp Val Arg Gln Ala Pro Gly Lys Gly Leu Glu Trp Val
            35                  40                  45

Ala Arg Ile Arg Ser Lys Tyr Asn Asn Tyr Ala Thr Tyr Tyr Ala Asp
        50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                    85                  90                  95

Tyr Cys Val Arg His Ser Asn Phe Gly Asn Ser Lys Val Ser Trp Phe
                    100                 105                 110

Ala Tyr Trp Gly Gln Gly Thr Leu Val Thr Val Ser Ser Gly Gly Ser
                    115                 120                 125

Gly Gly Ser Gly Gly Ser Gly Gly Ser Gly Gly Gln Ala Val Val Thr
        130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                    165                 170                 175

Val Gln Gln Lys Pro Gly Gln Ala Pro Arg Gly Leu Ile Gly Gly Thr
```

180                 185                 190
Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
        210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 37
<211> LENGTH: 248
<212> TYPE: PRT
<213> ORGANISM: Artificial
<220> FEATURE:
<223> OTHER INFORMATION: Synthetic sequence

<400> SEQUENCE: 37

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Gly Asn Ser Tyr Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Gly Ser Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
        210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 38
<211> LENGTH: 248
<212> TYPE: PRT
<213> ORGANISM: Artificial
<220> FEATURE:
<223> OTHER INFORMATION: Synthetic sequence

<400> SEQUENCE: 38

```
Glu Val Gln Leu Val Glu Ser Gly Gly Gly Leu Val Gln Pro Gly Gly
1               5                   10                  15
Ser Leu Arg Leu Ser Cys Ala Ala Ser Gly Phe Thr Phe Asn Thr Tyr
            20                  25                  30
Ala Met Asn Trp Val Arg Gln Ala Pro Gly Lys Gly Leu Glu Trp Val
        35                  40                  45
Ala Arg Ile Arg Ser Lys Tyr Asn Asn Tyr Ala Thr Tyr Tyr Ala Asp
    50                  55                  60
Ser Val Lys Asp Arg Phe Thr Ile Ser Arg Asp Asp Ser Lys Asn Ser
65                  70                  75                  80
Leu Tyr Leu Gln Met Asn Ser Leu Lys Thr Glu Asp Thr Ala Val Tyr
                85                  90                  95
Tyr Cys Val Arg His Gly Asn Phe Pro Asn Ser Lys Val Ser Trp Phe
            100                 105                 110
Ala Tyr Trp Gly Gln Gly Thr Leu Val Thr Val Ser Ser Gly Gly Ser
        115                 120                 125
Gly Gly Ser Gly Gly Ser Gly Gly Ser Gly Gly Gln Ala Val Val Thr
    130                 135                 140
Gln Glu Pro Ser Leu Thr Val Ser Pro Gly Gly Thr Val Thr Leu Thr
145                 150                 155                 160
Cys Arg Ser Ser Thr Gly Ala Val Thr Thr Ser Asn Tyr Asp Asn Trp
                165                 170                 175
Val Gln Gln Lys Pro Gly Gln Ala Pro Arg Gly Leu Ile Gly Gly Thr
            180                 185                 190
Asn Lys Arg Ala Pro Trp Thr Pro Ala Arg Phe Ser Gly Ser Leu Leu
        195                 200                 205
Gly Gly Lys Ala Ala Leu Thr Ile Thr Gly Ala Gln Ala Glu Asp Glu
    210                 215                 220
Ala Asp Tyr Tyr Cys Ala Leu Trp Tyr Ser Asn Leu Trp Val Phe Gly
225                 230                 235                 240
Gly Gly Thr Lys Leu Thr Val Leu
                245
```

<210> SEQ ID NO 39
<211> LENGTH: 248
<212> TYPE: PRT
<213> ORGANISM: Artificial
<220> FEATURE:
<223> OTHER INFORMATION: Synthetic sequence

<400> SEQUENCE: 39

```
Glu Val Gln Leu Val Glu Ser Gly Gly Gly Leu Val Gln Pro Gly Gly
1               5                   10                  15
Ser Leu Arg Leu Ser Cys Ala Ala Ser Gly Phe Thr Phe Asn Thr Tyr
            20                  25                  30
Ala Met Asn Trp Val Arg Gln Ala Pro Gly Lys Gly Leu Glu Trp Val
        35                  40                  45
Ala Arg Ile Arg Ser Lys Tyr Asn Asn Tyr Ala Thr Tyr Tyr Ala Asp
    50                  55                  60
Ser Val Lys Asp Arg Phe Thr Ile Ser Arg Asp Asp Ser Lys Asn Ser
65                  70                  75                  80
Leu Tyr Leu Gln Met Asn Ser Leu Lys Thr Glu Asp Thr Ala Val Tyr
                85                  90                  95
```

```
Tyr Cys Val Arg His Gly Asn Phe Pro Asn Ser Tyr Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245
```

<210> SEQ ID NO 40
<211> LENGTH: 248
<212> TYPE: PRT
<213> ORGANISM: Artificial
<220> FEATURE:
<223> OTHER INFORMATION: Synthetic sequence

<400> SEQUENCE: 40

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Lys Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205
```

Gly Gly Lys Ala Ala Leu Thr Ile Thr Gly Ala Gln Ala Glu Asp Glu
            210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 41
<211> LENGTH: 248
<212> TYPE: PRT
<213> ORGANISM: Artificial
<220> FEATURE:
<223> OTHER INFORMATION: Synthetic sequence

<400> SEQUENCE: 41

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Pro Asn Ser Lys Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 42
<211> LENGTH: 248
<212> TYPE: PRT
<213> ORGANISM: Artificial
<220> FEATURE:
<223> OTHER INFORMATION: Synthetic sequence

<400> SEQUENCE: 42

Glu Val Gln Leu Val Glu Ser Gly Gly Gly Leu Val Gln Pro Gly Gly
1               5                   10                  15

```
Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Pro Asn Ser Tyr Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 43
<211> LENGTH: 248
<212> TYPE: PRT
<213> ORGANISM: Artificial
<220> FEATURE:
<223> OTHER INFORMATION: Synthetic sequence

<400> SEQUENCE: 43

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Gly Asn Ser Lys Val Ser Trp Phe
            100                 105                 110

Gln Tyr Trp Gly Gln Gly Thr Leu Val Thr Val Ser Ser Gly Gly Ser
        115                 120                 125
```

Gly Gly Ser Gly Gly Ser Gly Gly Ser Gly Gly Gln Ala Val Val Thr
            130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 44
<211> LENGTH: 248
<212> TYPE: PRT
<213> ORGANISM: Artificial
<220> FEATURE:
<223> OTHER INFORMATION: Synthetic sequence

<400> SEQUENCE: 44

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Pro Asn Ser Lys Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
            245

<210> SEQ ID NO 45
<211> LENGTH: 248
<212> TYPE: PRT
<213> ORGANISM: Artificial
<220> FEATURE:
<223> OTHER INFORMATION: Synthetic sequence

<400> SEQUENCE: 45

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Pro Asn Ser Lys Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
            245

<210> SEQ ID NO 46
<211> LENGTH: 248
<212> TYPE: PRT
<213> ORGANISM: Artificial
<220> FEATURE:
<223> OTHER INFORMATION: Synthetic sequence

<400> SEQUENCE: 46

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val

```
                35                  40                  45
Ala Arg Ile Arg Ser Lys Tyr Asn Asn Tyr Ala Thr Tyr Tyr Ala Asp
 50                  55                  60

Ser Val Lys Asp Arg Phe Thr Ile Ser Arg Asp Asp Ser Lys Asn Ser
 65                  70                  75                  80

Leu Tyr Leu Gln Met Asn Ser Leu Lys Thr Glu Asp Thr Ala Val Tyr
                 85                  90                  95

Tyr Cys Val Arg His Ser Asn Phe Gly Asn Ser Tyr Val Ser Trp Phe
                100                 105                 110

Ala Tyr Trp Gly Gln Gly Thr Leu Val Thr Val Ser Ser Gly Gly Ser
                115                 120                 125

Gly Gly Ser Gly Gly Ser Gly Gly Ser Gly Gly Gln Ala Val Val Thr
                130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
                180                 185                 190

Asn Lys Arg Ala Pro Trp Thr Pro Ala Arg Phe Ser Gly Ser Leu Leu
                195                 200                 205

Gly Gly Lys Ala Ala Leu Thr Ile Thr Gly Ala Gln Ala Glu Asp Glu
210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 47
<211> LENGTH: 248
<212> TYPE: PRT
<213> ORGANISM: Artificial
<220> FEATURE:
<223> OTHER INFORMATION: Synthetic sequence

<400> SEQUENCE: 47

Glu Val Gln Leu Val Glu Ser Gly Gly Gly Leu Val Gln Pro Gly Gly
 1               5                  10                  15

Ser Leu Arg Leu Ser Cys Ala Ala Ser Gly Phe Thr Phe Asn Thr Tyr
                 20                  25                  30

Ala Met Asn Trp Val Arg Gln Ala Pro Gly Lys Gly Leu Glu Trp Val
                 35                  40                  45

Ala Arg Ile Arg Ser Lys Tyr Asn Asn Tyr Ala Thr Tyr Tyr Ala Asp
 50                  55                  60

Ser Val Lys Asp Arg Phe Thr Ile Ser Arg Asp Asp Ser Lys Asn Ser
 65                  70                  75                  80

Leu Tyr Leu Gln Met Asn Ser Leu Lys Thr Glu Asp Thr Ala Val Tyr
                 85                  90                  95

Tyr Cys Val Arg His Gly Asn Phe Pro Asn Ser Tyr Val Ser Trp Phe
                100                 105                 110

Ala Tyr Trp Gly Gln Gly Thr Leu Val Thr Val Ser Ser Gly Gly Ser
                115                 120                 125

Gly Gly Ser Gly Gly Ser Gly Gly Gln Ala Val Val Thr
                130                 135                 140

Gln Glu Pro Ser Leu Thr Val Ser Pro Gly Gly Thr Val Thr Leu Thr
```

```
                145                 150                 155                 160
Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
                180                 185                 190

Asn Lys Arg Ala Pro Trp Thr Pro Ala Arg Phe Ser Gly Ser Leu Leu
                195                 200                 205

Gly Gly Lys Ala Ala Leu Thr Ile Thr Gly Ala Gln Ala Glu Asp Glu
                210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 48
<211> LENGTH: 248
<212> TYPE: PRT
<213> ORGANISM: Artificial
<220> FEATURE:
<223> OTHER INFORMATION: Synthetic sequence

<400> SEQUENCE: 48

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
                20                  25                  30

Ala Met Asn Trp Val Arg Gln Ala Pro Gly Lys Gly Leu Glu Trp Val
                35                  40                  45

Ala Arg Ile Arg Ser Lys Tyr Asn Asn Tyr Ala Thr Tyr Tyr Ala Asp
                50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Lys Val Ser Trp Phe
                100                 105                 110

Ala Tyr Trp Gly Gln Gly Thr Leu Val Thr Val Ser Ser Gly Gly Ser
                115                 120                 125

Gly Gly Ser Gly Gly Ser Gly Gly Ser Gly Gln Ala Val Val Thr
                130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
                180                 185                 190

Asn Lys Arg Ala Pro Trp Thr Pro Ala Arg Phe Ser Gly Ser Leu Leu
                195                 200                 205

Gly Gly Lys Ala Ala Leu Thr Ile Thr Gly Ala Gln Ala Glu Asp Glu
                210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245
```

<210> SEQ ID NO 49
<211> LENGTH: 248
<212> TYPE: PRT
<213> ORGANISM: Artificial
<220> FEATURE:
<223> OTHER INFORMATION: Synthetic sequence

<400> SEQUENCE: 49

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245
```

<210> SEQ ID NO 50
<211> LENGTH: 248
<212> TYPE: PRT
<213> ORGANISM: Artificial
<220> FEATURE:
<223> OTHER INFORMATION: Synthetic sequence

<400> SEQUENCE: 50

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60
```

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Pro Asn Ser Tyr Val Ser Trp Phe
                100                 105                 110

Ala Tyr Trp Gly Gln Gly Thr Leu Val Thr Val Ser Ser Gly Gly Ser
                115                 120                 125

Gly Gly Ser Gly Gly Ser Gly Gly Ser Gly Gly Gln Ala Val Val Thr
                130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
                180                 185                 190

Asn Lys Arg Ala Pro Trp Thr Pro Ala Arg Phe Ser Gly Ser Leu Leu
                195                 200                 205

Gly Gly Lys Ala Ala Leu Thr Ile Thr Gly Ala Gln Ala Glu Asp Glu
                210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 51
<211> LENGTH: 248
<212> TYPE: PRT
<213> ORGANISM: Artificial
<220> FEATURE:
<223> OTHER INFORMATION: Synthetic sequence

<400> SEQUENCE: 51

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
                20                  25                  30

Ala Met Asn Trp Val Arg Gln Ala Pro Gly Lys Gly Leu Glu Trp Val
                35                  40                  45

Ala Arg Ile Arg Ser Lys Tyr Asn Asn Tyr Ala Thr Tyr Tyr Ala Asp
                50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Gly Asn Ser Lys Val Ser Trp Phe
                100                 105                 110

Ala Tyr Trp Gly Gln Gly Thr Leu Val Thr Val Ser Ser Gly Gly Ser
                115                 120                 125

Gly Gly Ser Gly Gly Ser Gly Gly Ser Gly Gly Gln Ala Val Val Thr
                130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
                180                 185                 190

Asn Lys Arg Ala Pro Trp Thr Pro Ala Arg Phe Ser Gly Ser Leu Leu
            195                 200                 205

Gly Gly Lys Ala Ala Leu Thr Ile Thr Gly Ala Gln Ala Glu Asp Glu
        210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 52
<211> LENGTH: 248
<212> TYPE: PRT
<213> ORGANISM: Artificial
<220> FEATURE:
<223> OTHER INFORMATION: Synthetic sequence

<400> SEQUENCE: 52

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Gly Asn Ser Tyr Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
                180                 185                 190

Asn Lys Arg Ala Pro Trp Thr Pro Ala Arg Phe Ser Gly Ser Leu Leu
            195                 200                 205

Gly Gly Lys Ala Ala Leu Thr Ile Thr Gly Ala Gln Ala Glu Asp Glu
        210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 53
<211> LENGTH: 248
<212> TYPE: PRT
<213> ORGANISM: Artificial
<220> FEATURE:

<223> OTHER INFORMATION: Synthetic sequence

<400> SEQUENCE: 53

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
            85                  90                  95

Tyr Cys Val Arg His Gly Asn Phe Pro Asn Ser Lys Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
            165                 170                 175

Val Gln Gln Lys Pro Gly Gln Ala Pro Arg Gly Leu Ile Gly Gly Thr
        180                 185                 190

Asn Lys Arg Ala Pro Trp Thr Pro Ala Arg Phe Ser Gly Ser Leu Leu
    195                 200                 205

Gly Gly Lys Ala Ala Leu Thr Ile Thr Gly Ala Gln Ala Glu Asp Glu
210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
            245

<210> SEQ ID NO 54
<211> LENGTH: 248
<212> TYPE: PRT
<213> ORGANISM: Artificial
<220> FEATURE:
<223> OTHER INFORMATION: Synthetic sequence

<400> SEQUENCE: 54

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
            85                  90                  95

```
Tyr Cys Val Arg His Gly Asn Phe Pro Asn Ser Tyr Val Ser Trp Phe
                100                 105                 110

Gln Tyr Trp Gly Gln Gly Thr Leu Val Thr Val Ser Ser Gly Gly Ser
            115                 120                 125

Gly Gly Ser Gly Gly Ser Gly Gly Ser Gly Gly Gln Ala Val Val Thr
        130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
        210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 55
<211> LENGTH: 248
<212> TYPE: PRT
<213> ORGANISM: Artificial
<220> FEATURE:
<223> OTHER INFORMATION: Synthetic sequence

<400> SEQUENCE: 55

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Lys Val Ser Trp Phe
                100                 105                 110

Gln Tyr Trp Gly Gln Gly Thr Leu Val Thr Val Ser Ser Gly Gly Ser
            115                 120                 125

Gly Gly Ser Gly Gly Ser Gly Gly Ser Gly Gly Gln Ala Val Val Thr
        130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205
```

```
Gly Gly Lys Ala Ala Leu Thr Ile Thr Gly Ala Gln Ala Glu Asp Glu
        210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 56
<211> LENGTH: 248
<212> TYPE: PRT
<213> ORGANISM: Artificial
<220> FEATURE:
<223> OTHER INFORMATION: Synthetic sequence

<400> SEQUENCE: 56

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Pro Asn Ser Lys Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gln Ala Val Val Thr
        130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
        210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 57
<211> LENGTH: 248
<212> TYPE: PRT
<213> ORGANISM: Artificial
<220> FEATURE:
<223> OTHER INFORMATION: Synthetic sequence

<400> SEQUENCE: 57

Glu Val Gln Leu Val Glu Ser Gly Gly Gly Leu Val Gln Pro Gly Gly
```

```
                1               5                  10                  15
            Ser Leu Arg Leu Ser Cys Ala Ala Ser Gly Phe Thr Phe Asn Thr Tyr
                            20                  25                  30

Ala Met Asn Trp Val Arg Gln Ala Pro Gly Lys Gly Leu Glu Trp Val
                            35                  40              45

Ala Arg Ile Arg Ser Lys Tyr Asn Asn Tyr Ala Thr Tyr Tyr Ala Asp
                        50                  55                  60

Ser Val Lys Asp Arg Phe Thr Ile Ser Arg Asp Asp Ser Lys Asn Ser
            65                  70                  75                  80

Leu Tyr Leu Gln Met Asn Ser Leu Lys Thr Glu Asp Thr Ala Val Tyr
                                85                  90                  95

Tyr Cys Val Arg His Ser Asn Phe Pro Asn Ser Tyr Val Ser Trp Phe
                                100                 105                 110

Gln Tyr Trp Gly Gln Gly Thr Leu Val Thr Val Ser Ser Gly Gly Ser
                            115                 120                 125

Gly Gly Ser Gly Gly Ser Gly Gly Ser Gly Gly Gln Ala Val Val Thr
                        130                 135                 140

Gln Glu Pro Ser Leu Thr Val Ser Pro Gly Gly Thr Val Thr Leu Thr
            145                 150                 155                 160

Cys Arg Ser Ser Thr Gly Ala Val Thr Thr Lys Asn Tyr Asp Asn Trp
                                165                 170                 175

Val Gln Gln Lys Pro Gly Gln Ala Pro Arg Gly Leu Ile Gly Gly Thr
                            180                 185                 190

Asn Lys Arg Ala Pro Trp Thr Pro Ala Arg Phe Ser Gly Ser Leu Leu
                        195                 200                 205

Gly Gly Lys Ala Ala Leu Thr Ile Thr Gly Ala Gln Ala Glu Asp Glu
                    210                 215                 220

Ala Asp Tyr Tyr Cys Ala Leu Trp Tyr Ser Asn Leu Trp Val Phe Gly
            225                 230                 235                 240

Gly Gly Thr Lys Leu Thr Val Leu
                            245

<210> SEQ ID NO 58
<211> LENGTH: 248
<212> TYPE: PRT
<213> ORGANISM: Artificial
<220> FEATURE:
<223> OTHER INFORMATION: Synthetic sequence

<400> SEQUENCE: 58

Glu Val Gln Leu Val Glu Ser Gly Gly Gly Leu Val Gln Pro Gly Gly
            1               5                   10                  15

Ser Leu Arg Leu Ser Cys Ala Ala Ser Gly Phe Thr Phe Asn Thr Tyr
                            20                  25                  30

Ala Met Asn Trp Val Arg Gln Ala Pro Gly Lys Gly Leu Glu Trp Val
                            35                  40              45

Ala Arg Ile Arg Ser Lys Tyr Asn Asn Tyr Ala Thr Tyr Tyr Ala Asp
                        50                  55                  60

Ser Val Lys Asp Arg Phe Thr Ile Ser Arg Asp Asp Ser Lys Asn Ser
            65                  70                  75                  80

Leu Tyr Leu Gln Met Asn Ser Leu Lys Thr Glu Asp Thr Ala Val Tyr
                                85                  90                  95

Tyr Cys Val Arg His Ser Asn Phe Gly Asn Ser Lys Val Ser Trp Phe
                                100                 105                 110

Gln Tyr Trp Gly Gln Gly Thr Leu Val Thr Val Ser Ser Gly Gly Ser
```

```
                    115                 120                 125
Gly Gly Ser Gly Gly Ser Gly Ser Gly Gly Gln Ala Val Val Thr
            130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
                180                 185                 190

Asn Lys Arg Ala Pro Trp Thr Pro Ala Arg Phe Ser Gly Ser Leu Leu
                195                 200                 205

Gly Gly Lys Ala Ala Leu Thr Ile Thr Gly Ala Gln Ala Glu Asp Glu
            210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 59
<211> LENGTH: 248
<212> TYPE: PRT
<213> ORGANISM: Artificial
<220> FEATURE:
<223> OTHER INFORMATION: Synthetic sequence

<400> SEQUENCE: 59

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
                20                  25                  30

Ala Met Asn Trp Val Arg Gln Ala Pro Gly Lys Gly Leu Glu Trp Val
            35                  40                  45

Ala Arg Ile Arg Ser Lys Tyr Asn Asn Tyr Ala Thr Tyr Tyr Ala Asp
        50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Pro Asn Ser Lys Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Ser Gly Gly Gln Ala Val Val Thr
            130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
                180                 185                 190

Asn Lys Arg Ala Pro Trp Thr Pro Ala Arg Phe Ser Gly Ser Leu Leu
                195                 200                 205

Gly Gly Lys Ala Ala Leu Thr Ile Thr Gly Ala Gln Ala Glu Asp Glu
            210                 215                 220

Ala Asp Tyr Tyr Cys Ala Leu Trp Tyr Ser Asn Leu Trp Val Phe Gly
```

```
                225                 230                 235                 240
Gly Gly Thr Lys Leu Thr Val Leu
                245

<210> SEQ ID NO 60
<211> LENGTH: 248
<212> TYPE: PRT
<213> ORGANISM: Artificial
<220> FEATURE:
<223> OTHER INFORMATION: Synthetic sequence

<400> SEQUENCE: 60

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Pro Asn Ser Lys Val Ser Trp Phe
            100                 105                 110

Gln Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Lys Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 61
<211> LENGTH: 248
<212> TYPE: PRT
<213> ORGANISM: Artificial
<220> FEATURE:
<223> OTHER INFORMATION: Synthetic sequence

<400> SEQUENCE: 61

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30
```

```
Ala Met Asn Trp Val Arg Gln Ala Pro Gly Lys Gly Leu Glu Trp Val
         35                  40                  45
Ala Arg Ile Arg Ser Lys Tyr Asn Asn Tyr Ala Thr Tyr Tyr Ala Asp
 50                  55                  60
Ser Val Lys Asp Arg Phe Thr Ile Ser Arg Asp Asp Ser Lys Asn Ser
 65                  70                  75                  80
Leu Tyr Leu Gln Met Asn Ser Leu Lys Thr Glu Asp Thr Ala Val Tyr
                 85                  90                  95
Tyr Cys Val Arg His Gly Asn Phe Gly Asn Ser Lys Val Ser Trp Phe
                100                 105                 110
Ala Tyr Trp Gly Gln Gly Thr Leu Val Thr Val Ser Ser Gly Gly Ser
            115                 120                 125
Gly Gly Ser Gly Gly Ser Gly Gly Ser Gly Gly Gln Ala Val Val Thr
        130                 135                 140
Gln Glu Pro Ser Leu Thr Val Ser Pro Gly Gly Thr Val Thr Leu Thr
145                 150                 155                 160
Cys Arg Ser Ser Ala Gly Ala Val Thr Thr Ser Asn Tyr Asp Asn Trp
                165                 170                 175
Val Gln Gln Lys Pro Gly Gln Ala Pro Arg Gly Leu Ile Gly Gly Thr
            180                 185                 190
Asn Lys Arg Ala Pro Trp Thr Pro Ala Arg Phe Ser Gly Ser Leu Leu
        195                 200                 205
Gly Gly Lys Ala Ala Leu Thr Ile Thr Gly Ala Gln Ala Glu Asp Glu
    210                 215                 220
Ala Asp Tyr Tyr Cys Ala Leu Trp Tyr Ser Asn Leu Trp Val Phe Gly
225                 230                 235                 240
Gly Gly Thr Lys Leu Thr Val Leu
                245

<210> SEQ ID NO 62
<211> LENGTH: 248
<212> TYPE: PRT
<213> ORGANISM: Artificial
<220> FEATURE:
<223> OTHER INFORMATION: Synthetic sequence

<400> SEQUENCE: 62

Glu Val Gln Leu Val Glu Ser Gly Gly Gly Leu Val Gln Pro Gly Gly
 1               5                  10                  15
Ser Leu Arg Leu Ser Cys Ala Ala Ser Gly Phe Thr Phe Asn Thr Tyr
                20                  25                  30
Ala Met Asn Trp Val Arg Gln Ala Pro Gly Lys Gly Leu Glu Trp Val
            35                  40                  45
Ala Arg Ile Arg Ser Lys Tyr Asn Asn Tyr Ala Thr Tyr Tyr Ala Asp
 50                  55                  60
Ser Val Lys Asp Arg Phe Thr Ile Ser Arg Asp Asp Ser Lys Asn Ser
 65                  70                  75                  80
Leu Tyr Leu Gln Met Asn Ser Leu Lys Thr Glu Asp Thr Ala Val Tyr
                 85                  90                  95
Tyr Cys Val Arg His Gly Asn Phe Gly Asn Ser Lys Val Ser Trp Phe
                100                 105                 110
Ala Tyr Trp Gly Gln Gly Thr Leu Val Thr Val Ser Ser Gly Gly Ser
            115                 120                 125
Gly Gly Ser Gly Gly Ser Gly Gly Ser Gly Gly Gln Ala Val Val Thr
        130                 135                 140
```

Gln Glu Pro Ser Leu Thr Val Ser Pro Gly Gly Thr Val Thr Leu Thr
145                 150                 155                 160

Cys Arg Ser Ser Thr Gly Ala Val Thr Trp Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 63
<211> LENGTH: 248
<212> TYPE: PRT
<213> ORGANISM: Artificial
<220> FEATURE:
<223> OTHER INFORMATION: Synthetic sequence

<400> SEQUENCE: 63

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Gly Asn Phe Gly Asn Ser Lys Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Tyr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 64
<211> LENGTH: 248
<212> TYPE: PRT
<213> ORGANISM: Artificial
<220> FEATURE:
<223> OTHER INFORMATION: Synthetic sequence

<400> SEQUENCE: 64

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ala Asn Phe Gly Asn Ser Lys Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245
```

<210> SEQ ID NO 65
<211> LENGTH: 248
<212> TYPE: PRT
<213> ORGANISM: Artificial
<220> FEATURE:
<223> OTHER INFORMATION: Synehtic sequence

<400> SEQUENCE: 65

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60
```

```
Ser Val Lys Asp Arg Phe Thr Ile Ser Arg Asp Asp Ser Lys Asn Ser
 65                  70                  75                  80

Leu Tyr Leu Gln Met Asn Ser Leu Lys Thr Glu Asp Thr Ala Val Tyr
                 85                  90                  95

Tyr Cys Val Arg His Gly Asn Phe Pro Asn Ser Lys Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 66
<211> LENGTH: 248
<212> TYPE: PRT
<213> ORGANISM: Artificial
<220> FEATURE:
<223> OTHER INFORMATION: Synthetic sequence

<400> SEQUENCE: 66

Glu Val Gln Leu Val Glu Ser Gly Gly Gly Leu Val Gln Pro Gly Gly
  1               5                  10                  15

Ser Leu Arg Leu Ser Cys Ala Ala Ser Gly Phe Thr Phe Asn Thr Tyr
                 20                  25                  30

Ala Met Asn Trp Val Arg Gln Ala Pro Gly Lys Gly Leu Glu Trp Val
             35                  40                  45

Ala Arg Ile Arg Ser Lys Tyr Asn Asn Tyr Ala Thr Tyr Tyr Ala Asp
         50                  55                  60

Ser Val Lys Asp Arg Phe Thr Ile Ser Arg Asp Asp Ser Lys Asn Ser
 65                  70                  75                  80

Leu Tyr Leu Gln Met Asn Ser Leu Lys Thr Glu Asp Thr Ala Val Tyr
                 85                  90                  95

Tyr Cys Val Arg His Ser Asn Phe Gly Asn Ser Lys Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175
```

-continued

Val Gln Gln Lys Pro Gly Gln Ala Pro Arg Gly Leu Ile Gly Gly Thr
                180                 185                 190

Asn Lys Arg Ala Pro Trp Thr Pro Ala Arg Phe Ser Gly Ser Leu Leu
            195                 200                 205

Gly Gly Lys Ala Ala Leu Thr Ile Thr Gly Ala Gln Ala Glu Asp Glu
        210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 67
<211> LENGTH: 248
<212> TYPE: PRT
<213> ORGANISM: Artificial
<220> FEATURE:
<223> OTHER INFORMATION: Synthetic sequence

<400> SEQUENCE: 67

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Thr Asn Phe Gly Asn Ser Lys Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Thr Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 68
<211> LENGTH: 248
<212> TYPE: PRT
<213> ORGANISM: Artificial

<220> FEATURE:
<223> OTHER INFORMATION: Synthetic sequence

<400> SEQUENCE: 68

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ala Asn Phe Gly Asn Ser Lys Val Ser Trp Phe
            100                 105                 110

Ala Tyr Trp Gly Gln Gly Thr Leu Val Thr Val Ser Ser Gly Gly Ser
        115                 120                 125

Gly Gly Ser Gly Gly Ser Gly Gly Ser Gly Gly Gln Ala Val Val Thr
    130                 135                 140

Gln Glu Pro Ser Leu Thr Val Ser Pro Gly Gly Thr Val Thr Leu Thr
145                 150                 155                 160

Cys Arg Ser Ser Ala Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 69
<211> LENGTH: 248
<212> TYPE: PRT
<213> ORGANISM: Artificial
<220> FEATURE:
<223> OTHER INFORMATION: Synthetic sequence

<400> SEQUENCE: 69

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr

```
                    85                  90                  95
Tyr Cys Val Arg His Gly Asn Phe Pro Asn Ser Lys Val Ser Trp Phe
                100                 105                 110

Ala Tyr Trp Gly Gln Gly Thr Leu Val Thr Val Ser Ser Gly Gly Ser
            115                 120                 125

Gly Gly Ser Gly Gly Ser Gly Gly Ser Gly Gly Gln Ala Val Val Thr
        130                 135                 140

Gln Glu Pro Ser Leu Thr Val Ser Pro Gly Gly Thr Val Thr Leu Thr
145                 150                 155                 160

Cys Arg Ser Ser Ala Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
        195                 200                 205

Gly Gly Lys Ala Ala Leu Thr Ile Thr Gly Ala Gln Ala Glu Asp Glu
    210                 215                 220

Ala Asp Tyr Tyr Cys Ala Leu Trp Tyr Ser Asn Leu Trp Val Phe Gly
225                 230                 235                 240

Gly Gly Thr Lys Leu Thr Val Leu
                245

<210> SEQ ID NO 70
<211> LENGTH: 248
<212> TYPE: PRT
<213> ORGANISM: Artificial
<220> FEATURE:
<223> OTHER INFORMATION: Synthetic sequence

<400> SEQUENCE: 70

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Val Arg His Ser Asn Phe Gly Asn Ser Lys Val Ser Trp Phe
                100                 105                 110

Ala Tyr Trp Gly Gln Gly Thr Leu Val Thr Val Ser Ser Gly Gly Ser
            115                 120                 125

Gly Gly Ser Gly Gly Ser Gly Gly Ser Gly Gly Gln Ala Val Val Thr
        130                 135                 140

Gln Glu Pro Ser Leu Thr Val Ser Pro Gly Gly Thr Val Thr Leu Thr
145                 150                 155                 160

Cys Arg Ser Ser Ala Gly Ala Val Thr Thr Ser Asn Tyr Asp Asn Trp
                165                 170                 175

Val Gln Gln Lys Pro Gly Gln Ala Pro Arg Gly Leu Ile Gly Gly Thr
            180                 185                 190

Asn Lys Arg Ala Pro Trp Thr Pro Ala Arg Phe Ser Gly Ser Leu Leu
```

195                 200                 205
Gly Gly Lys Ala Ala Leu Thr Ile Thr Gly Ala Gln Ala Glu Asp Glu
    210                 215                 220
Ala Asp Tyr Tyr Cys Ala Leu Trp Tyr Ser Asn Leu Trp Val Phe Gly
225                 230                 235                 240
Gly Gly Thr Lys Leu Thr Val Leu
                245

<210> SEQ ID NO 71
<211> LENGTH: 248
<212> TYPE: PRT
<213> ORGANISM: Artificial
<220> FEATURE:
<223> OTHER INFORMATION: Synthetic sequence

<400> SEQUENCE: 71

Glu Val Gln Leu Val Glu Ser Gly Gly Gly Leu Val Gln Pro Gly Gly
1               5                   10                  15
Ser Leu Arg Leu Ser Cys Ala Ala Ser Gly Phe Thr Phe Asn Thr Tyr
            20                  25                  30
Ala Met Asn Trp Val Arg Gln Ala Pro Gly Lys Gly Leu Glu Trp Val
        35                  40                  45
Ala Arg Ile Arg Ser Lys Tyr Asn Asn Tyr Ala Thr Tyr Tyr Ala Asp
    50                  55                  60
Ser Val Lys Asp Arg Phe Thr Ile Ser Arg Asp Asp Ser Lys Asn Ser
65                  70                  75                  80
Leu Tyr Leu Gln Met Asn Ser Leu Lys Thr Glu Asp Thr Ala Val Tyr
                85                  90                  95
Tyr Cys Val Arg His Thr Asn Phe Gly Asn Ser Lys Val Ser Trp Phe
            100                 105                 110
Ala Tyr Trp Gly Gln Gly Thr Leu Val Thr Val Ser Ser Gly Gly Ser
        115                 120                 125
Gly Gly Ser Gly Gly Ser Gly Gly Ser Gly Gln Ala Val Val Thr
    130                 135                 140
Gln Glu Pro Ser Leu Thr Val Ser Pro Gly Gly Thr Val Thr Leu Thr
145                 150                 155                 160
Cys Arg Ser Ser Ala Gly Ala Val Thr Thr Ser Asn Tyr Asp Asn Trp
                165                 170                 175
Val Gln Gln Lys Pro Gly Gln Ala Pro Arg Gly Leu Ile Gly Thr
            180                 185                 190
Asn Lys Arg Ala Pro Trp Thr Pro Ala Arg Phe Ser Gly Ser Leu Leu
        195                 200                 205
Gly Gly Lys Ala Ala Leu Thr Ile Thr Gly Ala Gln Ala Glu Asp Glu
    210                 215                 220
Ala Asp Tyr Tyr Cys Ala Leu Trp Tyr Ser Asn Leu Trp Val Phe Gly
225                 230                 235                 240
Gly Gly Thr Lys Leu Thr Val Leu
                245

<210> SEQ ID NO 72
<211> LENGTH: 469
<212> TYPE: PRT
<213> ORGANISM: Artificial
<220> FEATURE:
<223> OTHER INFORMATION: Synthetic sequence

<400> SEQUENCE: 72

-continued

```
Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ile Ser Tyr Met
            20                  25                  30

His Trp Tyr Gln Gln Lys Ser Gly Thr Ser Pro Lys Leu Leu Ile Tyr
                35                  40                  45

Ser Thr Ser Asn Leu Ala Ser Gly Val Pro Ser Arg Phe Ser Gly Ser
50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys Arg Thr Val Ala Ala Pro Ser
            100                 105                 110

Val Phe Ile Phe Pro Pro Ser Asp Glu Gln Leu Lys Ser Gly Thr Ala
            115                 120                 125

Ser Val Val Cys Leu Leu Asn Asn Phe Tyr Pro Arg Glu Ala Lys Val
130                 135                 140

Gln Trp Lys Val Asp Asn Ala Leu Gln Ser Gly Asn Ser Gln Glu Ser
145                 150                 155                 160

Val Thr Glu Gln Asp Ser Lys Asp Ser Thr Tyr Ser Leu Ser Ser Thr
            165                 170                 175

Leu Thr Leu Ser Lys Ala Asp Tyr Glu Lys His Lys Val Tyr Ala Cys
            180                 185                 190

Glu Val Thr His Gln Gly Leu Ser Ser Pro Val Thr Lys Ser Phe Asn
            195                 200                 205

Arg Gly Glu Cys Ser Arg Ser Gly Gly Gly Glu Val Gln Leu Val
            210                 215                 220

Glu Ser Gly Gly Gly Leu Val Gln Pro Gly Gly Ser Leu Arg Leu Ser
225                 230                 235                 240

Cys Ala Ala Ser Gly Phe Thr Phe Asn Thr Tyr Ala Met Asn Trp Val
                245                 250                 255

Arg Gln Ala Pro Gly Lys Gly Leu Glu Trp Val Ala Arg Ile Arg Ser
            260                 265                 270

Lys Tyr Asn Asn Tyr Ala Thr Tyr Tyr Ala Asp Ser Val Lys Asp Arg
            275                 280                 285

Phe Thr Ile Ser Arg Asp Asp Ser Lys Asn Ser Leu Tyr Leu Gln Met
            290                 295                 300

Asn Ser Leu Lys Thr Glu Asp Thr Ala Val Tyr Tyr Cys Val Arg His
305                 310                 315                 320

Gly Asn Phe Gly Asn Ser Tyr Val Ser Trp Phe Ala Tyr Trp Gly Gln
                325                 330                 335

Gly Thr Leu Val Thr Val Ser Ser Gly Gly Ser Gly Gly
            340                 345                 350

Ser Gly Gly Ser Gly Gly Gln Ala Val Val Thr Gln Glu Pro Ser Leu
            355                 360                 365

Thr Val Ser Pro Gly Gly Thr Val Thr Leu Thr Cys Arg Ser Ser Thr
            370                 375                 380

Gly Ala Val Thr Thr Ser Asn Tyr Asp Asn Trp Val Gln Gln Lys Pro
385                 390                 395                 400

Gly Gln Ala Pro Arg Gly Leu Ile Gly Gly Thr Asn Lys Arg Ala Pro
                405                 410                 415

Trp Thr Pro Ala Arg Phe Ser Gly Ser Leu Leu Gly Gly Lys Ala Ala
```

```
                    420               425              430
Leu Thr Ile Thr Gly Ala Gln Ala Glu Asp Glu Ala Asp Tyr Tyr Cys
                435              440              445

Ala Leu Trp Tyr Ser Asn Leu Trp Val Phe Gly Gly Thr Lys Leu
450              455              460

Thr Val Leu Ser Arg
465

<210> SEQ ID NO 73
<211> LENGTH: 469
<212> TYPE: PRT
<213> ORGANISM: Artificial
<220> FEATURE:
<223> OTHER INFORMATION: Synthetic sequence

<400> SEQUENCE: 73

Gln Ile Val Leu Thr Gln Ser Pro Ala Ile Met Ser Ala Ser Leu Gly
1                5                  10                  15

Glu Glu Ile Ala Leu Thr Cys Ser Ala Ser Ser Ser Ile Ser Tyr Met
                20                  25                  30

His Trp Tyr Gln Gln Lys Ser Gly Thr Ser Pro Lys Leu Leu Ile Tyr
            35                  40                  45

Ser Thr Ser Asn Leu Ala Ser Gly Val Pro Ser Arg Phe Ser Gly Ser
        50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys Arg Thr Val Ala Ala Pro Ser
            100                 105                 110

Val Phe Ile Phe Pro Pro Ser Asp Glu Gln Leu Lys Ser Gly Thr Ala
        115                 120                 125

Ser Val Val Cys Leu Leu Asn Asn Phe Tyr Pro Arg Glu Ala Lys Val
    130                 135                 140

Gln Trp Lys Val Asp Asn Ala Leu Gln Ser Gly Asn Ser Gln Glu Ser
145                 150                 155                 160

Val Thr Glu Gln Asp Ser Lys Asp Ser Thr Tyr Ser Leu Ser Ser Thr
                165                 170                 175

Leu Thr Leu Ser Lys Ala Asp Tyr Glu Lys His Lys Val Tyr Ala Cys
            180                 185                 190

Glu Val Thr His Gln Gly Leu Ser Ser Pro Val Thr Lys Ser Phe Asn
        195                 200                 205

Arg Gly Glu Cys Ser Arg Ser Gly Gly Gly Glu Val Gln Leu Val
    210                 215                 220

Glu Ser Gly Gly Gly Leu Val Gln Pro Gly Gly Ser Leu Arg Leu Ser
225                 230                 235                 240

Cys Ala Ala Ser Gly Phe Thr Phe Asn Thr Tyr Ala Met Asn Trp Val
                245                 250                 255

Arg Gln Ala Pro Gly Lys Gly Leu Glu Trp Val Ala Arg Ile Arg Ser
            260                 265                 270

Lys Tyr Asn Asn Tyr Ala Thr Tyr Tyr Ala Asp Ser Val Lys Asp Arg
        275                 280                 285

Phe Thr Ile Ser Arg Asp Asp Ser Lys Asn Ser Leu Tyr Leu Gln Met
    290                 295                 300

Asn Ser Leu Lys Thr Glu Asp Thr Ala Val Tyr Tyr Cys Val Arg His
```

```
                305                 310                 315                 320
Ser Asn Phe Gly Asn Ser Tyr Val Ser Trp Phe Ala Tyr Trp Gly Gln
                325                 330                 335
Gly Thr Leu Val Thr Val Ser Ser Gly Gly Ser Gly Gly
                340                 345                 350
Ser Gly Gly Ser Gly Gly Gln Ala Val Val Thr Gln Glu Pro Ser Leu
                355                 360                 365
Thr Val Ser Pro Gly Gly Thr Val Thr Leu Thr Cys Arg Ser Ser Thr
        370                 375                 380
Gly Ala Val Thr Thr Ser Asn Tyr Asp Asn Trp Val Gln Gln Lys Pro
385                 390                 395                 400
Gly Gln Ala Pro Arg Gly Leu Ile Gly Gly Thr Asn Lys Arg Ala Pro
                405                 410                 415
Trp Thr Pro Ala Arg Phe Ser Gly Ser Leu Leu Gly Gly Lys Ala Ala
                420                 425                 430
Leu Thr Ile Thr Gly Ala Gln Ala Glu Asp Glu Ala Asp Tyr Tyr Cys
                435                 440                 445
Ala Leu Trp Tyr Ser Asn Leu Trp Val Phe Gly Gly Gly Thr Lys Leu
        450                 455                 460
Thr Val Leu Ser Arg
465

<210> SEQ ID NO 74
<211> LENGTH: 469
<212> TYPE: PRT
<213> ORGANISM: Artificial
<220> FEATURE:
<223> OTHER INFORMATION: Synthetic sequence

<400> SEQUENCE: 74

Gln Ile Val Leu Thr Gln Ser Pro Ala Ile Met Ser Ala Ser Leu Gly
1               5                   10                  15
Glu Glu Ile Ala Leu Thr Cys Ser Ala Ser Ser Ser Ile Ser Tyr Met
                20                  25                  30
His Trp Tyr Gln Gln Lys Ser Gly Thr Ser Pro Lys Leu Leu Ile Tyr
            35                  40                  45
Ser Thr Ser Asn Leu Ala Ser Gly Val Pro Ser Arg Phe Ser Gly Ser
        50                  55                  60
Gly Ser Gly Thr Phe Tyr Ser Leu Thr Ile Ser Ser Val Glu Ala Glu
65                  70                  75                  80
Asp Ala Ala Asp Tyr Phe Cys His Gln Trp Ser Thr Tyr His Thr Phe
                85                  90                  95
Gly Ser Gly Thr Lys Leu Glu Ile Lys Arg Thr Val Ala Ala Pro Ser
            100                 105                 110
Val Phe Ile Phe Pro Pro Ser Asp Glu Gln Leu Lys Ser Gly Thr Ala
        115                 120                 125
Ser Val Val Cys Leu Leu Asn Asn Phe Tyr Pro Arg Glu Ala Lys Val
    130                 135                 140
Gln Trp Lys Val Asp Asn Ala Leu Gln Ser Gly Asn Ser Gln Glu Ser
145                 150                 155                 160
Val Thr Glu Gln Asp Ser Lys Asp Ser Thr Tyr Ser Leu Ser Ser Thr
                165                 170                 175
Leu Thr Leu Ser Lys Ala Asp Tyr Glu Lys His Lys Val Tyr Ala Cys
            180                 185                 190
Glu Val Thr His Gln Gly Leu Ser Ser Pro Val Thr Lys Ser Phe Asn
```

```
            195                 200                 205
Arg Gly Glu Cys Ser Arg Ser Gly Gly Gly Glu Val Gln Leu Val
    210                 215                 220

Glu Ser Gly Gly Gly Leu Val Gln Pro Gly Gly Ser Leu Arg Leu Ser
225                 230                 235                 240

Cys Ala Ala Ser Gly Phe Thr Phe Asn Thr Tyr Ala Met Asn Trp Val
                245                 250                 255

Arg Gln Ala Pro Gly Lys Gly Leu Glu Trp Val Ala Arg Ile Arg Ser
                260                 265                 270

Lys Tyr Asn Asn Tyr Ala Thr Tyr Tyr Ala Asp Ser Val Lys Asp Arg
                275                 280                 285

Phe Thr Ile Ser Arg Asp Asp Ser Lys Asn Ser Leu Tyr Leu Gln Met
                290                 295                 300

Asn Ser Leu Lys Thr Glu Asp Thr Ala Val Tyr Tyr Cys Val Arg His
305                 310                 315                 320

Gly Asn Phe Pro Asn Ser Tyr Val Ser Trp Phe Ala Tyr Trp Gly Gln
                325                 330                 335

Gly Thr Leu Val Thr Val Ser Ser Gly Gly Ser Gly Gly Ser Gly Gly
                340                 345                 350

Ser Gly Gly Ser Gly Gly Gln Ala Val Val Thr Gln Glu Pro Ser Leu
                355                 360                 365

Thr Val Ser Pro Gly Gly Thr Val Thr Leu Thr Cys Arg Ser Ser Thr
                370                 375                 380

Gly Ala Val Thr Thr Ser Asn Tyr Asp Asn Trp Val Gln Gln Lys Pro
385                 390                 395                 400

Gly Gln Ala Pro Arg Gly Leu Ile Gly Gly Thr Asn Lys Arg Ala Pro
                405                 410                 415

Trp Thr Pro Ala Arg Phe Ser Gly Ser Leu Leu Gly Gly Lys Ala Ala
                420                 425                 430

Leu Thr Ile Thr Gly Ala Gln Ala Glu Asp Glu Ala Asp Tyr Tyr Cys
                435                 440                 445

Ala Leu Trp Tyr Ser Asn Leu Trp Val Phe Gly Gly Gly Thr Lys Leu
                450                 455                 460

Thr Val Leu Ser Arg
465

<210> SEQ ID NO 75
<211> LENGTH: 469
<212> TYPE: PRT
<213> ORGANISM: Artificial
<220> FEATURE:
<223> OTHER INFORMATION: Synthetic sequence

<400> SEQUENCE: 75

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ser Ile Ser Tyr Met
                20                  25                  30

His Trp Tyr Gln Gln Lys Ser Gly Thr Ser Pro Lys Leu Leu Ile Tyr
            35                  40                  45

Ser Thr Ser Asn Leu Ala Ser Gly Val Pro Ser Arg Phe Ser Gly Ser
        50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
```

```
                85                  90                  95
Gly Ser Gly Thr Lys Leu Glu Ile Lys Arg Thr Val Ala Ala Pro Ser
            100                 105                 110
Val Phe Ile Phe Pro Pro Ser Asp Glu Gln Leu Lys Ser Gly Thr Ala
            115                 120                 125
Ser Val Val Cys Leu Leu Asn Asn Phe Tyr Pro Arg Glu Ala Lys Val
        130                 135                 140
Gln Trp Lys Val Asp Asn Ala Leu Gln Ser Gly Asn Ser Gln Glu Ser
145                 150                 155                 160
Val Thr Glu Gln Asp Ser Lys Asp Ser Thr Tyr Ser Leu Ser Ser Thr
                165                 170                 175
Leu Thr Leu Ser Lys Ala Asp Tyr Glu Lys His Lys Val Tyr Ala Cys
            180                 185                 190
Glu Val Thr His Gln Gly Leu Ser Ser Pro Val Thr Lys Ser Phe Asn
            195                 200                 205
Arg Gly Glu Cys Ser Arg Ser Gly Gly Gly Glu Val Gln Leu Val
        210                 215                 220
Glu Ser Gly Gly Gly Leu Val Gln Pro Gly Gly Ser Leu Arg Leu Ser
225                 230                 235                 240
Cys Ala Ala Ser Gly Phe Thr Phe Asn Thr Tyr Ala Met Asn Trp Val
                245                 250                 255
Arg Gln Ala Pro Gly Lys Gly Leu Glu Trp Val Ala Arg Ile Arg Ser
            260                 265                 270
Lys Tyr Asn Asn Tyr Ala Thr Tyr Tyr Ala Asp Ser Val Lys Asp Arg
            275                 280                 285
Phe Thr Ile Ser Arg Asp Asp Ser Lys Asn Ser Leu Tyr Leu Gln Met
        290                 295                 300
Asn Ser Leu Lys Thr Glu Asp Thr Ala Val Tyr Tyr Cys Val Arg His
305                 310                 315                 320
Gly Asn Phe Gly Asn Ser Lys Val Ser Trp Phe Ala Tyr Trp Gly Gln
                325                 330                 335
Gly Thr Leu Val Thr Val Ser Ser Gly Gly Ser Gly Gly Ser Gly Gly
            340                 345                 350
Ser Gly Gly Ser Gly Gly Gln Ala Val Val Thr Gln Glu Pro Ser Leu
            355                 360                 365
Thr Val Ser Pro Gly Gly Thr Val Thr Leu Thr Cys Arg Ser Ser Thr
        370                 375                 380
Gly Ala Val Thr Thr Ser Asn Tyr Asp Asn Trp Val Gln Gln Lys Pro
385                 390                 395                 400
Gly Gln Ala Pro Arg Gly Leu Ile Gly Gly Thr Asn Lys Arg Ala Pro
                405                 410                 415
Trp Thr Pro Ala Arg Phe Ser Gly Ser Leu Leu Gly Gly Lys Ala Ala
            420                 425                 430
Leu Thr Ile Thr Gly Ala Gln Ala Glu Asp Glu Ala Asp Tyr Tyr Cys
            435                 440                 445
Ala Leu Trp Tyr Ser Asn Leu Trp Val Phe Gly Gly Gly Thr Lys Leu
        450                 455                 460
Thr Val Leu Ser Arg
465

<210> SEQ ID NO 76
<211> LENGTH: 469
<212> TYPE: PRT
<213> ORGANISM: Artificial
```

-continued

<220> FEATURE:
<223> OTHER INFORMATION: Synthetic sequence

<400> SEQUENCE: 76

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ser Ile Ser Tyr Met
            20                  25                  30

His Trp Tyr Gln Gln Lys Ser Gly Thr Ser Pro Lys Leu Leu Ile Tyr
        35                  40                  45

Ser Thr Ser Asn Leu Ala Ser Gly Val Pro Ser Arg Phe Ser Gly Ser
    50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys Arg Thr Val Ala Ala Pro Ser
            100                 105                 110

Val Phe Ile Phe Pro Pro Ser Asp Glu Gln Leu Lys Ser Gly Thr Ala
        115                 120                 125

Ser Val Val Cys Leu Leu Asn Asn Phe Tyr Pro Arg Glu Ala Lys Val
    130                 135                 140

Gln Trp Lys Val Asp Asn Ala Leu Gln Ser Gly Asn Ser Gln Glu Ser
145                 150                 155                 160

Val Thr Glu Gln Asp Ser Lys Asp Ser Thr Tyr Ser Leu Ser Ser Thr
                165                 170                 175

Leu Thr Leu Ser Lys Ala Asp Tyr Glu Lys His Lys Val Tyr Ala Cys
            180                 185                 190

Glu Val Thr His Gln Gly Leu Ser Ser Pro Val Thr Lys Ser Phe Asn
        195                 200                 205

Arg Gly Glu Cys Ser Arg Ser Gly Gly Gly Glu Val Gln Leu Val
    210                 215                 220

Glu Ser Gly Gly Gly Leu Val Gln Pro Gly Gly Ser Leu Arg Leu Ser
225                 230                 235                 240

Cys Ala Ala Ser Gly Phe Thr Phe Asn Thr Tyr Ala Met Asn Trp Val
                245                 250                 255

Arg Gln Ala Pro Gly Lys Gly Leu Glu Trp Val Ala Arg Ile Arg Ser
            260                 265                 270

Lys Tyr Asn Asn Tyr Ala Thr Tyr Tyr Ala Asp Ser Val Lys Asp Arg
        275                 280                 285

Phe Thr Ile Ser Arg Asp Asp Ser Lys Asn Ser Leu Tyr Leu Gln Met
    290                 295                 300

Asn Ser Leu Lys Thr Glu Asp Thr Ala Val Tyr Tyr Cys Val Arg His
305                 310                 315                 320

Gly Asn Phe Gly Asn Ser Tyr Val Ser Trp Phe Gln Tyr Trp Gly Gln
                325                 330                 335

Gly Thr Leu Val Thr Val Ser Ser Gly Gly Ser Gly Gly
            340                 345                 350

Ser Gly Gly Ser Gly Gly Gln Ala Val Val Thr Gln Glu Pro Ser Leu
        355                 360                 365

Thr Val Ser Pro Gly Gly Thr Val Thr Leu Thr Cys Arg Ser Ser Thr
370                 375                 380

Gly Ala Val Thr Thr Ser Asn Tyr Asp Asn Trp Val Gln Gln Lys Pro
385                 390                 395                 400

-continued

Gly Gln Ala Pro Arg Gly Leu Ile Gly Gly Thr Asn Lys Arg Ala Pro
            405                 410                 415

Trp Thr Pro Ala Arg Phe Ser Gly Ser Leu Leu Gly Gly Lys Ala Ala
            420                 425                 430

Leu Thr Ile Thr Gly Ala Gln Ala Glu Asp Glu Ala Asp Tyr Tyr Cys
            435                 440                 445

Ala Leu Trp Tyr Ser Asn Leu Trp Val Phe Gly Gly Gly Thr Lys Leu
450                 455                 460

Thr Val Leu Ser Arg
465

<210> SEQ ID NO 77
<211> LENGTH: 469
<212> TYPE: PRT
<213> ORGANISM: Artificial
<220> FEATURE:
<223> OTHER INFORMATION: Synthetic sequence

<400> SEQUENCE: 77

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ser Ile Ser Tyr Met
                20                  25                  30

His Trp Tyr Gln Gln Lys Ser Gly Thr Ser Pro Lys Leu Leu Ile Tyr
            35                  40                  45

Ser Thr Ser Asn Leu Ala Ser Gly Val Pro Ser Arg Phe Ser Gly Ser
        50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys Arg Thr Val Ala Ala Pro Ser
            100                 105                 110

Val Phe Ile Phe Pro Pro Ser Asp Glu Gln Leu Lys Ser Gly Thr Ala
        115                 120                 125

Ser Val Val Cys Leu Leu Asn Asn Phe Tyr Pro Arg Glu Ala Lys Val
130                 135                 140

Gln Trp Lys Val Asp Asn Ala Leu Gln Ser Gly Asn Ser Gln Glu Ser
145                 150                 155                 160

Val Thr Glu Gln Asp Ser Lys Asp Ser Thr Tyr Ser Leu Ser Ser Thr
                165                 170                 175

Leu Thr Leu Ser Lys Ala Asp Tyr Glu Lys His Lys Val Tyr Ala Cys
            180                 185                 190

Glu Val Thr His Gln Gly Leu Ser Ser Pro Val Thr Lys Ser Phe Asn
        195                 200                 205

Arg Gly Glu Cys Ser Arg Ser Gly Gly Gly Glu Val Gln Leu Val
210                 215                 220

Glu Ser Gly Gly Gly Leu Val Gln Pro Gly Gly Ser Leu Arg Leu Ser
225                 230                 235                 240

Cys Ala Ala Ser Gly Phe Thr Phe Asn Thr Tyr Ala Met Asn Trp Val
                245                 250                 255

Arg Gln Ala Pro Gly Lys Gly Leu Glu Trp Val Ala Arg Ile Arg Ser
            260                 265                 270

Lys Tyr Asn Asn Tyr Ala Thr Tyr Tyr Ala Asp Ser Val Lys Asp Arg
        275                 280                 285

```
Phe Thr Ile Ser Arg Asp Asp Ser Lys Asn Ser Leu Tyr Leu Gln Met
    290                 295                 300

Asn Ser Leu Lys Thr Glu Asp Thr Ala Val Tyr Tyr Cys Val Arg His
305                 310                 315                 320

Gly Asn Phe Gly Asn Ser Tyr Val Ser Trp Phe Ala Tyr Trp Gly Gln
                325                 330                 335

Gly Thr Leu Val Thr Val Ser Ser Gly Ser Gly Gly Ser Gly Gly
            340                 345                 350

Ser Gly Gly Ser Gly Gly Gln Ala Val Val Thr Gln Glu Pro Ser Leu
        355                 360                 365

Thr Val Ser Pro Gly Gly Thr Val Thr Leu Thr Cys Arg Ser Ser Thr
    370                 375                 380

Gly Ala Val Thr Thr Lys Asn Tyr Asp Asn Trp Val Gln Gln Lys Pro
385                 390                 395                 400

Gly Gln Ala Pro Arg Gly Leu Ile Gly Gly Thr Asn Lys Arg Ala Pro
                405                 410                 415

Trp Thr Pro Ala Arg Phe Ser Gly Ser Leu Leu Gly Gly Lys Ala Ala
                420                 425                 430

Leu Thr Ile Thr Gly Ala Gln Ala Glu Asp Glu Ala Asp Tyr Tyr Cys
            435                 440                 445

Ala Leu Trp Tyr Ser Asn Leu Trp Val Phe Gly Gly Gly Thr Lys Leu
    450                 455                 460

Thr Val Leu Ser Arg
465

<210> SEQ ID NO 78
<211> LENGTH: 469
<212> TYPE: PRT
<213> ORGANISM: Artificial
<220> FEATURE:
<223> OTHER INFORMATION: Synthetic sequence

<400> SEQUENCE: 78

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ser Ile Ser Tyr Met
                20                  25                  30

His Trp Tyr Gln Gln Lys Ser Gly Thr Ser Pro Lys Leu Leu Ile Tyr
            35                  40                  45

Ser Thr Ser Asn Leu Ala Ser Gly Val Pro Ser Arg Phe Ser Gly Ser
        50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys Arg Thr Val Ala Ala Pro Ser
            100                 105                 110

Val Phe Ile Phe Pro Pro Ser Asp Glu Gln Leu Lys Ser Gly Thr Ala
        115                 120                 125

Ser Val Val Cys Leu Leu Asn Asn Phe Tyr Pro Arg Glu Ala Lys Val
    130                 135                 140

Gln Trp Lys Val Asp Asn Ala Leu Gln Ser Gly Asn Ser Gln Glu Ser
145                 150                 155                 160

Val Thr Glu Gln Asp Ser Lys Asp Ser Thr Tyr Ser Leu Ser Ser Thr
                165                 170                 175
```

Leu Thr Leu Ser Lys Ala Asp Tyr Glu Lys His Lys Val Tyr Ala Cys
            180                 185                 190

Glu Val Thr His Gln Gly Leu Ser Ser Pro Val Thr Lys Ser Phe Asn
        195                 200                 205

Arg Gly Glu Cys Ser Arg Ser Gly Gly Gly Glu Val Gln Leu Val
    210                 215                 220

Glu Ser Gly Gly Gly Leu Val Gln Pro Gly Gly Ser Leu Arg Leu Ser
225                 230                 235                 240

Cys Ala Ala Ser Gly Phe Thr Phe Asn Thr Tyr Ala Met Asn Trp Val
                245                 250                 255

Arg Gln Ala Pro Gly Lys Gly Leu Glu Trp Val Ala Arg Ile Arg Ser
            260                 265                 270

Lys Tyr Asn Asn Tyr Ala Thr Tyr Tyr Ala Asp Ser Val Lys Asp Arg
        275                 280                 285

Phe Thr Ile Ser Arg Asp Asp Ser Lys Asn Ser Leu Tyr Leu Gln Met
    290                 295                 300

Asn Ser Leu Lys Thr Glu Asp Thr Ala Val Tyr Tyr Cys Val Arg His
305                 310                 315                 320

Gly Asn Phe Gly Asn Ser Tyr Val Ser Trp Phe Ala Tyr Trp Gly Gln
                325                 330                 335

Gly Thr Leu Val Thr Val Ser Ser Gly Gly Ser Gly Gly Ser Gly Gly
            340                 345                 350

Ser Gly Gly Ser Gly Gly Gln Ala Val Val Thr Gln Glu Pro Ser Leu
        355                 360                 365

Thr Val Ser Pro Gly Gly Thr Val Thr Leu Thr Cys Arg Ser Ser Thr
    370                 375                 380

Gly Ala Val Thr Thr Ser Asn Tyr Asp Asn Trp Val Gln Gln Lys Pro
385                 390                 395                 400

Gly Gln Ala Pro Arg Gly Leu Ile Gly Gly Thr Asn Lys Arg Ala Pro
                405                 410                 415

Trp Thr Pro Ala Arg Phe Ser Gly Ser Leu Leu Gly Gly Lys Ala Ala
            420                 425                 430

Leu Thr Ile Thr Gly Ala Gln Ala Glu Asp Glu Ala Asp Tyr Tyr Cys
        435                 440                 445

Ala Leu Trp Tyr Ser Asn His Trp Val Phe Gly Gly Gly Thr Lys Leu
    450                 455                 460

Thr Val Leu Ser Arg
465

<210> SEQ ID NO 79
<211> LENGTH: 469
<212> TYPE: PRT
<213> ORGANISM: Artificial
<220> FEATURE:
<223> OTHER INFORMATION: Synthetic sequence

<400> SEQUENCE: 79

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ser Ile Ser Tyr Met
            20                  25                  30

His Trp Tyr Gln Gln Lys Ser Gly Thr Ser Pro Lys Leu Leu Ile Tyr
        35                  40                  45

Ser Thr Ser Asn Leu Ala Ser Gly Val Pro Ser Arg Phe Ser Gly Ser
    50                  55                  60

```
Gly Ser Gly Thr Phe Tyr Ser Leu Thr Ile Ser Ser Val Glu Ala Glu
 65                  70                  75                  80

Asp Ala Ala Asp Tyr Phe Cys His Gln Trp Ser Thr Tyr His Thr Phe
                 85                  90                  95

Gly Ser Gly Thr Lys Leu Glu Ile Lys Arg Thr Val Ala Ala Pro Ser
                100                 105                 110

Val Phe Ile Phe Pro Pro Ser Asp Glu Gln Leu Lys Ser Gly Thr Ala
            115                 120                 125

Ser Val Val Cys Leu Leu Asn Asn Phe Tyr Pro Arg Glu Ala Lys Val
        130                 135                 140

Gln Trp Lys Val Asp Asn Ala Leu Gln Ser Gly Asn Ser Gln Glu Ser
145                 150                 155                 160

Val Thr Glu Gln Asp Ser Lys Asp Ser Thr Tyr Ser Leu Ser Ser Thr
                165                 170                 175

Leu Thr Leu Ser Lys Ala Asp Tyr Glu Lys His Lys Val Tyr Ala Cys
            180                 185                 190

Glu Val Thr His Gln Gly Leu Ser Ser Pro Val Thr Lys Ser Phe Asn
            195                 200                 205

Arg Gly Glu Cys Ser Arg Ser Gly Gly Gly Glu Val Gln Leu Val
        210                 215                 220

Glu Ser Gly Gly Gly Leu Val Gln Pro Gly Gly Ser Leu Arg Leu Ser
225                 230                 235                 240

Cys Ala Ala Ser Gly Phe Thr Phe Asn Thr Tyr Ala Met Asn Trp Val
                245                 250                 255

Arg Gln Ala Pro Gly Lys Gly Leu Glu Trp Val Ala Arg Ile Arg Ser
                260                 265                 270

Lys Tyr Asn Asn Tyr Ala Thr Tyr Tyr Ala Asp Ser Val Lys Asp Arg
            275                 280                 285

Phe Thr Ile Ser Arg Asp Asp Ser Lys Asn Ser Leu Tyr Leu Gln Met
        290                 295                 300

Asn Ser Leu Lys Thr Glu Asp Thr Ala Val Tyr Tyr Cys Val Arg His
305                 310                 315                 320

Gly Asn Phe Gly Asn Ser Tyr Val Ser Trp Phe Ala Tyr Trp Gly Gln
                325                 330                 335

Gly Thr Leu Val Thr Val Ser Ser Gly Gly Ser Gly Gly Ser Gly Gly
            340                 345                 350

Ser Gly Gly Ser Gly Gly Gln Ala Val Val Thr Gln Glu Pro Ser Leu
        355                 360                 365

Thr Val Ser Pro Gly Gly Thr Val Thr Leu Thr Cys Arg Ser Ser Thr
370                 375                 380

Gly Ala Val Thr Tyr Ser Asn Tyr Asp Asn Trp Val Gln Gln Lys Pro
385                 390                 395                 400

Gly Gln Ala Pro Arg Gly Leu Ile Gly Gly Thr Asn Lys Arg Ala Pro
                405                 410                 415

Trp Thr Pro Ala Arg Phe Ser Gly Ser Leu Leu Gly Gly Lys Ala Ala
                420                 425                 430

Leu Thr Ile Thr Gly Ala Gln Ala Glu Asp Glu Ala Asp Tyr Tyr Cys
            435                 440                 445

Ala Leu Trp Tyr Ser Asn Leu Trp Val Phe Gly Gly Gly Thr Lys Leu
        450                 455                 460

Thr Val Leu Ser Arg
465
```

<210> SEQ ID NO 80
<211> LENGTH: 118
<212> TYPE: PRT
<213> ORGANISM: Artificial
<220> FEATURE:
<223> OTHER INFORMATION: Synthetic sequence

<400> SEQUENCE: 80

```
Gln Val Gln Leu Gln Gln Ser Gly Ala Glu Leu Ala Lys Pro Gly Ala
1               5                   10                  15

Ser Val Lys Val Ser Cys Lys Ala Ser Gly Tyr Thr Phe Thr Ser Tyr
            20                  25                  30

Trp Met His Trp Val Lys Gln Arg Pro Gly Gln Gly Leu Glu Trp Ile
        35                  40                  45

Gly Tyr Ile Arg Pro Ser Thr Gly Tyr Thr Glu Tyr Asn Gln Lys Phe
    50                  55                  60

Lys Asp Lys Ala Thr Leu Thr Ala Asp Lys Ser Ser Thr Ala Tyr
65                  70                  75                  80

Met Gln Leu Ser Ser Leu Thr Phe Glu Asp Ser Ala Val Tyr Tyr Cys
                85                  90                  95

Gly Arg Gly Asp Asn Trp Val Gly Phe Ala Asn Trp Gly Gln Gly Thr
            100                 105                 110

Leu Val Thr Val Ser Ser
        115
```

<210> SEQ ID NO 81
<211> LENGTH: 118
<212> TYPE: PRT
<213> ORGANISM: Artificial
<220> FEATURE:
<223> OTHER INFORMATION: Synthetic sequence

<400> SEQUENCE: 81

```
Gln Val Gln Leu Gln Gln Ser Gly Ala Glu Leu Ala Lys Pro Gly Ala
1               5                   10                  15

Ser Val Lys Val Ser Cys Lys Ala Ser Gly Tyr Thr Phe Thr Ser Tyr
            20                  25                  30

Trp Met His Trp Val Lys Gln Arg Pro Gly Gln Gly Leu Glu Trp Ile
        35                  40                  45

Gly Tyr Ile Arg Pro Ser Thr Gly Tyr Thr Glu Tyr Asn Gln Lys Phe
    50                  55                  60

Lys Asp Lys Ala Thr Leu Thr Ala Asp Lys Ser Ser Thr Ala Tyr
65                  70                  75                  80

Met Gln Leu Ser Ser Leu Thr Phe Glu Asp Ser Ala Val Tyr Tyr Cys
                85                  90                  95

Gly Arg Gly Asp Asn Trp Val Gly Phe Ala Asn Trp Gly Gln Gly Thr
            100                 105                 110

Leu Val Thr Val Ser Ser
        115
```

<210> SEQ ID NO 82
<211> LENGTH: 118
<212> TYPE: PRT
<213> ORGANISM: Artificial
<220> FEATURE:
<223> OTHER INFORMATION: Synthetic sequence

<400> SEQUENCE: 82

```
Gln Val Gln Leu Gln Gln Ser Gly Ala Glu Leu Ala Lys Pro Gly Ala
```

-continued

```
1               5                   10                  15
Ser Val Lys Val Ser Cys Lys Ala Ser Gly Tyr Thr Phe Thr Ser Tyr
                20                  25                  30

Trp Met His Trp Val Lys Gln Arg Pro Gly Gln Gly Leu Glu Trp Ile
        35                  40                  45

Gly Tyr Ile Arg Pro Ser Thr Gly Tyr Thr Glu Tyr Asn Gln Lys Phe
    50                  55                  60

Lys Asp Lys Ala Thr Leu Thr Ala Asp Lys Ser Ser Thr Ala Tyr
65                  70                  75                  80

Met Gln Leu Ser Ser Leu Thr Phe Glu Asp Ser Ala Val Tyr Tyr Cys
                85                  90                  95

Gly Arg Gly Asp Asn Trp Val Gly Phe Ala Asn Trp Gly Gln Gly Thr
                100                 105                 110

Leu Val Thr Val Ser Ser
        115
```

<210> SEQ ID NO 83
<211> LENGTH: 118
<212> TYPE: PRT
<213> ORGANISM: Artificial
<220> FEATURE:
<223> OTHER INFORMATION: Synthetic sequence

<400> SEQUENCE: 83

```
Gln Val Gln Leu Gln Gln Ser Gly Ala Glu Leu Ala Lys Pro Gly Ala
1               5                   10                  15

Ser Val Lys Val Ser Cys Lys Ala Ser Gly Tyr Thr Phe Thr Ser Tyr
                20                  25                  30

Trp Met His Trp Val Lys Gln Arg Pro Gly Gln Gly Leu Glu Trp Ile
        35                  40                  45

Gly Tyr Ile Arg Pro Ser Thr Gly Tyr Thr Glu Tyr Asn Gln Lys Phe
    50                  55                  60

Lys Asp Lys Ala Thr Leu Thr Ala Asp Lys Ser Ser Thr Ala Tyr
65                  70                  75                  80

Met Gln Leu Ser Ser Leu Thr Phe Glu Asp Ser Ala Val Tyr Tyr Cys
                85                  90                  95

Gly Arg Gly Asp Asn Trp Val Gly Phe Ala Asn Trp Gly Gln Gly Thr
                100                 105                 110

Leu Val Thr Val Ser Ser
        115
```

<210> SEQ ID NO 84
<211> LENGTH: 118
<212> TYPE: PRT
<213> ORGANISM: Artificial
<220> FEATURE:
<223> OTHER INFORMATION: Synthetic sequence

<400> SEQUENCE: 84

```
Gln Val Gln Leu Gln Gln Ser Gly Ala Glu Leu Ala Lys Pro Gly Ala
1               5                   10                  15

Ser Val Lys Val Ser Cys Lys Ala Ser Gly Tyr Thr Phe Thr Ser Tyr
                20                  25                  30

Trp Met His Trp Val Lys Gln Arg Pro Gly Gln Gly Leu Glu Trp Ile
        35                  40                  45

Gly Tyr Ile Arg Pro Ser Thr Gly Tyr Thr Glu Tyr Asn Gln Lys Phe
    50                  55                  60
```

Lys Asp Lys Ala Thr Leu Thr Ala Asp Lys Ser Ser Thr Ala Tyr
65                  70                  75                  80

Met Gln Leu Ser Ser Leu Thr Phe Glu Asp Ser Ala Val Tyr Tyr Cys
            85                  90                  95

Gly Arg Gly Asp Asn Trp Val Gly Phe Ala Asn Trp Gly Gln Gly Thr
        100                 105                 110

Leu Val Thr Val Ser Ser
        115

<210> SEQ ID NO 85
<211> LENGTH: 118
<212> TYPE: PRT
<213> ORGANISM: Artificial
<220> FEATURE:
<223> OTHER INFORMATION: Synthetic sequence

<400> SEQUENCE: 85

Gln Val Gln Leu Gln Gln Ser Gly Ala Glu Leu Ala Lys Pro Gly Ala
1               5                   10                  15

Ser Val Lys Val Ser Cys Lys Ala Ser Gly Tyr Thr Phe Thr Ser Tyr
            20                  25                  30

Trp Met His Trp Val Lys Gln Arg Pro Gly Gln Gly Leu Glu Trp Ile
        35                  40                  45

Gly Tyr Ile Arg Pro Ser Thr Gly Tyr Thr Glu Tyr Asn Gln Lys Phe
    50                  55                  60

Lys Asp Lys Ala Thr Leu Thr Ala Asp Lys Ser Ser Thr Ala Tyr
65                  70                  75                  80

Met Gln Leu Ser Ser Leu Thr Phe Glu Asp Ser Ala Val Tyr Tyr Cys
            85                  90                  95

Gly Arg Gly Asp Asn Trp Val Gly Phe Ala Asn Trp Gly Gln Gly Thr
        100                 105                 110

Leu Val Thr Val Ser Ser
        115

<210> SEQ ID NO 86
<211> LENGTH: 118
<212> TYPE: PRT
<213> ORGANISM: Artificial
<220> FEATURE:
<223> OTHER INFORMATION: Synthetic sequence

<400> SEQUENCE: 86

Gln Val Gln Leu Gln Gln Ser Gly Ala Glu Leu Ala Lys Pro Gly Ala
1               5                   10                  15

Ser Val Lys Val Ser Cys Lys Ala Ser Gly Tyr Thr Phe Thr Ser Tyr
            20                  25                  30

Trp Met His Trp Val Lys Gln Arg Pro Gly Gln Gly Leu Glu Trp Ile
        35                  40                  45

Gly Tyr Ile Arg Pro Ser Thr Gly Tyr Thr Glu Tyr Asn Gln Lys Phe
    50                  55                  60

Lys Asp Lys Ala Thr Leu Thr Ala Asp Lys Ser Ser Thr Ala Tyr
65                  70                  75                  80

Met Gln Leu Ser Ser Leu Thr Phe Glu Asp Ser Ala Val Tyr Tyr Cys
            85                  90                  95

Gly Arg Gly Asp Asn Trp Val Gly Phe Ala Asn Trp Gly Gln Gly Thr
        100                 105                 110

Leu Val Thr Val Ser Ser
        115

<210> SEQ ID NO 87
<211> LENGTH: 118
<212> TYPE: PRT
<213> ORGANISM: Artificial
<220> FEATURE:
<223> OTHER INFORMATION: Synthetic sequence

<400> SEQUENCE: 87

```
Gln Val Gln Leu Gln Gln Ser Gly Ala Glu Leu Ala Lys Pro Gly Ala
1               5                   10                  15

Ser Val Lys Val Ser Cys Lys Ala Ser Gly Tyr Thr Phe Thr Ser Tyr
                20                  25                  30

Trp Met His Trp Val Lys Gln Arg Pro Gly Gln Gly Leu Glu Trp Ile
            35                  40                  45

Gly Tyr Ile Arg Pro Ser Thr Gly Tyr Thr Glu Tyr Asn Gln Lys Phe
        50                  55                  60

Lys Asp Lys Ala Thr Leu Thr Ala Asp Lys Ser Ser Thr Ala Tyr
65                  70                  75                  80

Met Gln Leu Ser Ser Leu Thr Phe Glu Asp Ser Ala Val Tyr Tyr Cys
                85                  90                  95

Gly Arg Gly Asp Asn Trp Val Gly Phe Ala Asn Trp Gly Gln Gly Thr
            100                 105                 110

Leu Val Thr Val Ser Ser
        115
```

<210> SEQ ID NO 88
<211> LENGTH: 105
<212> TYPE: PRT
<213> ORGANISM: Artificial
<220> FEATURE:
<223> OTHER INFORMATION: Synthetic sequence

<400> SEQUENCE: 88

```
Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ser Ile Ser Tyr Met
                20                  25                  30

His Trp Tyr Gln Gln Lys Ser Gly Thr Ser Pro Lys Leu Leu Ile Tyr
            35                  40                  45

Ser Thr Ser Asn Leu Ala Ser Gly Val Pro Ser Arg Phe Ser Gly Ser
        50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys
            100                 105
```

<210> SEQ ID NO 89
<211> LENGTH: 105
<212> TYPE: PRT
<213> ORGANISM: Artificial
<220> FEATURE:
<223> OTHER INFORMATION: Synthetic sequence

<400> SEQUENCE: 89

```
Gln Ile Val Leu Thr Gln Ser Pro Ala Ile Met Ser Ala Ser Leu Gly
1               5                   10                  15
```

-continued

Glu Glu Ile Ala Leu Thr Cys Ser Ala Ser Ser Ile Ser Tyr Met
                20                  25                  30

His Trp Tyr Gln Gln Lys Ser Gly Thr Ser Pro Lys Leu Leu Ile Tyr
         35                  40                  45

Ser Thr Ser Asn Leu Ala Ser Gly Val Pro Ser Arg Phe Ser Gly Ser
     50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys
                100                 105

<210> SEQ ID NO 90
<211> LENGTH: 105
<212> TYPE: PRT
<213> ORGANISM: Artificial
<220> FEATURE:
<223> OTHER INFORMATION: Synthetic sequence

<400> SEQUENCE: 90

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ile Ser Tyr Met
                20                  25                  30

His Trp Tyr Gln Gln Lys Ser Gly Thr Ser Pro Lys Leu Leu Ile Tyr
         35                  40                  45

Ser Thr Ser Asn Leu Ala Ser Gly Val Pro Ser Arg Phe Ser Gly Ser
     50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys
                100                 105

<210> SEQ ID NO 91
<211> LENGTH: 105
<212> TYPE: PRT
<213> ORGANISM: Artificial
<220> FEATURE:
<223> OTHER INFORMATION: Synthetic sequence

<400> SEQUENCE: 91

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ile Ser Tyr Met
                20                  25                  30

His Trp Tyr Gln Gln Lys Ser Gly Thr Ser Pro Lys Leu Leu Ile Tyr
         35                  40                  45

Ser Thr Ser Asn Leu Ala Ser Gly Val Pro Ser Arg Phe Ser Gly Ser
     50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys
                100                 105

<210> SEQ ID NO 92
<211> LENGTH: 105
<212> TYPE: PRT
<213> ORGANISM: Artificial
<220> FEATURE:
<223> OTHER INFORMATION: Synthetic sequence

<400> SEQUENCE: 92

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ile Ser Tyr Met
            20                  25                  30

His Trp Tyr Gln Gln Lys Ser Gly Thr Ser Pro Lys Leu Leu Ile Tyr
        35                  40                  45

Ser Thr Ser Asn Leu Ala Ser Gly Val Pro Ser Arg Phe Ser Gly Ser
    50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys
            100                 105

<210> SEQ ID NO 93
<211> LENGTH: 105
<212> TYPE: PRT
<213> ORGANISM: Artificial
<220> FEATURE:
<223> OTHER INFORMATION: Synthetic sequence

<400> SEQUENCE: 93

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ile Ser Tyr Met
            20                  25                  30

His Trp Tyr Gln Gln Lys Ser Gly Thr Ser Pro Lys Leu Leu Ile Tyr
        35                  40                  45

Ser Thr Ser Asn Leu Ala Ser Gly Val Pro Ser Arg Phe Ser Gly Ser
    50                  55                  60

Gly Ser Gly Thr Phe Tyr Ser Leu Thr Ile Ser Ser Val Glu Ala Glu
65                  70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys
            100                 105

<210> SEQ ID NO 94
<211> LENGTH: 105
<212> TYPE: PRT
<213> ORGANISM: Artificial
<220> FEATURE:
<223> OTHER INFORMATION: Synthetic sequence

<400> SEQUENCE: 94

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ile Ser Tyr Met
            20                  25                  30

```
His Trp Tyr Gln Gln Lys Ser Gly Thr Ser Pro Lys Leu Leu Ile Tyr
        35                  40                  45

Ser Thr Ser Asn Leu Ala Ser Gly Val Pro Ser Arg Phe Ser Gly Ser
    50                  55                  60

Gly Ser Gly Thr Phe Tyr Ser Leu Thr Ile Ser Ser Val Glu Ala Glu
65                      70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys
            100                 105

<210> SEQ ID NO 95
<211> LENGTH: 105
<212> TYPE: PRT
<213> ORGANISM: Artificial
<220> FEATURE:
<223> OTHER INFORMATION: Synthetic sequence

<400> SEQUENCE: 95

Gln Ile Val Leu Thr Gln Ser Pro Ala Ile Met Ser Ala Ser Leu Gly
1               5                   10                  15

Glu Glu Ile Ala Leu Thr Cys Ser Ala Ser Ser Ser Ile Ser Tyr Met
                20                  25                  30

His Trp Tyr Gln Gln Lys Ser Gly Thr Ser Pro Lys Leu Leu Ile Tyr
        35                  40                  45

Ser Thr Ser Asn Leu Ala Ser Gly Val Pro Ser Arg Phe Ser Gly Ser
    50                  55                  60

Gly Ser Gly Thr Phe Tyr Ser Leu Thr Ile Ser Ser Val Glu Ala Glu
65                      70                  75                  80

Asp Ala Ala Asp Tyr Phe Cys His Gln Trp Ser Thr Tyr His Thr Phe
                85                  90                  95

Gly Ser Gly Thr Lys Leu Glu Ile Lys
            100                 105
```